United States Patent
May

(10) Patent No.: US 10,941,908 B2
(45) Date of Patent: *Mar. 9, 2021

(54) NETWORKED LED LIGHTING SYSTEM

(71) Applicant: Michael W. May, Crystal Lake, IL (US)

(72) Inventor: Michael W. May, Crystal Lake, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/706,101

(22) Filed: Dec. 6, 2019

(65) Prior Publication Data

US 2020/0116310 A1  Apr. 16, 2020

Related U.S. Application Data

(63) Continuation of application No. 16/698,508, filed on Nov. 27, 2019, which is a continuation of application
(Continued)

(51) Int. Cl.
*F21K 9/272* (2016.01)
*F21K 9/278* (2016.01)
(Continued)

(52) U.S. Cl.
CPC .............. *F21K 9/278* (2016.08); *F21K 9/272* (2016.08); *F21K 9/275* (2016.08); *F21K 9/66* (2016.08);
(Continued)

(58) Field of Classification Search
CPC .... H01R 31/06; H01R 33/94; H01R 13/6272; H01R 24/62; H01R 24/64; F21K 9/272; H05B 33/0845; H05B 33/0857
See application file for complete search history.

(56) References Cited

U.S. PATENT DOCUMENTS 1,516,721 A  11/1924 Emery
1,941,079 A  12/1933 Exelmans
(Continued)

FOREIGN PATENT DOCUMENTS

CN  2548014  4/2003
CN  2573866  9/2003
(Continued)

OTHER PUBLICATIONS

Extended European Search Report dated Feb. 19, 2020, in related European Application No. 17750745.6 (7 pages).
(Continued)

*Primary Examiner* — Tho D Ta
(74) *Attorney, Agent, or Firm* — Fitch, Even, Tabin & Flannery LLP

(57) ABSTRACT

An improved LED lighting system is provided for overhead ceiling lighting, as well as for other uses. The LED lighting system comprises elongated linear lamps having an LED luminary as a source of illumination and configured to operate as a node of an automated networked lighting system. The linear LED lamps have internal modular network connectors and control components so that they can receive control data and power signals over a single network cable according to a standardized power and data network communications architecture such as Ethernet. The system includes connector assemblies designed to securely mount the networkable linear LED lamps to conventional tube lamp lighting fixtures or to another support housing and to provide integrated power and data connectivity to internal components of the lamps. In one form, the disclosed system includes a network enabled snap-fit connector assembly mounted to a lighting fixture and configured to provide Ethernet power and data connectivity to the lamp. The LED lamps have first and second mechanical connectors at oppo-
(Continued)

site ends of the lamp body, and the snap-fit connectors are configured to secure the lamps to an overhead lighting fixture or other support structure as an incident of the lamp ends moving relative to the mounting connectors in a substantially straight path that is transverse to the length of the body into an engaged position. The snap-fit connectors are also configured to form a network connection with an internal modular network connector associated with the lamp with the lamp mounted in its operative state on a support. In another form, a clipping mechanism is provided for mounting linear networkable LED lamps to an overhead grid ceiling system.

41 Claims, 30 Drawing Sheets

Related U.S. Application Data

No. 16/156,768, filed on Oct. 10, 2018, now Pat. No. 10,495,267, which is a continuation of application No. 15/933,049, filed on Mar. 22, 2018, now Pat. No. 10,119,661, which is a continuation of application No. 15/244,883, filed on Aug. 23, 2016, now Pat. No. 9,927,073.

(60) Provisional application No. 62/293,274, filed on Feb. 9, 2016.

(51) Int. Cl.

| | | |
|---|---|---|
| *F21V 23/06* | (2006.01) | |
| *F21S 4/28* | (2016.01) | |
| *F21V 3/02* | (2006.01) | |
| *F21V 29/74* | (2015.01) | |
| *H05B 47/18* | (2020.01) | |
| *H05B 47/19* | (2020.01) | |
| *H05B 47/185* | (2020.01) | |
| *F21K 9/275* | (2016.01) | |
| *F21S 8/04* | (2006.01) | |
| *F21S 9/02* | (2006.01) | |
| *F21V 7/00* | (2006.01) | |
| *F21V 15/015* | (2006.01) | |
| *F21V 23/00* | (2015.01) | |
| *F21S 8/06* | (2006.01) | |
| *F21V 29/70* | (2015.01) | |
| *F21K 9/66* | (2016.01) | |
| *F21V 19/00* | (2006.01) | |
| *F21V 21/005* | (2006.01) | |
| *H01R 33/94* | (2006.01) | |
| *F21V 3/00* | (2015.01) | |
| *F21V 23/02* | (2006.01) | |
| *H02J 7/00* | (2006.01) | |
| *H02J 9/02* | (2006.01) | |
| *H01R 24/64* | (2011.01) | |
| *F21Y 103/10* | (2016.01) | |
| *F21Y 115/10* | (2016.01) | |
| *H01R 107/00* | (2006.01) | |
| *H01R 31/06* | (2006.01) | |
| *F21Y 113/00* | (2016.01) | |
| *F21Y 107/30* | (2016.01) | |
| *F21S 2/00* | (2016.01) | |
| *F21V 29/507* | (2015.01) | |
| *H01R 33/74* | (2006.01) | |
| *H05B 45/10* | (2020.01) | |
| *H05B 45/20* | (2020.01) | |
| *H05B 47/11* | (2020.01) | |
| *H05B 47/105* | (2020.01) | |
| *H01R 13/627* | (2006.01) | |
| *H01R 24/62* | (2011.01) | |

(52) U.S. Cl.
CPC . *F21S 4/28* (2016.01); *F21S 8/04* (2013.01); *F21S 8/061* (2013.01); *F21S 9/022* (2013.01); *F21V 3/00* (2013.01); *F21V 3/02* (2013.01); *F21V 7/00* (2013.01); *F21V 15/015* (2013.01); *F21V 19/008* (2013.01); *F21V 21/005* (2013.01); *F21V 23/005* (2013.01); *F21V 23/02* (2013.01); *F21V 23/06* (2013.01); *F21V 29/70* (2015.01); *F21V 29/74* (2015.01); *H01R 33/94* (2013.01); *H02J 7/0021* (2013.01); *H02J 9/02* (2013.01); *H05B 47/18* (2020.01); *H05B 47/185* (2020.01); *H05B 47/19* (2020.01); *F21S 2/00* (2013.01); *F21V 23/009* (2013.01); *F21V 29/507* (2015.01); *F21Y 2103/10* (2016.08); *F21Y 2107/30* (2016.08); *F21Y 2113/00* (2013.01); *F21Y 2115/10* (2016.08); *H01R 13/6272* (2013.01); *H01R 24/62* (2013.01); *H01R 24/64* (2013.01); *H01R 31/06* (2013.01); *H01R 33/74* (2013.01); *H01R 2107/00* (2013.01); *H05B 45/10* (2020.01); *H05B 45/20* (2020.01); *H05B 47/105* (2020.01); *H05B 47/11* (2020.01)

(56) References Cited

U.S. PATENT DOCUMENTS

| | | |
|---|---|---|
| 2,137,174 A | 11/1938 | Marshaus |
| 2,628,800 A | 2/1953 | Kindorf et al. |
| 3,052,864 A | 9/1962 | Gaynor |
| 3,087,982 A | 4/1963 | Hayes |
| 3,131,871 A | 5/1964 | Foulds |
| 3,404,268 A | 10/1968 | Fowler |
| D246,930 S | 1/1978 | Win |
| 4,115,230 A | 9/1978 | Beckman |
| 4,156,553 A | 5/1979 | Ammon et al. |
| 5,082,448 A | 1/1992 | Kang |
| 5,106,103 A | 4/1992 | Fiore |
| 5,434,762 A | 7/1995 | Shemitz |
| 5,457,905 A | 10/1995 | Kaplan |
| 5,624,274 A | 4/1997 | Lin |
| D397,481 S | 8/1998 | Schafer |
| 5,855,487 A | 1/1999 | Kunishi |
| 5,947,761 A | 9/1999 | Pepe |
| D421,815 S | 3/2000 | Herst et al. |
| D430,326 S | 8/2000 | Littman |
| 6,107,572 A | 8/2000 | Miyazaki |
| D438,326 S | 2/2001 | Kan |
| 6,231,373 B1 | 5/2001 | Daoud |
| 6,257,735 B1 | 7/2001 | Baar |
| 6,283,612 B1 | 9/2001 | Hunter |
| 6,350,158 B1 | 2/2002 | Arnett et al. |
| D459,012 S | 6/2002 | Shemitz et al. |
| D459,517 S | 6/2002 | Shemitz et al. |
| 6,548,967 B1 | 4/2003 | Dowling et al. |
| 6,561,828 B2 | 5/2003 | Henrici |
| 6,577,080 B2 | 6/2003 | Lys et al. |
| 6,578,979 B2 | 6/2003 | Truttmann-Battig |
| 6,623,151 B2 | 9/2003 | Pederson |
| 6,676,425 B2 | 1/2004 | Lewis |
| D500,883 S | 1/2005 | Herst et al. |
| D500,884 S | 1/2005 | O'Rourke |
| D503,009 S | 3/2005 | Salman |
| 6,969,954 B2 | 11/2005 | Lys |
| 7,049,761 B2 | 5/2006 | Timmermans et al. |
| D523,165 S | 6/2006 | Schultz |
| 7,195,370 B2 | 3/2007 | Riblett et al. |
| D543,305 S | 5/2007 | Wang |
| 7,309,965 B2 | 12/2007 | Dowling et al. |
| D565,785 S | 4/2008 | Kerr |

(56) References Cited

U.S. PATENT DOCUMENTS

| | | |
|---|---|---|
| D574,105 S | 7/2008 | Shuai et al. |
| 7,393,223 B1 | 7/2008 | Koda |
| D575,898 S | 8/2008 | Tran et al. |
| D581,569 S | 11/2008 | Levine |
| 7,448,892 B2 | 11/2008 | Dowdle |
| 7,476,004 B2 | 1/2009 | Chan |
| D589,199 S | 3/2009 | Pedersen |
| 7,507,001 B2 | 3/2009 | Kit |
| 7,510,299 B2 | 3/2009 | Timmermans et al. |
| 7,513,637 B2 | 4/2009 | Kelly et al. |
| 7,559,790 B2 | 7/2009 | Boeck et al. |
| 7,587,289 B1 | 9/2009 | Sivertsen |
| D605,343 S | 12/2009 | Watt |
| D607,145 S | 12/2009 | Yu |
| 7,637,636 B2 | 12/2009 | Zheng et al. |
| D616,382 S | 5/2010 | Lin et al. |
| 7,712,918 B2 | 5/2010 | Siemiet et al. |
| 7,815,338 B2 | 10/2010 | Siemiet et al. |
| D627,095 S | 11/2010 | Miyairi et al. |
| D634,470 S | 3/2011 | Hsieh |
| 7,918,580 B2 | 4/2011 | Liu |
| 7,926,975 B2 | 4/2011 | Siemiet et al. |
| 7,938,562 B2 | 5/2011 | Ivey et al. |
| 7,946,729 B2 | 5/2011 | Ivey et al. |
| D642,326 S | 7/2011 | Leadford et al. |
| 7,976,185 B2 | 7/2011 | Uang et al. |
| 7,976,187 B2 | 7/2011 | Villard |
| 7,976,196 B2 | 7/2011 | Ivey et al. |
| 7,989,827 B2 | 8/2011 | Hsu |
| 8,011,794 B1 | 9/2011 | Sivertsen |
| D649,282 S | 11/2011 | McDonald et al. |
| 8,052,295 B2 | 11/2011 | Kim et al. |
| 8,093,823 B1 | 1/2012 | Ivey et al. |
| D654,208 S | 2/2012 | Marquardt et al. |
| 8,118,447 B2 | 2/2012 | Simon et al. |
| 8,164,281 B2 | 4/2012 | Warton |
| 8,186,847 B2 | 5/2012 | Hu et al. |
| 8,203,260 B2 | 6/2012 | Li et al. |
| 8,214,084 B2 | 7/2012 | Ivey et al. |
| 8,235,539 B2 | 8/2012 | Thomas et al. |
| 8,247,985 B2 | 8/2012 | Timmermans et al. |
| 8,251,544 B2 | 8/2012 | Ivey et al. |
| 8,256,924 B2 | 9/2012 | Simon et al. |
| 8,282,247 B2 | 10/2012 | Ivey et al. |
| 8,287,144 B2 | 10/2012 | Pedersen et al. |
| 8,313,212 B1 | 11/2012 | Mayer et al. |
| 8,322,878 B2 | 12/2012 | Hsia |
| 8,324,817 B2 | 12/2012 | Ivey et al. |
| 8,330,381 B2 | 12/2012 | Langovsky |
| 8,344,641 B1 | 1/2013 | Isaacson et al. |
| 8,360,599 B2 | 1/2013 | Ivey et al. |
| 8,382,327 B2 | 2/2013 | Timmermans et al. |
| 8,398,253 B2 | 3/2013 | Sivertsen |
| 8,408,742 B2 | 4/2013 | Tran |
| D682,463 S | 5/2013 | Bernard |
| 8,434,891 B1 | 5/2013 | Ham |
| 8,444,292 B2 | 5/2013 | Ivey et al. |
| 8,454,193 B2 | 6/2013 | Simon et al. |
| 8,523,394 B2 | 9/2013 | Simon et al. |
| 8,534,873 B1 | 9/2013 | Soderman et al. |
| D691,750 S | 10/2013 | Mackiewicz |
| D692,597 S | 10/2013 | Simon et al. |
| 8,547,036 B2 | 10/2013 | Tran |
| 8,556,452 B2 | 10/2013 | Simon et al. |
| 8,558,413 B1 | 10/2013 | Lepard |
| 8,560,261 B1 | 10/2013 | Sivertsen |
| 8,571,716 B2 | 10/2013 | Ivey et al. |
| 8,573,813 B2 | 11/2013 | Ivey et al. |
| 8,596,813 B2 | 12/2013 | Ivey |
| 8,616,720 B2 | 12/2013 | Carney et al. |
| D698,075 S | 1/2014 | Klus |
| 8,628,216 B2 | 1/2014 | Ivey et al. |
| 8,643,298 B2 | 2/2014 | Palazzolo et al. |
| 8,653,984 B2 | 2/2014 | Ivey et al. |
| D701,639 S | 3/2014 | Maxik et al. |
| 8,664,880 B2 | 3/2014 | Ivey et al. |
| 8,674,626 B2 | 3/2014 | Siemiet et al. |
| 8,678,610 B2 | 3/2014 | Simon et al. |
| 8,702,265 B2 | 4/2014 | May |
| 8,710,759 B1 | 4/2014 | Isaacson et al. |
| 8,742,680 B2 | 6/2014 | Cowburn |
| 8,807,785 B2 | 8/2014 | Ivey et al. |
| 8,827,486 B2 | 9/2014 | Lai |
| 8,830,080 B2 | 9/2014 | Ivey et al. |
| 8,836,476 B2 | 9/2014 | Campbell et al. |
| 8,866,414 B2 | 10/2014 | Maxik et al. |
| 8,915,756 B2 | 12/2014 | Schumacher et al. |
| 8,919,991 B2 | 12/2014 | Lee et al. |
| 8,941,330 B2 | 1/2015 | Ng et al. |
| 8,956,005 B2 | 2/2015 | Thomas et al. |
| 8,956,019 B2 | 2/2015 | Swedberg |
| 8,967,825 B2 | 3/2015 | Fukui |
| 9,080,760 B1 | 7/2015 | Soderman et al. |
| 9,101,028 B2 | 8/2015 | Isaacson et al. |
| 9,155,171 B1 | 10/2015 | Hughes et al. |
| 9,215,755 B2 | 12/2015 | Saur et al. |
| 9,228,727 B2 | 1/2016 | May |
| 9,247,623 B2 | 1/2016 | Recker et al. |
| 9,285,085 B2 | 3/2016 | Carney et al. |
| 9,295,142 B1 | 3/2016 | Leinen et al. |
| 9,295,144 B2 | 3/2016 | Bora et al. |
| 9,307,621 B1 | 4/2016 | Parello et al. |
| 9,328,882 B2 | 5/2016 | Spiro |
| 9,338,860 B2 | 5/2016 | Radermacher |
| 9,391,415 B2 | 7/2016 | Swedberg |
| 9,397,709 B2 * | 7/2016 | Kusakari ................ G01S 5/00 |
| 9,464,791 B2 | 10/2016 | May |
| 9,464,792 B2 | 10/2016 | May |
| 9,464,793 B2 | 10/2016 | May |
| 9,470,401 B2 | 10/2016 | May |
| 9,671,071 B1 * | 6/2017 | May ................... F21V 23/005 |
| 9,671,072 B1 | 6/2017 | May |
| 9,739,427 B1 | 8/2017 | May |
| 9,765,935 B2 * | 9/2017 | Rowlette, Jr. .......... F21K 9/272 |
| 9,801,262 B1 | 10/2017 | Helms |
| 2002/0047646 A1 | 4/2002 | Lys |
| 2002/0096347 A1 | 7/2002 | Pyron |
| 2004/0095078 A1 | 5/2004 | Leong |
| 2006/0012981 A1 | 1/2006 | Noh |
| 2006/0046575 A1 | 3/2006 | Allen |
| 2007/0159828 A1 | 7/2007 | Wang |
| 2007/0246714 A1 | 10/2007 | Koike et al. |
| 2007/0258202 A1 | 11/2007 | Cooley |
| 2008/0197790 A1 | 8/2008 | Mangiaracina |
| 2010/0003860 A1 | 1/2010 | Mateo Ferrus et al. |
| 2010/0039813 A1 | 2/2010 | Sloan et al. |
| 2010/0072921 A1 | 3/2010 | Weatherley |
| 2010/0079075 A1 | 4/2010 | Son |
| 2010/0112845 A1 | 5/2010 | Lam et al. |
| 2010/0190455 A1 | 7/2010 | Hashizume |
| 2010/0254148 A1 | 10/2010 | Huang et al. |
| 2010/0327768 A1 | 12/2010 | Kong et al. |
| 2011/0019421 A1 | 1/2011 | Lai |
| 2011/0199005 A1 | 8/2011 | Bretschneider et al. |
| 2011/0199769 A1 | 8/2011 | Bretschneider et al. |
| 2011/0235321 A1 | 9/2011 | Ivey et al. |
| 2011/0280020 A1 | 11/2011 | Chen et al. |
| 2011/0292647 A1 | 12/2011 | Chang |
| 2012/0049739 A1 | 3/2012 | Clough |
| 2012/0069557 A1 | 3/2012 | Bolscher |
| 2012/0147598 A1 | 6/2012 | Johney |
| 2012/0201022 A1 | 8/2012 | Van de Ven et al. |
| 2012/0229025 A1 | 9/2012 | Edwards, Jr. et al. |
| 2012/0235579 A1 | 9/2012 | Chemel et al. |
| 2012/0307524 A1 | 12/2012 | Schapira |
| 2013/0002164 A1 | 1/2013 | Galluccio et al. |
| 2013/0119896 A1 | 5/2013 | Fukano |
| 2013/0135851 A1 | 5/2013 | Ham, II |
| 2013/0141906 A1 | 6/2013 | Wang et al. |
| 2013/0147367 A1 | 6/2013 | Cowburn |
| 2013/0258668 A1 | 10/2013 | Dellian et al. |
| 2013/0264942 A1 | 10/2013 | Kuang |
| 2013/0265746 A1 | 10/2013 | May |
| 2013/0279160 A1 | 10/2013 | Myers et al. |

(56) References Cited

U.S. PATENT DOCUMENTS

| | | |
|---|---|---|
| 2013/0329414 A1 | 12/2013 | Kusunose |
| 2013/0343037 A1 | 12/2013 | Alexander |
| 2014/0009926 A1 | 1/2014 | Simon |
| 2014/0056009 A1 | 2/2014 | Swedberg |
| 2014/0133400 A1 | 5/2014 | Ruan et al. |
| 2014/0146529 A1 | 5/2014 | Xu |
| 2014/0172133 A1 | 6/2014 | Snyder |
| 2014/0218905 A1 | 8/2014 | Ono et al. |
| 2014/0226322 A1 | 8/2014 | Chan |
| 2014/0268752 A1 | 9/2014 | Werr et al. |
| 2014/0293595 A1 | 10/2014 | May |
| 2015/0049475 A1 | 2/2015 | Pan et al. |
| 2015/0132006 A1 | 5/2015 | Inoue |
| 2015/0316214 A1 | 11/2015 | Baumeister et al. |
| 2015/0351205 A1 | 12/2015 | Clark et al. |
| 2016/0227629 A1 | 8/2016 | Conner et al. |
| 2017/0023193 A1 | 1/2017 | Thosteson et al. |
| 2017/0198896 A1 | 7/2017 | May |
| 2019/0249855 A1 | 8/2019 | May |

FOREIGN PATENT DOCUMENTS

| | | |
|---|---|---|
| CN | 1690505 A | 11/2005 |
| CN | 101122379 | 2/2008 |
| CN | 201093403 | 7/2008 |
| CN | 201448641 U | 5/2010 |
| CN | 201636803 | 11/2010 |
| CN | 101936469 A | 1/2011 |
| CN | 102032534 A | 4/2011 |
| CN | 102449391 | 5/2012 |
| CN | 203115884 | 8/2013 |
| CN | 203413568 | 1/2014 |
| CN | 103946630 | 7/2014 |
| CN | 104136273 A | 11/2014 |
| CN | 104584332 | 4/2015 |
| CN | 104639241 A | 5/2015 |
| CN | 104641173 A | 5/2015 |
| EP | 2418422 A2 | 2/2012 |
| FR | 2675958 | 10/1992 |
| JP | S6144785 | 3/1986 |
| JP | H0508888 | 2/1993 |
| JP | 2007165051 A | 6/2007 |
| JP | 200884856 | 4/2008 |
| JP | 2009004188 | 1/2009 |
| JP | 2011142088 | 7/2011 |
| JP | 2012054018 | 3/2012 |
| JP | 2012230864 | 11/2012 |
| JP | 3185411 | 8/2013 |
| WO | 2009143047 | 11/2009 |
| WO | 2009143047 A2 | 11/2009 |
| WO | 2013121580 A1 | 8/2013 |
| WO | 2013151565 | 10/2013 |
| WO | 2013192014 | 12/2013 |

OTHER PUBLICATIONS

Chinese First Office Action dated Feb. 3, 2020, in related Chinese Application No. 201780022658.4, with English translation (31 pages).
Extended European Search Report dated Nov. 7, 2019, in related European Application No. 17750755.5 (9 pages).
Extended European search report issued in European Application No. 12873713.7-1757 dated Jan. 29, 2016 (9 pages).
Notification of Transmittal of the International Search Report and the Written Opinion of the International Searching Authority, for International Application No. PCT/US2017/012700, dated Jul. 19, 2018 (14 pages).
Notification of Transmittal of the International Search Report and the Written Opinion of the International Searching Authority, or the Declaration from the International Bureau of WIPO for International Application No. PCT/US15/26409, dated Jul. 30, 2015, 17 pages.
Notification of Transmittal of the International Search Report and the Written Opinion of the International Searching Authority, or the Declaration from the International Bureau of WIPO for International Application No. PCT/US17/12700, dated Mar. 31, 2017, 16 pages.
Notification of Transmittal of the International Search Report and the Written Opinion of the International Searching Authority, or the Declaration from the International Bureau of WIPO for International Application No. PCT/US2012/037242, dated Aug. 13, 2012, 13 pages.
Office Action including Search Report issued in Chinese Application No. 201280073758.7 dated Jan. 28, 2016 (8 pages).
Office Action issued in Japanese Application No. 2017-506639 dated Jun. 12, 2018 (19 pgs.).
Extended European search report issued in European Application No. 15779891.9-1015 dated Jan. 23, 2018 (11 pages).
Notice of Restriction issued in related Chinese Application No. 201580031681.0 dated Jun. 30, 2017 and English translation (8 pages).
Notification Concerning Transmittal of International Preliminary Report on Patentability and Written Opinion of the International Searching Authority from the International Bureau of WIPO issued in International Application No. PCT/US2015/026409, dated Oct. 27, 2016.
Notification of Transmittal of the International Search Report and the Written Opinion of the International Searching Authority, or the Declaration from the International Bureau of WIPO for International Application No. PCT/US17/17151, dated Jun. 7, 2017 (12 pages).
Notification of Transmittal of the International Search Report and the Written Opinion of the International Searching Authority, or the Declaration from the International Bureau of WIPO for International Application No. PCT/US17/17189, dated Jul. 7, 2017 (13 pages).
Office Action including Search Report issued in Chinese Application No. 2015800316810 dated Jan. 19, 2018 (9 pages).
Partial Supplementary European search report issued in European Application No. 15779891.9-1757 dated Sep. 18, 2017 (13 pages).
Extended European Search Report dated Aug. 29, 2019, issued in corresponding European Patent Application No. 17736504 (14 pages).
Chinese First Office Action dated Sep. 6, 2019, issued in corresponding Chinese Patent Application No. 201780014847.7, with English translation (13 pages).
Extended European search report dated Aug. 29, 2019, issued in related European Application No. 17736504 (14 pages).
European Search Report dated Nov. 15, 2019, in related European Application No. 17750755.5 (9 pages).

* cited by examiner

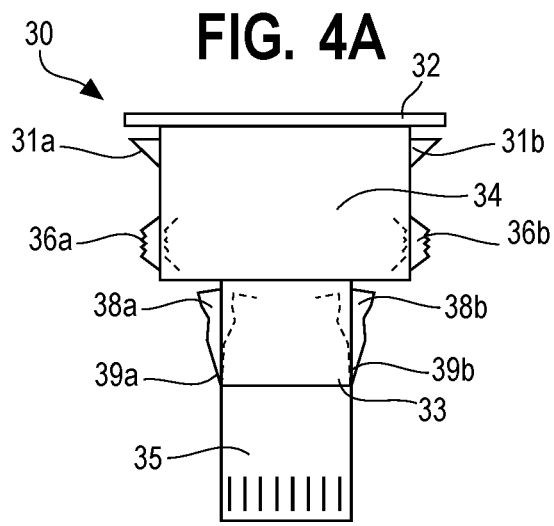
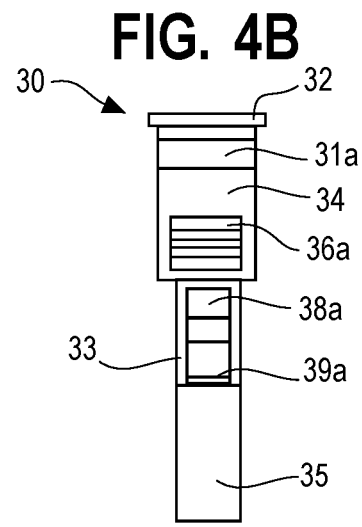
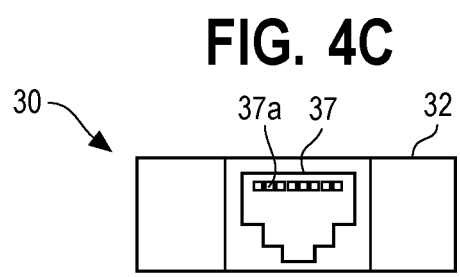

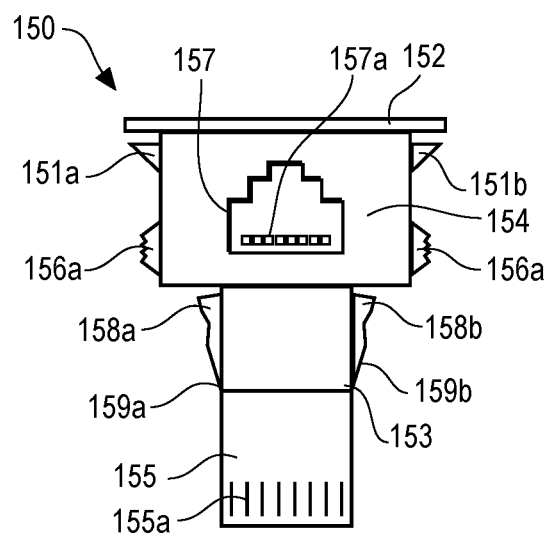
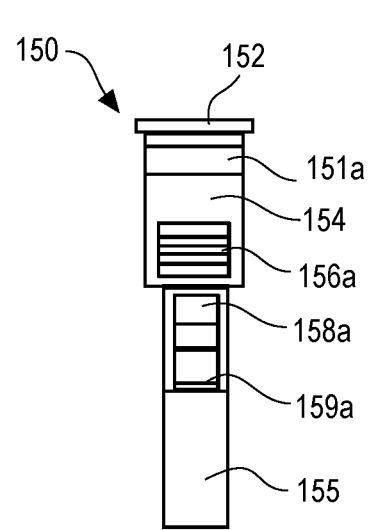
FIG. 12A
FIG. 12B

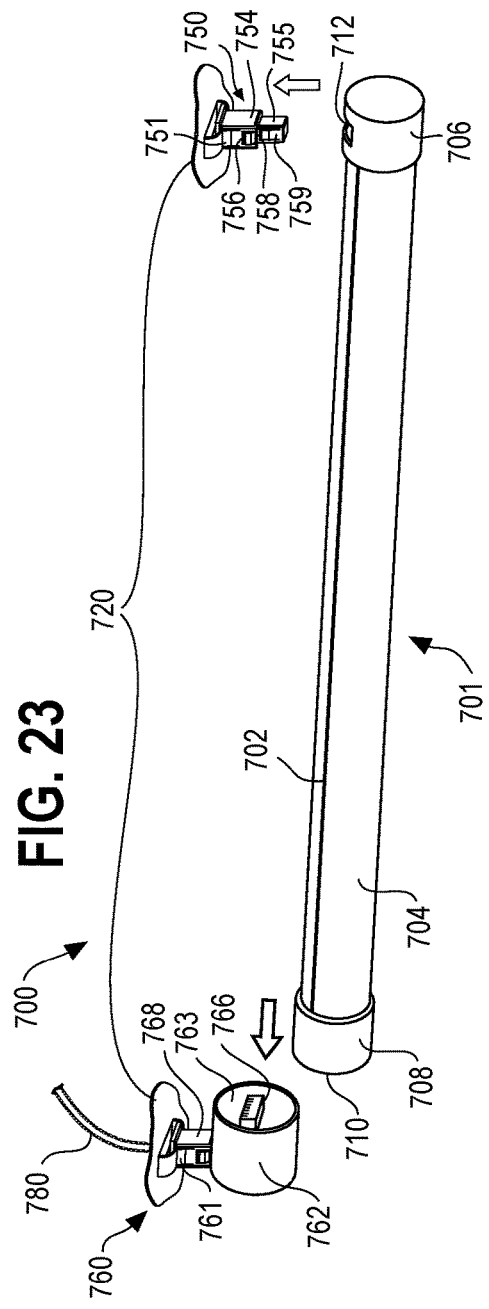
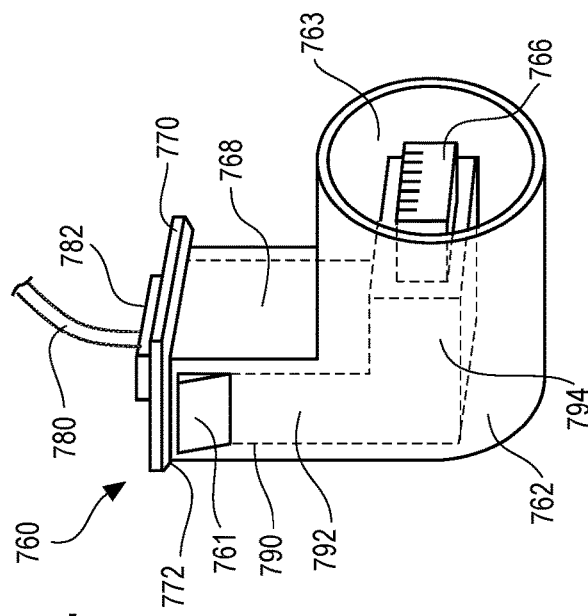
FIG. 23
FIG. 24

NETWORKED LED LIGHTING SYSTEM

CROSS-REFERENCE TO RELATED APPLICATION

This application is a continuation of U.S. Utility patent application Ser. No. 16/698,508, filed Nov. 27, 2019, which is a continuation of U.S. Utility patent application Ser. No. 16/156,768, filed Oct. 10, 2018, now U.S. Pat. No. 10,495,267, issued Dec. 3, 2019, which is a continuation of U.S. Utility patent application Ser. No. 15/933,049, filed Mar. 22, 2018, now U.S. Pat. No. 10,119,661, issued Nov. 6, 2018, which is a continuation of U.S. Utility patent application Ser. No. 15/244,883, filed Aug. 23, 2016, now U.S. Pat. No. 9,927,073, issued Mar. 27, 2018, and claims the benefit of U.S. Provisional Patent Application No. 62/293,274, entitled "Networked LED Lighting Connector System" and filed Feb. 9, 2016, which are all incorporated by reference in their entirety herein.

FIELD

This invention relates to lighting and, more particularly, to light emitting diode (LED) illumination as well as tubular lighting assemblies adapted for networked lighting systems.

BACKGROUND

Over the years various types of illuminating assemblies and devices have been developed for indoor and/or outdoor illumination, such as incandescent bulbs, fluorescent bulbs, halogen lights, and light emitting diodes. Incandescent light bulbs create light by conducting electricity through a thin filament, such as a tungsten filament, to heat the filament to a very high temperature so that it glows and produces visible light. Incandescent light bulbs emit a yellow or white color. They are very inefficient, as a high percentage of energy input is lost as heat. Fluorescent tube lamps conduct electricity through mercury vapor, which produces ultraviolet (UV) light. The ultraviolet light is then absorbed by a phosphor coating inside the lamp, causing it to glow, or fluoresce. The most common formats are ¼ inch diameter (T2), ⅝ inch diameter (T5) and 1 inch diameter (T8) and with length ranging from about 6 inches to 8 feet. The 4 foot long, 1 inch diameter (T8) fluorescent lamp is one of the most widely deployed lamps worldwide in commercial and industrial settings.

While the heat generated by fluorescent lamps is much less than their incandescent counterparts, energy is still lost in generating the UV light and converting UV light into visible light. If the lamp breaks, exposure to mercury can occur. Linear fluorescent lamps are often five to six times the cost of incandescent bulbs but have life spans around 10,000 and 20,000 hours. Some fluorescent lights flicker and the quality of the fluorescent light tends to be a harsh white due to the lack of a broad band of frequencies. Most fluorescent lights are not compatible with dimmers.

A typical fluorescent overhead lighting assembly provides overhead ceiling lighting with a ceiling fixture comprising an outer housing containing an electronic ballast, starter and wiring, and metal concave reflectors positioned above one or more fluorescent tube lamps to reflect emitted light downwardly toward the floor. The ballast associated with the lighting fixture converts AC line voltage to the DC power provided to the fluorescent tube. The ballast also reduces the power supply to a voltage level suitable for use in a florescent tube. A starter circuit for providing a voltage pulse is needed to cause current to conduct through the ionized gas in the fluorescent tube. One type of fixture is adapted to be integrated into a drop ceiling support grid, and may include a transparent or translucent lens incorporated as a tile of a grid pattern drop ceiling for diffusing and/or focusing emitted light. Another fixture type is configured to be mounted to the main structural ceiling. Low bay fixtures suspend from a ceiling using chains or cabling.

Conventional fluorescent lighting fixtures also include mounting brackets for securing light sockets for holding and electrically connecting the fluorescent lamps. The fluorescent tube lamps typically utilize a bi-pin/2-pin means on the tubular body that mechanically supports the body in an operative state on the light sockets or lamp holders of the ceiling lighting fixture and effects electrical connection of the illumination source to a power supply. The bi-pins are inserted into slots in the lamp holders and then rotated to secure the connection.

Light emitting diode (LED) lighting is particularly useful. Light emitting diodes offer any advantages over incandescent and fluorescent light sources, including: lower energy consumption, longer lifetime, improved robustness, smaller size, faster switching, and excellent durability and reliability. LEDs emit more light per watt than incandescent light bulbs. LEDs can be tiny and easily placed on printed circuit boards. The printed circuit board may comprise, for example, a conventional printed circuit board, a specialized printed circuit board (e.g., a flexible printed circuit board), single-sided, double-sided, multilayer or any other appropriate type of wiring board, all of which are generically referred to herein as a "printed circuit board" or "PCB" herein. LEDs activate and turn on very quickly and can be readily dimmed. LEDs emit a cool light with very little infrared light. They come in multiple colors which are produced without the need for filters. LEDs of different colors can be mixed to produce white light. The operational life of some white LED lamps is 100,000 hours, which is much longer than the average life of an incandescent bulb or fluorescent lamp. Another important advantage of LED lighting is reduced power consumption. An LED circuit will approach 80% efficiency, which means 80% of the electrical energy is converted to light energy; the remaining 20% is lost as heat energy. Incandescent bulbs, however, operate at about 20% efficiency with 80% of the electrical energy lost as heat. LED-based solid-state lighting (SSL) is now a mainstream technology, replacing incandescent, halogen, and compact fluorescent lights in commercial, industrial, and residential use. It is to be noted that "light emitting diode" and "LED" in the context of the present invention also means organic light emitting diodes.

Linear LED tube lamps are available for directly replacing fluorescent lamps in an existing light fixture. The most common lamp formats approximate the overall appearance and dimensions of their fluorescent counterparts. LED tube lamps typically comprise an array of LEDs mounted on one or more circuit boards. The LED boards are mounted on an elongate heat sink comprising a heat conducting material such as aluminum. The LED circuit boards are in thermal contact with the heat sink, but are electrically isolated from the heat sink. The LED tube lamp may include internal driver circuitry for converting AC line current to DC current and reducing and controlling the voltage applied to the LEDs. The internal driver circuitry can be designed specifically to meet the electrical requirements of the LED circuit boards, thus overcoming potential problems associated with using the existing local ballast originally designed for powering fluorescent lamps. In some designs, however, an external local ballast is used. The high power LEDs, as well as any internal driver, generate heat that must be dissipated by the heat sink. To facilitate heat dissipation to the atmosphere, the heat sink is typically disposed such that its external surface forms a portion of the outer surface of the tube lighting assembly. The lighting assembly is installed with the heat sink facing upward toward the ceiling lighting fixture. The remaining circumference of the tube comprises a translucent or transparent lens cover through which the generated light is emitted towards the space to be illuminated.

The most common type of LED tube lamp is designed to be retrofit into the insert and rotate type lamp holders mounted on conventional fluorescent ceiling lighting fixtures, known in the industry as "tombstone" lamp holders. Such lamp holders are connected to AC line voltage. They were originally developed to engage the pair of electrical power pins projecting in cantilever fashion from the end caps of a cylindrical shaped fluorescent tube lamp. LED tube lamps mimicking this bi-pin end cap arrangement are now available for direct retrofit into the tombstone lamp holders. Although widely deployed for decades throughout the industry, this connector format has certain disadvantages. The exposed pins on the ends of the linear tube lamp are susceptible to damage during distribution and installation. The lamp body must be situated in a first angular orientation to direct the pins into the lamp holders mounted on a support/reflector and is thereafter turned to effect mechanical securement and electrical connection. Installation requires a precise initial angular orientation of the body and subsequent controlled repositioning thereof to simultaneously seat the pins at the opposite ends of the body. Often one or more of the pins are misaligned during this process so that electrical connection is not established. The same misalignment may cause a compromised mechanical connection whereupon the body may escape from the connectors and drop so that it is damaged or destroyed.

Further, the tombstone lamp holders on the support/reflector are generally mounted in such a fashion that they are prone to flexing. Even a slight flexing of the holders on the support might be adequate to release the pins at one body end so that the entire body becomes separated. The conventional bi-pin and tombstone lamp holder connector means was created for very lightweight fluorescent lighting and not designed for the additional weight of LED tubular lighting due to the required heat sink and PCB boards. The weight of the body by itself may produce horizontal force components that wedge the connectors on the support/reflector away from each other so that the body becomes precariously situated or fully releases.

Another problem with this type of lighting configuration, particularly with an LED illumination source, is that the connectors at the ends of the lamp body are by their nature difficult to consistently assemble. Typically, the manufacturing process will involve steps of soldering conductive components on the end connectors and illumination source. Wires are commonly used in these designs, with the ends thereof soldered during the assembly process. If the conductive components are not properly connected, the system may be inoperable. Soldered connections are also prone to failing when subjected to forces in use. Generally, it is difficult to maintain a high level of quality control, regardless of the care taken in assembling these types of components. Aside from the quality issue, the assembly steps that involve the electrical connection of the conductors are inherently time consuming and may require relatively skilled labor, and/or expensive automated systems. Disassembly of such lamps presents similar difficulties and expense. As a result of these difficulties associated with assembly and disassembly, refurbishing such lamps to replace defective or worn out components is difficult to justify economically. In most cases, the entire lamp assembly will simply be discarded and replaced with a new lamp assembly, and as a result, lamp components that have significant useful life remaining are wasted.

Another approach for replacing fluorescent tube lighting with LED lighting involves replacing fluorescent lighting fixtures with integrated LED fixtures. Integrated LED linear lighting fixtures provide a completely new fixture rather than replacement lamps for existing fixtures. In other words, the LED light engines and other electrical components are permanently mounted within an outer fixture housing to create an integrated overall unit, as opposed to fixtures equipped with lamp mounting sockets for permitting separate LED lamps to be installed in and removed from the fixture housing. One example uses LED strips fixedly mounted across the face of a thin rectangular troffer housing, which can in turn be mounted into a standard ceiling infrastructure. Such fixtures are typically more expensive than replacement LED tubes, and they entail the additional time, labor and cost of removing and disposing of the existing fluorescent lighting fixtures and altering the current fixture design and possibly also the layout. This reduces the potential return of the investment to upgrade to more efficient LED technology, increases the time and complexity of designing and installing LED lighting for a given facility, and increases the likelihood of scheduling conflicts and disruptions of the work environment of the facility. Integrated LED fixtures also prevent the user from making performance upgrades with simple lamp replacement as lamp technology improves, or from addressing non-functioning LEDs or other components by simply replacing a defective individual lamp.

While first generation LED lighting products for the fluorescent tube replacement market were designed to be powered by AC line voltage, which is converted to lower DC voltage via an external ballast or internal driver circuit as explained above, there are efforts underway to power LED lighting by using power over Ethernet (PoE) technology. PoE provides both data and power connectivity in one cable so that powered devices do not require a separate cable for each need. PoE has been used, for example, to power IP telephones, IP cameras, wireless access points, and remote Ethernet switches. PoE can provide DC power over long cable runs, e.g. hundreds of feet. Universal Serial Bus (USB) and IEEE 1394 (FireWire) are examples of other standardized technologies for high-speed data transfer, both of which also provide data and power, albeit over more limited distances compared to PoE. These are commonly used for connecting peripherals to personal computers and recharging digital devices such as smartphones. These standards may regulate communication, encoding and device addressing protocols, port specifications, cabling requirements, connector designs, etc. to assure compatibility among devices, components and products, and to provide plug-and-play capability. For the purpose of providing context for the inventions disclosed herein, the following discussion relates principally to communicating power and data according to Ethernet standards. However, as will become apparent, the inventions disclosed below are by no means limited to PoE implementations and are also applicable to other standardized technologies capable of using a single cable to provide both data connectivity and electrical power to devices.

Systems communicating over Ethernet networks divide a stream of data into shorter pieces called frames, with each frame containing source and destination addresses. Each Ethernet station is given an address. The addresses are used to specify both the destination and the source of each data packet. In a modern Ethernet, each station communicates with a switch, which in turn forwards that traffic to the destination station.

In a typical PoE implementation, 120V electrical wiring (240V in Europe) terminates at power sourcing equipment (PSE), typically one or more Ethernet switches used to plug in computers, phones, printers, and other devices to a local area networks (LAN). In addition to communicating data, the PSE transmits DC power over standard Ethernet cabling to the powered devices. Available Ethernet switches can supply up to 60 W of power per port, and this power capability is expected to increase with additional technology and standards development in this area.

There are several known techniques for transmitting power over Ethernet cabling. The most common forms used are 10BASE-T, 100BASE-TX, and 1000BASE-T. All three utilize twisted pair cables. Fiber optic variants of Ethernet have also been proposed, and may offer certain performance advantages. Standards-based PoE implemented using twisted-pair cables for the physical layer of the network follow the specifications of IEEE 802.3. The standard Ethernet cables have four pairs of twisted wires. Category 5 cable, commonly referred to as "Cat5," is currently widely used. Most Cat5 cables are unshielded, relying on the balanced line twisted pair design and differential signaling for noise reduction. Each of the four pairs in a Cat5 cable has differing precise number of twists per meter to minimize crosstalk between the pairs. Category 5 was superseded by the category 5e (enhanced) specification, and later category 6 cable, which supports Gigabit Ethernet. Category 7, the newest cable standard for Ethernet and other interconnect technologies, features four individually shielded pairs as well as an overall cable shield to protect the signals from crosstalk and EMI. This allows supporting higher frequency signals and carrying more data than Cat5 and Cat6 cable.

Standard modular connectors are used to connect the devices of an Ethernet LAN. Male plugs serve to terminate loose cables and cords, and female jacks are incorporated into fixed locations on surfaces such as walls and panels, and on equipment. These modular connectors latch together via a spring-loaded tab on the plug, which snaps into the jack so that the plug cannot be easily pulled out. To remove the plug, the latching tab may be depressed.

Modular connectors come in 4-, 6-, 8-, and 10-position sizes, where a position is a location for a contact or pin. The contacts, commonly referred to as insulation displacement contacts or "IDCs," have sharp prongs that, when crimped, pierce the insulation and connect with the wire conductor. Not all of the positions may have contacts installed, or, alternatively, some contacts may not be connected to a wire conductor. The insulating plastic bodies of 4-position and 6-position connectors have different widths, whereas 8-position or 10-position connectors share an even larger body width. A very common connector is known as an RJ45 connector, which is a modular 8 position, 8 pin connector used for terminating Cat5 or Cat6 twisted pair cable in Ethernet over twisted pair networks.

The 10BASE-T data transmission standard, and its successors, 100BASE-TX and 1000BASE-T, support speeds of 10, 100 and 1000 Mbit/sec respectively. Only two of the four pairs are needed for 10BASE-T or 100BASE-TX. Power may thus be transmitted on the unused conductors of a cable, which is referred to as Alternative B. Power may also be transmitted on the data conductors using a phantom power technique of applying a common-mode voltage to each pair. In the IEEE standards, this is referred to as Alternative A. It may be used with 10BASE-T and 100BASE-TX, as well as with 1000BASE-T, which uses all four pairs for data transmission. This is possible because all versions of Ethernet over twisted pair cable specify differential data transmission over each pair with transformer coupling. The DC supply and load connections can be made to the transformer center-taps at each end. Each pair thus operates in common mode as one side of the DC supply, so two pairs are required to complete the circuit.

The IEEE PoE standards provide for signaling between the PSE and powered device. This signaling allows the presence of a device to be detected by the power source, and allows the device and source to negotiate the amount of power required or available. The PSE decides whether power mode A or B shall be used. A powered device indicates that it is standards-compliant by placing a standardized resistor between the powered pairs. If the PSE detects a resistance that is too high or too low (including a short circuit), no power is applied. The original IEEE PoE standard provides up to 15.4 W of DC power to each device. The updated standard, also known as PoE plus, provides up to 25.5 W of power.

LED lighting offers intriguing possibilities for PoE implementation due to low power requirements and compatibility with digital connectivity and control. Investigators have proposed that PoE LED lighting can eliminate the cost, regulations and infrastructure associated with AC line voltage, which delivers power far beyond what LED lights need. Ethernet cable can safely carry the much lower DC voltages required, without the need and associated cost of using certified electricians for installation and maintenance. PoE enabled LED lighting also eliminates the electronics to convert main-line AC to DC, and the power loss associated with converting AC to DC current at each lamp. Installation is also safer because of the relatively low DC voltage involved.

Because LED lighting is based on diodes combined with other solid state circuits, it is adaptable to serve as network nodes to receive, collect and transmit information using sensors, wireless communications modules and processors embedded in LED lighting fixtures. For example, each LED hub can collect information on ambient light conditions, temperature, humidity, room-occupancy data, etc., which it then communicates back to a controller. Occupancy sensing can ensure that lighting turns on when someone enters a room and turns off when the room is unoccupied. Ambient light sensors can adjust the lighting to maintain constant lighting throughout the day. Other componentry can collect LED lamp usage data and power draws to support maintenance and warranty issues, and can identify opportunities for improved energy usage and operational efficiency. PoE is well-suited for powering, connecting, and controlling smart LED lighting hubs with a local area network (LAN) in this manner.

Networked LED lighting is poised to play a major role in the Internet of Things (IoT), using Ethernet local area networks to power and control smart hubs containing LED light engines, sensors and communication modules. Historically when businesses wish to reconfigure existing space, electricians are brought back to modify the lighting branch circuits and fixture position. This is costly and time consuming. In larger buildings, lighting systems are powered by a separate and dedicated 120/277V AC infrastructure. If controls are needed (such as for vacancy sensing or daylight harvesting) a second communication network is often added. This overlay infrastructure is usually a standalone network. Both the 120/277V AC infrastructure and control communication network add huge costs to the building owner in the form of high capital expense, design engineering "soft costs" and added maintenance complexity. In short, existing AC lighting systems are costly to install, maintain and operate. And once installed, they are inflexible. In contrast, PoE LED lights enables customers to safely move lights, adjust color temperature and automate failure detection—all while getting a better experience and saving energy. Operational data can be generated or collected by smart LED lighting hubs (e.g., light conditions, usage data, occupancy and link to Building Automation Systems, BAS) and communicated back to central control unit for enabling a wide range of automation control strategies.

Although PoE enabled LED lighting systems offer potential advantages, development efforts to date have focused primarily on increasing the power available from the PSE and reducing the power requirements of LED light engines. While these developments have improved the efficiency comparison between a PoE LED system and more conventional AC system, they have essentially bypassed the conventional tube lamp format that is widely deployed throughout the world. PoE LED systems heretofore proposed bring integrated power and data to specially designed integrated LED light fixtures, which are designed to replace entire fluorescent light fixtures. These present offerings require removing and replacing each fluorescent lighting fixture with a PoE enabled integrated LED fixture, which is very costly and erodes the value proposition of transitioning to LED lighting. There are presently no means available to directly connect individual LED tube lamps designed to retrofit conventional fluorescent lamps to an Ethernet LAN to become individually addressed and managed nodes of a networked lighting system. As explained above, known LED linear tube lamps are designed to be powered using AC line voltage, which is converted to lower voltage DC current by the ballast of the legacy fluorescent lamp fixture or using driver circuitry internal to the lamp itself. The external bi-pin conductors of conventional linear lamps not only provide an electrical path for inputting external power to the lamp, they also mechanically secure each lamp end in the corresponding tombstone lamp holder of the fixture. It is not possible to run data and power through the bi-pin conductors.

An alternative "snap-fit" type connector system adapted for a modified form of a linear LED tube lamp is shown in U.S. Patent Application Publication 2014/0293595, by the same applicant of the subject application, and which is incorporated as if reproduced in its entirety herein. The tubular LED lighting assembly disclosed therein has at least one LED emitter board within the body; and first and second connectors respectively at the first and second body ends that are configured to secure the lamp on a support fixture. The first connector has cooperating first and second parts. The first connector part is integrated into an end cap assembly of the lamp body. The second connector part is configured to be on a support for the tubular lighting assembly. The first and second connector parts respectively have first and second surfaces. As the second connector part is received within an opening of the end cap assembly, the first and second surfaces are placed in confronting relationship to prevent separation of the first and second connector parts as an incident of the first connector part moving relative to the second connector part from a position fully separated from the second connector part in a substantially straight path that is transverse to the length of the lamp body.

This "snap-fit" connection does not utilize exposed pins to mechanically secure the lamp ends to the support. The connection is effected by a linear motion rather than an insert and rotate technique. The first end cap assembly may include at least a first connector board. The connector board comprises generally L-shaped pins housed within the end cap assembly, each having a first portion extending in a direction generally parallel to the length of the body and a second portion extending in a direction traverse to the length of the body and towards the second connector part when said first connector part is moved towards the second connector part and into the engaged position. The conductive components on each of the first and second connector parts electrically connect to each other to form an electrical path between the illumination source and an external AC power supply as an incident of the connector parts being moved into the snap-fit engaged configuration. This previously proposed snap-fit connector system addresses some of the problems associated with the use of conventional tombstone type lamp holders for securing LED tube lamps to lighting fixtures. However, it too is configured for only traditional means of powering LED light engines from AC line power, and is not adapted to communicate both power and data using Ethernet or any other integrated power and data distribution standard.

Accordingly, known implementations of PoE LED overhead lighting for replacing fluorescent tube lighting are architected around integrated LED fixtures as the powered devices. In such systems, each integrated LED fixture is provided with a standard Ethernet jack, typically a RJ-45 jack for accepting an RJ-45 Ethernet cable plug. The LED fixture as a unit thus becomes a plug-and-play device with its own address. Power and data communication are provided to the fixture as a unit, which distributes the power internally to individual LEDs and other components using internal circuitry. As previously explained, such integrated LED fixtures utilize LED strips rather than conventional tube lamp form factors, and eliminate the numerous advantages of the LED tube form factor. In particular, installing an integrated PoE enabled LED fixture entails significant expense compared to simply replacing individual fluorescent tubes with replacement LED tubes. The expense of removing and disposing of existing fluorescent lighting fixtures and altering the current fixture design and layout may substantially offset the cost savings associated with these promising means of powering LED lighting. Integrated LED fixtures also constrain the property owner to the technology available at installation, making it more difficult and expensive to upgrade as communication, sensor, control and other technologies improve.

LED lighting systems built as an assemblage of integrated LED fixtures suffer from these and other disadvantages not only in conventional lighting applications, such as commercial buildings and schools, but also in more specialized contexts such as horticultural lighting systems. These systems are used in greenhouses or other environments where living organisms are irradiated with light to support plant growth. Indoor commercial plant farms are now producing fruits, vegetables and grains within urban areas, reducing transportation costs and carbon footprint in addition to minimizing land usage. Whether in a greenhouse setting requiring supplemental light or an indoor setting relying completely on artificial light, LED lighting has the potential to significantly reduce the electrical cost for greenhouse operators and indoor farmers. Furthermore, research into how specific spectral bands are primarily responsible for different stages of the horticultural growth cycle has made LEDs an even more attractive lighting option. It is believed that a broad-spectrum source, such as a sodium lamps, essentially wastes energy producing radiation in portions of the spectral band such as green, which has been shown thus far to have minimal to no benefit to plant growth.

It has been shown that LEDs can significantly stimulate plant growth while reducing energy consumption. The light engines typically deployed in LED horticultural systems are integrated LED fixtures and lack the lamp form factor. One known manufacturer has marketed an LED tube lamp for replacing powered fluorescent tube lamps in an AC powered horticultural lighting systems. The lighting systems for which the lamp is intended do not deploy PoE technology. The applicant is not presently aware of any horticultural lighting system designed to be powered and controlled using the capabilities of PoE or any other standardized power and data technology.

There is a need for LED lighting that provides the benefits of PoE technology in the linear tube format that is widely deployed throughout the lighting industry. As used herein, the terms "LED tube lamp" and "linear LED lamp" and similar variants are used interchangeably to describe LED lamps having at least one LED board mounted on an externally exposed heat sink having a narrow and elongated overall profile and with optional elongated optical lens, and designed for removable mounting to a variety of lighting fixture housings. While the overall form factor of such lamps is ordinarily generally similar to that of conventional fluorescent tube lamps, the use of these terms is not intended to limit the scope of the disclosed or claimed subject matter to lamps having any particular lateral cross-sectional shape or to require a fully enclosed outer tubular structure. As will be apparent from the disclosure herein, these terms are also intended to encompass variants of such lamps designed to be removably mounted directly to a ceiling grid or other support structure. These terms, however, are to be distinguished from integrated LED lighting fixtures in which LED boards and heat sink components are mounted to an outer fixture housing in the absence of a removable modular LED light engine lamp component. While PoE enabled LED fixtures are appropriate for certain installations, systems that enable individual LED tube lamps to directly connect as managed nodes of an Ethernet LAN would allow for numerous possibilities for the next phase of power and controls for commercial and residential lighting. The present invention is directed to safe, reliable, convenient and cost-effective solutions that will allow the benefits of PoE LED lamp technology to be fully realized in the LED tube format, greatly expanding the potential benefits of, and applications for, PoE enabled LED lighting.

Still another problem in the lighting industry are the difficulties and costs associated with proper design and control of emergency lighting circuits. Emergency lighting systems are required by a myriad of municipal, state, federal or other codes and standards. These systems are intended to automatically supply illumination to designated areas and equipment in the event of failure of the normal power supply, to protect people and allow safe egress from a building, and to provide lighting to areas that would aid rescuers or repair crews. These systems are typically required by regulation to be available within a short time (e.g. 10 seconds) after failure of normal power, and emergency circuits must be physically separated from all other circuits all the way to the terminations and the source. Other standby systems, although not legally required, may be desirable to provide lighting to prevent discomfort or serious damages to a product or process.

The proper design and control of emergency lighting circuits in compliance with the many standards and codes that may apply to a given site installation has long presented difficult challenges for manufacturers, systems integrators and electricians and engineers. As a result, a number of approaches to designing emergency or standby lighting circuits have been attempted. One known approach involves providing a number of emergency-only luminaires dedicated to providing minimum illumination levels and powered by a dedicated emergency breaker panel fed from a generator or uninterruptable power supply (UPS). An uninterruptible power supply is an electrical apparatus that provides emergency power to a load when the input power source, typically mains power, fails. A UPS differs from an auxiliary or emergency power system or standby generator in that it will provide near-instantaneous protection from input power interruptions, by supplying energy stored in batteries or a flywheel. Regardless of the source of back-up power, the emergency fixtures remain dark when normal power is present, and are energized when the control circuit detects failure of the normal power supply. This approach entails the potentially high cost of the emergency system equipment and may be visually unappealing as result of excess luminaries which are not illuminated during normal conditions.

Another approach involves self-contained battery pack emergency lights, which contain a battery, a charger, and a load control relay. These units are connected to normal power, which provides a constant charging current for the battery. During a power failure, the load control relay energizes the emergency lights. This approach avoids the need to deploy physically separated emergency circuits, but is typically implemented in aesthetically unpleasing forms resembling a car headlight battery pack unit. Still another approach uses the same light fixture for both normal an emergency use. The lights are fed using the normal breaker panel and wall mounted switch during normal operation. When power fails, an emergency transfer circuit transfers the breaker panel feed to an emergency power source, and bypasses the wall switch to force the load on the lights regardless of the wall switch position. Although such systems offer aesthetic advantages, they are expensive and complex to design and install. Other known approaches suffer similar drawbacks.

It is therefore desirable to provide improved LED lamps and associated connector systems which overcome some, if not all of the proceeding problems and disadvantages.

BRIEF DESCRIPTION OF THE DRAWINGS

FIG. 4A is side perspective view of the PoE snap-fit connector assembly of FIGS. 3A and 3B, and showing a proximal base end for mounting to a lighting fixture, a mid-portion including a snap-fit actuator assembly and extending to a distal tip portion configured as integral Ethernet plug;

FIG. 4B is right side view of the PoE snap-fit connector assembly of FIG. 4A;

FIG. 4C is an end view of the PoE snap-fit connector assembly, and showing an integral standard Ethernet jack accessible through an end-wall of the base end of the connector;

FIG. 12A is side perspective view of an embodiment of a PoE enabled snap-fit connector assembly, and showing a proximal base end for mounting to a lighting fixture, a mid-portion including a snap-fit actuator assembly and an Ethernet jack accessible from a sidewall thereof, and also having a distal tip portion configured as integral Ethernet plug;

FIG. 12B is right side view of the PoE snap-fit connector assembly of FIG. 12A;

FIG. 23 is a perspective view of a linear LED lamp, and shows cooperating connector assemblies at opposite ends of the lamp body, with the connector assembly at one end comprising a PoE enabled sleeve adaptor configured to provide integrated power and data at one end of the lamp;

FIG. 24 is an enlarged perspective view of the PoE enabled sleeve adaptor of FIG. 23, showing an Ethernet cable plug connected to an integral jack at a base end of the sleeve adaptor and including a male Ethernet plug extending within the sleeve receptacle of the adapter;

DESCRIPTION OF THE PREFERRED EMBODIMENTS

Figure 1A:
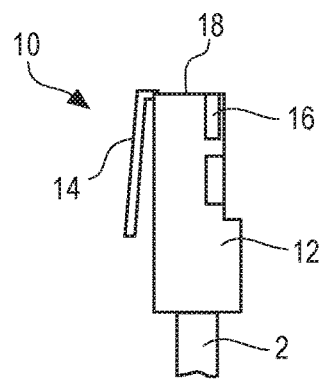
FIG. 1A is a side perspective view showing a standard male connector plug at an end of an Ethernet cable.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices, and such further applications of the principles of the invention as illustrated herein are contemplated as would normally occur to one skilled in the art to which the invention relates.

Figure 1B:
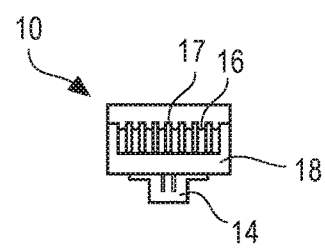
FIG. 1B is an end view of the connector plug of FIG. 1A and showing exposed electrical pins of the plug.
Figure 1C:
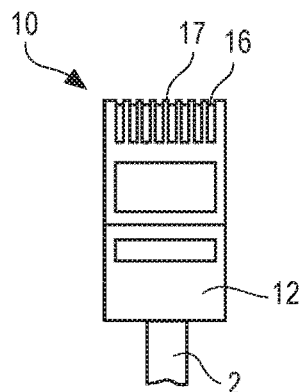
FIG. 1C is a top view of the connector plug of FIG. 1A.
Figure 2A:
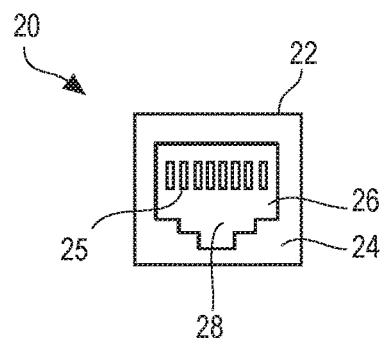
FIG. 2A is an end perspective view showing a standard female jack including an opening for receiving the male connector plug of FIGS. 1A-1C and contacts for engaging the electrical pins of the plug.
Figure 2B:
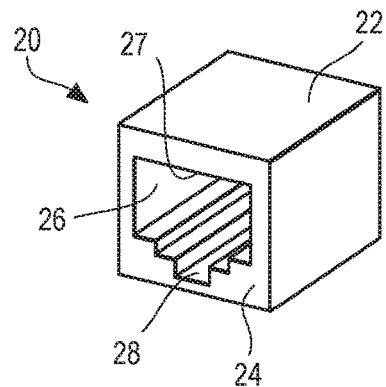
FIG. 2B shows a perspective view of the jack of FIG. 2A.

By way of additional background, FIGS. 1A to 1C illustrate a prior art, standard male plug for twisted pair Ethernet cables. The plug 10 comprises plastic, generally rectangular body portion 12 of standardized dimensions allowing for insertion into standardized female connector jacks. FIGS. 2A and 2B shows show a prior art, standard female jack 20 of the type commonly incorporated into walls, computer equipment, patch panels and other devices. The jack 20 comprises housing 22 having outer sidewalls, and with an opening 27 through the proximal end wall 24 providing access to internal receptacle 26, which is sized to receive a portion of body 12 of plug 10. The plug 10 includes spring-loaded tab 14, which sits in groove 28 of the receptacle when plug 10 is inserted into jack 20. The tab depresses as the plug is inserted through in initial insertion position into receptacle 26 until it snaps back to its natural position to lock plug 10 in the receptacle and prevent the plug from backing out of jack 20. The tab 14 is depressed to release the plug 10 from jack 20.

The body 12 of plug 10 houses metallic contacts 16 located at discrete positions between a series of fingers 17 of body 12 near the leading edge 18 of the plug. The particular plug illustrated provides eight positions, each containing a contact, which is representative of the conventional RJ-45 plug commonly used to terminate twisted pair cable in Ethernet networks. As mentioned above, other modular plugs containing 4, 6 and 10 positions, and varying numbers of contacts, are also available and known to those skilled in the art. Cable 2 comprises four pairs of twisted wire (8 wires in total). Each contact 16 is connected to an individual wire by crimps (not shown) internal to the body 12, with the wires of each pair connected to adjacent contacts. Such cables are available with the plugs preinstalled. The plug may also be connected to an end of standard twisted pair cable using a conventional crimping tool familiar to those skilled in the art.

Jack 20 contains internal metallic contacts 25 extending into the receptacle 26 from the distal end thereof. The contacts 16 of plug 10 have exposed portions between the intermittent fingers 17. When plug 10 is seated in the locked position within jack 20, the contacts 16 come into engagement with corresponding contacts 25 of jack 20 to form electrical connections. The jack 20 also includes electrical leads for transmitting signals between contacts 25 and components external to the jack.

Standardized modular cable plugs and jacks of the type illustrated provide a convenient and effective means for connecting devices to computer networks and extending cable lengths within the network. As mentioned above, jacks are commonly found in wall and patch panels, and integrated into devices such as phones, PCs, laptops and servers that tend to be supported in a stationary manner on tables, desks, computer racks, etc. These available Ethernet connectors resist the plug backing out of the jack via the tab latching mechanism described above. However, they are not designed to bear significant weight or to withstand significant tension on the cable. The tabs themselves are somewhat fragile and are susceptible to shearing off under the strain of repeated use. Once a cable is plugged into a jack, significant tension applied to a cable can cause the connection to fail, either by tab breakage causing the plug backing out of the jack, or by failure of the internal crimp connections resulting in separation of the cable and plug.

FIGS. 3A, 3B, 4A, 4B and 5 illustrate a novel network operable linear LED lighting system. The system includes connector assemblies designed to securely mount networkable linear LED lamps to conventional tube lamp lighting fixtures or other support housing and to provide integrated Ethernet power and data connectivity to internal components of the lamps. The disclosed system includes a network enabled snap-fit connector assembly mounted to a lighting fixture and configured to receive a male Ethernet plug at a proximal base end thereof, to secure the end cap of a linear LED lamp to the lighting fixture using a snap-fit connection, and to provide Ethernet power and data connectivity to the lamp. The disclosed connector system provides the advantages of integrated power and data capabilities and Ethernet standardization to individual linear LED lamps. This novel lighting system is described more fully below.

Figure 3A:
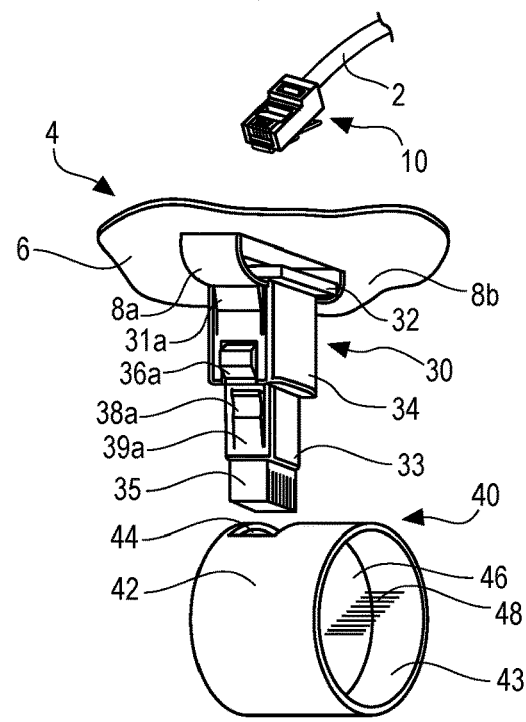
FIG. 3A is a perspective view of PoE snap-fit connector assembly mounted to a lighting fixture and configured to receive a male Ethernet connector plug at a proximal base end thereof, to secure the cylindrical end cap of a linear LED lamp to the lighting fixture using a snap-fit connection, and to provide Ethernet power and data connectivity to the lamp.
Figure 3B:
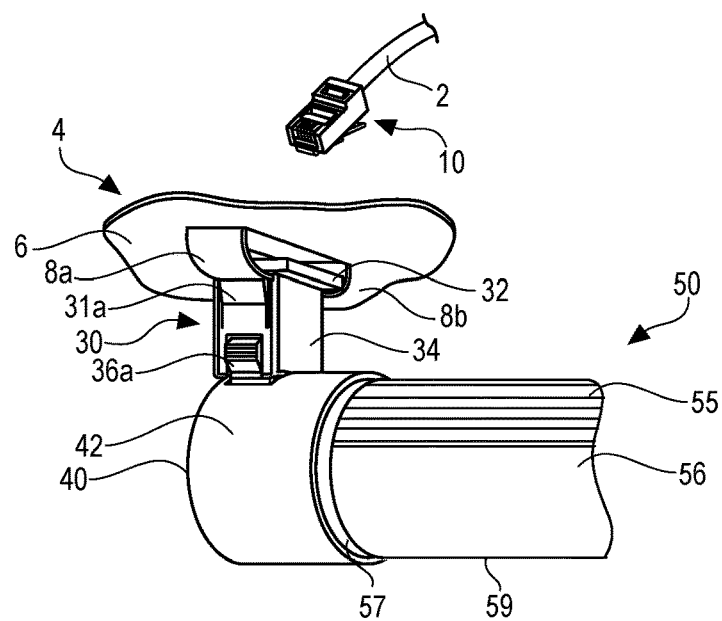
FIG. 3B is a view as in FIG. 3A with the Ethernet connector plug, PoE snap-fit connector assembly, lamp end cap and cylindrical tubular lamp body joined in an assembled configuration.

As shown in FIG. 3B, connector systems contemplated by the invention permit installing an Ethernet network compatible linear LED lamp 50 into a lighting fixture comprising a support 4. The lamp 50 comprises an elongate body portion 59 including a metallic heat sink 55 extending throughout a generally upward facing portion of the circumference of the body 59, and a transparent or translucent lens portion 56 attached to the heat sink and extending throughout a generally downward facing portion of the circumference of the body 59. The heat sink is formed of a thermally conductive material such as aluminum alloy to dissipate heat to the atmosphere. As illustrated in the cross-sectional view provided in FIG. 5, lamp 50 includes at least one LED emitter panel 52 comprising a printed circuit board (PCB) mounting a series of LEDs 54 providing a source of illumination. The emitter panel 52 is mounted to the heat sink internal to the tubular body 59. Heat generated by the LEDs conducts through the emitter panel to the heat sink. The PCB may also include other electronic components, such as one or more communication modules, control circuits, sensors, microprocessors, controllers, wireless transceivers, cameras, battery back-up circuits, emergency lighting circuits, or other devices incorporated into modern smart LED lighting assemblies. These additional components may be provided on the same PCB board on which the LEDs are mounted or on one or more separate PCB boards. The present invention contemplates providing integrated power and data connectivity supporting a wide variety of network compatible smart LED tube lamp designs, componentry, capabilities and performance characteristics.

Connector 30 is configured to maintain the first end 57 of lamp 50 in an operative state on the support 4 while also providing for standardized Ethernet connectivity between a LAN and the internal components of the lamp. Connector 30 may be formed of plastic and may be manufactured using conventional injection molding techniques. The support may be in the form of a reflector of a conventional tube lighting fixture having reflective surface 6, or otherwise configured. The connector 30 is configured to engage a first end cap assembly 40 that is provided at the first end 57 of lamp 50. As shown in FIGS. 3A and 4A, connector 30 has base portion 34 and a narrowed leading end portion 33. Flange 32 extends around the periphery of the base portion at a proximal end thereof. Flanges 31a and 31b extend outwardly from opposite sidewalls of base portion 34 and define slots between the flanges 31a, 31b and the peripheral flange 32. Reflector tabs 8a, 8b extending from reflective surface 6 of support 4, as illustrated in FIG. 3A, cooperate with the slots. That is, the tabs 8a, 8b are formed so that they can slide through the slots whereby the connector 30 and support 4 can be press connected starting with these parts fully separated from each other. A simple sliding movement lengthwise of the body of the lamp will fully seat the tabs 8a, 8b that become frictionally held in the slots.

As shown in FIG. 3A, first end cap assembly 40, which mates with the connector 30, consists of a first cup-shaped receptacle 43 into which the first end 57 of the lamp body 59 extends. The connector 30 is shown in a position fully separated from the first end cap assembly 40. In FIG. 3B, the connector 30 is shown after the first end 57 of lamp 50 has been moved relative to the connector part 30 from the fully separated position in a substantially straight path, transverse to the length of the body 59, into the engaged position. To make this interaction possible, the first end cap assembly 40 has an opening 44 through an upward facing surface of wall 42 bounded by an edge. Leading end portion 33 of connector 30 has a narrowed profile to permit the leading end to insert into opening 44. The leading end portion 33 has deployable parts 38a, 38b formed on opposite sides thereof. The connector 30 is configured so that each deployable part 38a, 38b is engaged by the edge of the opening 44 and progressively cammed from a holding position, as shown in solid lines in FIG. 4A, towards an assembly position, as shown in dotted lines in FIG. 4A, as the first end cap assembly 40 is moved upward to and into the engaged position. Each first deployable part 38a, 38b moves from the assembly position back towards the holding position with the first end cap assembly realizing the engaged position. Portions of wall 42 at the edge of opening 44 reside captively between opposed surfaces of the first deployable parts 38a, 38b and base portion 34 of connector 30 in the engaged position. This provides a secure and reliable mechanical connection between the support and the lamp capable of holding the weight of LED tube lamps of various sizes and to withstand sudden forces such as during earthquake or other emergency conditions.

The connector 30 also provides a convenient mechanism for disengaging the lamp 50 from the connector, as may become necessary to inspect or replace the lamp. As shown in FIGS. 3A and 4A, first deployable part 38a may be joined to the leading end portion 33 of connector 30 through a live hinge 39a. The second deployable part 38b is connected to the leading end portion in a like manner. Connector 30 has actuators 36a, 36b connected to the deployable parts 38a, 38b on opposite sides for causing the corresponding deployable parts to shift back and forth between the engaged and assembly positions. The actuators can be pressed inwardly towards each other with the first end cap assembly 40 in the engaged position, thereby to move the first deployable parts 38a, 38b towards their assembly position, to allow them to pass through the opening 44 so that first end cap assembly 40 can be separated from connector 30. Thus, the actuators 36a, 36b are situated so that the installer can grip and squeeze the actuators, as between two fingers, towards each other, thereby shifting both deployable parts 38a, 38b from their holding positions into their assembly positions.

Figure 5:
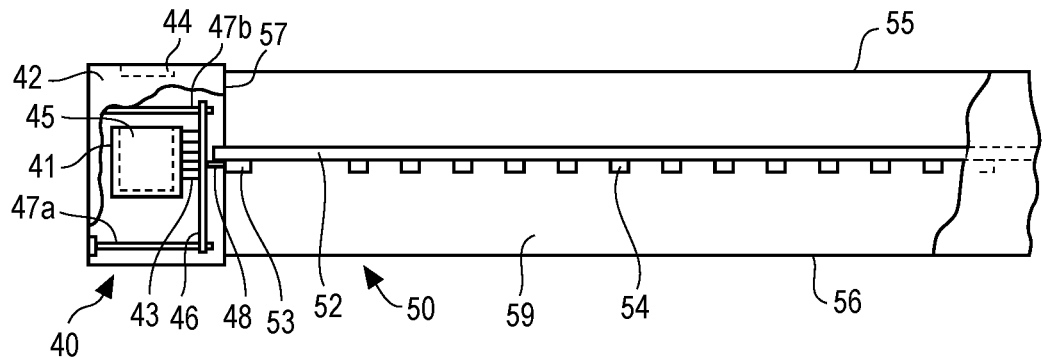
FIG. 5 is a cross-sectional view of a cylindrical linear LED lamp, and showing an end cap assembly comprising an Ethernet jack mounted to a vertically oriented PCB connector board for receiving the terminal plug end of a PoE snap-fit connector and transferring power and data between a network and internal components of the lamp.

Details of the internal components of end cap assembly 40 of LED tube lamp 50 will now be described. The end cap assembly interacts with a corresponding snap-fit connector in the manner described while also providing a communications port enabling the lamp 50 to become a device of an Ethernet computer network. As shown in FIG. 5, the assembly includes connector board 46, which is a PCB. In this embodiment, connector board 46 is secured in a vertical orientation within the end cap assembly by horizontally extending posts 47a, 47b. The invention contemplates that the connector board may be mounted within the end cap assembly using any available means. Connector board 46 is in electrical communication with components internal to the body 59 of lamp 50 by pins 48 and connector 53. The connector 53 may be pinned to the LED emitter board, as shown in FIG. 5, or to a separate PCB board mounted within the lamp body. Connector board 46 thus provides connections for transmitting power and data signals between electrical components within the end cap assembly and one or more components within the body 59 of LED tube lamp 50. It eliminates soldered wire connections, which are labor intensive and prone to failure. Connector board 46 supports a modular plug and play approach to connecting the various internal componentry associated with linear LED lamps equipped with modern smart lighting functionality.

FIG. 5 also depicts jack 41 mounted to connector board 46 by pins 43, which may be a standard Ethernet jack compatible with 8P8C RJ-45 type plugs or another available standard Ethernet plug. The jack 41 is orientated with its internal receptacle 45 opening upward towards the opening 44 in wall 42 of the first end cap assembly. Receptacle 45 is generally aligned with the opening 44. End connector board 46 may also include an Ethernet controller for facilitating integrated power and data communication between lamp 50 and external devices of the LAN using standard Ethernet protocols. Other circuit modules may also be mounted on the connector board to support the functionality of a particular lamp. Ethernet control components and other circuitry associated with power and data communications of the lamp may alternatively be mounted within the lamp body.

FIGS. 4A to 4C depict alternative views of the connector 30 of FIGS. 3A and 3B. FIG. 4C shows a view of the end wall of connector 30 that includes flange 32 and faces support 4 when connector 30 is mounted to the support. Jack 37 is internal to base portion 34 of connector 30 and oriented with its receptacle accessible through the end wall. In the embodiment shown, jack 37 is a standard Ethernet jack having internal leads 37a and adapted to receive an RJ-45 type plug, such as plug 10 terminating twisted pair cable 2 shown in FIG. 3A, to connect the connector 30 to a LAN.

The opposite leading end portion 33 of the connector 30 includes an integral Ethernet compliant plug 35 at its tip, as shown in FIGS. 3A, 4A and 4B. A series of conductive leads (not shown) extend internal to connector 30 to connect the leads of jack 37 to corresponding contacts of plug 35. The plug 35 is compatible with internal jack 41 of first end cap assembly 40, and electrically connects to the jack when first end cap assembly 40 and connector 30 are in the fully engaged position. In a preferred form, the plug 35 does not have a flexible latching tab, which is unnecessary because the snap-fit connection between the connector 30 and first end cap assembly 40 retains the plug 35 firmly seated in the receptacle 45 and prevents the plug 35 from backing out of the jack. By omitting a latching tab, the plug 35 is easily removed from jack 41 when the connector 30 and lamp 50 are disengaged by operation of the actuators 36a and 36b in the manner described above. As an alternative to the illustrated mounting location of jack 37 within the base portion of connector 30, the jack may be provided at the end of a short length of cable that extends from within the connector 30 and external thereof, with the cable operatively connecting the jack to the internal conductive leads of connector 30.

The connector 30 thus serves the dual functions of providing a mechanical connection to securely mount an LED tube lamp to a support, and also providing for integrated power and data connectivity between the LAN and internal components of the lamp. Specifically, connector 30 receives power and data signals through plug 10 and transmits the signals through the jack 37 and internal leads of the connector body to the leading end plug 35, and ultimately to jack 41 of first end cap assembly 40. The signals are further communicated through pins 43, connector board 46 and pins 48 to connector 53 internal to lamp body 59, from where they are further distributed to the LED emitter circuits and other internal components or circuitry of lamp 50. Connector 30 may also communicate power and/or data signals emanating from internal components of the lamp 50 over the reverse path to the LAN.

The connector 30 advantageously decouples the function of securing the lamp to the support from the function forming a network connection between the lamp and the external LAN. In particular, the snap-fit mechanical connection between the deployable members 38a, 38b and wall 42 of first end cap assembly 40 firmly secures an end of the lamp 50 to the support. Therefore, it is not necessary for plug 35 and jack 41 to engage each other in a manner that forms a strong mechanical connection between those two components. Thus, the PoE enabled snap-fit connector 30 enables the use of standard compliant Ethernet plugs and jacks for bringing integrated power and data connectivity to individual LED tube lamps, while overcoming the mechanical limitations of such standard Ethernet connectors that would otherwise make them unsuitable for weight bearing applications. The connector system disclosed herein also overcomes the drawbacks of the conventional bi-pin lamp end caps and tombstone lamp holders discussed above, which are not only not well-suited for LED tube lamp systems, but are incapable of transmitting integrated power and data according to Ethernet or any other integrated power and data standard.

In conventional linear LED tube lamps, the heat sink is typically fabricated of an electrically conductive metallic material such as aluminum or aluminum alloys. These materials dissipate heat efficiently without a significant increase in surface temperature. The heat sink itself, as well as the printed circuit LED boards and other electrical components within the lamp, present a safety hazard in AC-powered systems without proper electrical grounding. This is because the line voltage or voltage input to the LED boards could be applied to the heat sink in the event of a short circuit, for example, if the insulation between the LEDs and/or internal driver circuitry and the heat sink is inadequate or deteriorates during use. This could lead to other components within the assembly overheating and creating a fire hazard. It also creates an electrical shock hazard should the user come into physical contact with the heat sink when inspecting the installed lamp. The electrical components within the lamp, such as LEDs and driver circuits, are also susceptible to being damaged in the event of a power surge. Because the lighting system of the present invention allows for powering the lamps using low voltage DC power instead of much higher AC line voltage, grounding the heat sink is not critical. Such low voltage DC power does not present an appreciable risk of electric shock or fire or damage to internal lamp electronics. In addition, standard Ethernet cabling and connectors include dedicated ground wire/pins providing ground protection to internal components of the LED lamp.

In one aspect of the invention, LED lamps are configured to receive and/or transmit power and/or data at both ends of the lamp. An end cap assembly 40 may be provided at each end of the lamp for this purpose. For example, such a lamp may receive power and data at one end and provide power and/or data to another similarly configured lamp connected in series by a jumper Ethernet cable. Single end power LED tubes lamps having only one end configured to connect to the LAN are also contemplated. The connector 30 may be used at the powered end of the lamp. The opposite, no power end of the lamp may be secured to the support using a modified connector having comparable snap-fit connector components but omitting the integrated Ethernet jack at the base end and Ethernet plug at the leading end. The end cap assembly at the opposite second end of such a lamp need not include an internal jack or end board connector, and serves mainly to receive the leading end portion of the connector through a suitable opening and form a secure snap-fit connection with the connector.

By eliminating the bi-pins of traditional fluorescent tube lamp designs and expanding the end cap into the region formerly occupied by the bi-pins, the invention allows network compatible linear LED lamps of a variety of particular design formats to be produced. The expanded size end cap assembly provides a relatively large enclosure for housing necessary electrical components, offering an optimal degree of design flexibility to the manufacturer. In particular, the disclosed end cap assembly can accommodate one or multiple PCB connector boards of a variety of sizes, which can be mounted in either a vertical or horizontal orientation. The interior region also provides sufficient space to mount off the shelf or customized Ethernet jack modules at a position that does not interfere with the snap-fit mechanism of the disclosed connectors. Associated circuitry, such as chipsets designed to implement standardized Ethernet communication protocols, may be included on a PCB within the end cap assembly or within the lamp body.

As the above embodiment illustrates, the snap-fit connector mechanism and lamp end cap assembly interact through linear motion of the lamp. That is, the installer moves each lamp end upwards towards a pre-mounted connector so that the leading end portion of the connector inserts linearly into the end cap opening causing deployable parts of the connector to deflect to the assembly position and then return to the fully engaged position, as previously explained. Installation does not involve rotating the lamp about its longitudinal axis, as is required with traditional exposed bi-pin tube lamps. Modular Ethernet plug and jack connectors also interconnect linearly and without rotating one component relative to the other, i.e., the plug inserts in a straight path into the jack receptacle causing the components to latch together. The disclosed connector system thus provides for both mechanical and network communications connections to be secured in a single action.

Figure 6:
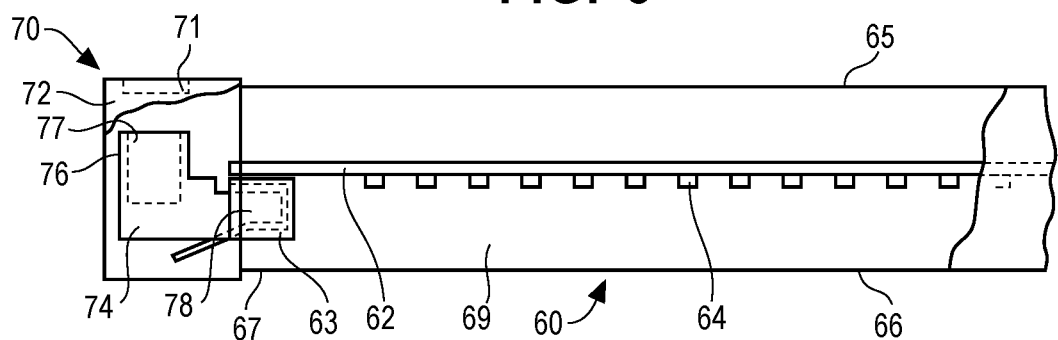
FIG. 6 is a cross-sectional view of an embodiment of a cylindrical linear LED lamp, and showing an end cap assembly comprising an L-shaped adapter providing an Ethernet jack at one end for receiving the terminal plug of a PoE snap-fit connector and a male plug at another end for mating with a female jack mounted to a PCB board of the lamp and transferring power and data between a network and internal components of the lamp.

FIG. 6 illustrates another embodiment of an LED tube lamp adapted for PoE implementation. The illustrated lamp 60 has a cylindrical tube format similar to the previously described lamp 50. The lamp 60 has an elongate body portion 69 including a metallic heat sink 65 extending throughout a generally upward facing portion of the circumference of the tubular body 69. A transparent or translucent lens portion 66 is attached to the heat sink and extends throughout a generally downward facing portion of the circumference of the tubular body 69. At least one LED emitter panel 62 is mounted to head sink 65 and includes a series of LEDs 64 providing a source of illumination.

The lamp 60 differs from lamp 50 primarily in the configuration of its end cap assembly. As shown in FIG. 6, end cap assembly 70 has a generally cylindrical configuration with sidewall 72 defining opening 71 facing upward towards the support of a lighting fixture. End cap assembly 70 includes a female-to-male adapter module 74 having generally L-shaped body configuration. Such adapters are available from sources such as Atlantic Computer Tech, Inc. (www.cablesonline.com). The adapter 74 includes an Ethernet jack 76 having a vertically oriented receptacle 77 accessible through an opening that is generally aligned with opening 71. Adapter 74 also includes a horizontally extending Ethernet plug 78. The leads of jack 76 and corresponding contacts of plug 78 are connected via internal leads of adapter 74 (not shown). Ethernet jack 63 is connected by pins to a PCB board internal to body 69 of lamp 60, which may be the same board that mounts the LED emitters or a separate board. The plug 78 of adaptor 74 is configured to insert within jack 63 for transmitting power and data using Ethernet protocols between the end cap assembly 70 and internal components of lamp 60. An Ethernet controller (not shown) is also provided for facilitating integrated power and data communication between lamp 60 and external devices of the LAN. Such Ethernet control components and other circuitry associated with power and data communications of the lamp may be mounted in the end cap or within the lamp body as would be recognized by those skilled in the art.

The lamp 60 is adapted to form a snap-fit connection to connector 30 in essentially the same manner described above with reference to lamp 50. The plug 35 of connector 30 is compatible with the female jack 76 of adaptor 74 such that lamp 60 may be connected to a LAN for integrated power and data control through the connector 30. The snap-fit connection holds the lamp securely in place on a support and maintains the connection between plug 35 and the female jack 76 of adaptor 74. In this embodiment, the communication path for power and data signals extends from the connector 30 and through the adaptor 74 to the jack 63, which distributes the signals to other components internal to the lamp 60. The system may similarly transmit power and data signals emanating from the lamp 60 through the reverse path.

Figure 7:
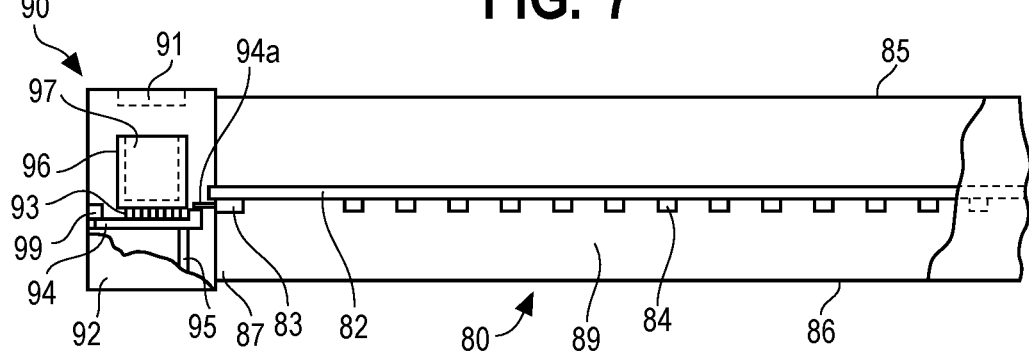
FIG. 7 is a cross-sectional view of an embodiment of a cylindrical linear LED lamp, and showing an end cap assembly comprising an Ethernet jack mounted to a horizontally oriented PCB connector board for receiving the terminal plug end of a PoE snap-fit connector and transferring power and data between a network and internal components of the lamp.

FIG. 7 illustrates another embodiment of a cylindrical linear LED lamp adapted to be used in a networked lighting system. The lamp 80 has an end cap assembly comprising an Ethernet jack mounted to a horizontally oriented PCB connector board for receiving the terminal plug end of a PoE snap-fit connector and transferring power and data between a network and internal components of the lamp. The lamp 80 includes body portion 89 including a metallic heat sink 85 extending throughout a generally upward facing portion of the circumference of the tubular body 89, and a transparent or translucent lens portion 86 attached to the heat sink and extending throughout a generally downward facing portion of the circumference of the tubular body 89. At least one LED emitter panel 82 is mounted to heat sink 65 and includes a series of LEDs 84 providing a source of illumination.

The lamp 80 includes first end cap assembly 90 into which a first end 87 of body portion 89 inserts. The assembly includes PCB connector board 94, which is mounted in a horizontal orientation within the end cap assembly. One end of the connector board 94 is supported within an internal groove 99 of the end wall of the first end cap assembly, and the connector board is further supported by vertically extending post 95. The connector board 94 may be supported in this orientation within end cap assembly 90 using any other mounting means. Connector board 94 has pins 94a for electrically connecting to connector 83 internal to the lamp body. The connector 83 may be pinned to the LED emitter board as shown in FIG. 7, or to a separate PCB board mounted within the lamp body. The PCB connector board 94 of first end cap assembly 90 allows for multiple components within the end cap assembly to be connected to components internal to lamp 90, avoiding the drawbacks of soldered wire connections.

As shown in FIG. 7, end cap assembly 90 includes jack 96 mounted to connector board 94 by means of pins 93. The jack 96 is a standard Ethernet jack compatible with plug 35 of connector 30. The jack 96 is positioned such that the internal receptacle 97 opens upwardly towards and is generally aligned with opening 91 of first end cap assembly 90. End connector board 94 may also include an Ethernet controller for facilitating integrated power and data communication between lamp 80 and external devices of the LAN. Other circuit modules may also be mounted on the connector board as appropriate in a particular lamp design. Alternatively, Ethernet control components and other circuitry associated with power and data communications of the lamp may be mounted within the lamp body.

Figure 8A:
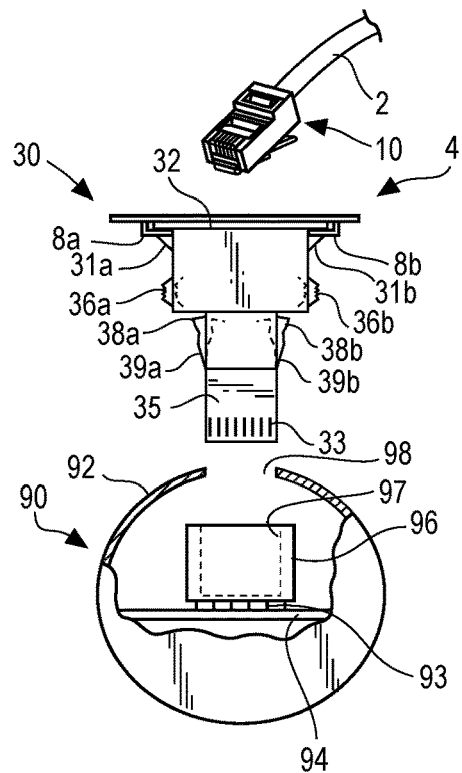
FIG. 8A is a perspective end view of the lamp of FIG. 7 with the cylindrical end cap partially cut-away, and also showing a PoE snap-fit connector assembly mounted to a lighting fixture and a male connector plug of an Ethernet LAN, with the components shown in a separated configuration.
Figure 8B:
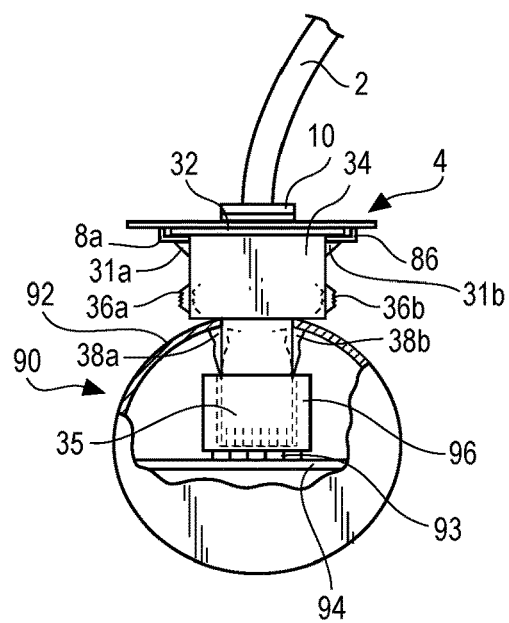
FIG. 8B is view of the components of FIG. 8A, with the lamp end cap, PoE snap-fit connector assembly and network cable joined in an assembled configuration.

The plug 35 of leading end 33 of connector 30 is compatible with the female jack 96 such that lamp 80 may be connected to a LAN for integrated power and data control through the connector 30. The lamp 80 with end cap assembly 90 as described herein is adapted to form a snap-fit connection to connector 30 in essentially the same manner described with reference to the previous lamp embodiments above. FIGS. 8A and 8B show a perspective end view of the linear LED lamp of FIG. 7 with the cylindrical end cap partially cut-away to further illustrate how the components of the PoE snap-fit connector system cooperate during lamp installation. In FIG. 8A, connector 30 is shown mounted to support 4. In this orientation, the jack 37 at the base end of the connector opens upward and is accessible to plug 10 of cable 2. The connector 30 may be connected to the LAN by inserting the plug 10 into the jack as shown in FIG. 8B. The first end of lamp 80 may be mounted to the support 4 by positioning first end cap assembly 90 immediately below the connector 30 so that the opening 98 is aligned with the downward extending plug 35 of the connector. In this separated configuration, deployable parts 38a and 38b are in the engaged position as shown by the solid lines in FIG. 8A. As the installer moves the lamp upward and leading end 33 is received within first end cap assembly 90, portions of wall 92 at the edge of opening 98 engage the deployable parts 38a, 38b and cause them to pivot inward towards their assembly position, indicated by the dotted lines, until the edge portions have advanced past the deployable parts. As the edge portions clear the deployable parts, the deployable parts pivot back to the engaged position shown in FIG. 8B to captively hold the edge portions of sidewall 92 between the upward facing surfaces of the deployable parts and the opposite wall surfaces of the base portion 34 of connector 30. This prevents the end cap assembly and the connector from separating. In this engaged configuration, the plug 35 of connector 30 is fully seated within the jack 96 as shown in FIG. 8B and is prevented from backing out of the jack receptacle 97 by the opposed surfaces of the deployable parts 38a, 38b and the edge portions of wall 92.

The snap-fit connection thus holds the lamp securely in place on the support of a lighting fixture and maintains the connection between plug 35 of connector 30 and the female jack 96. In this embodiment, the communication path for power and data signals extends from the connector 30 and through the jack 96 and PCB connector 94 to the connector 83 internal to lamp body 89, from where the signals are further distributed to other components internal to the lamp 80. The system may similarly transmit power and data signals emanating from the lamp 80 through the reverse path. Squeezing actuators 36a, 36b causes the deployable parts 38a, 38b to pivot to the assembly position shown by the dotted lines so that edge portions of wall 92 may slide downward below the deployable portions to separate the lamp from the connector 30.

Those skilled in the art will recognize from the teachings and example embodiments disclosed herein that the lamp end cap assembly may be provided in other forms compatible with the PoE enabled snap-fit connector systems of the invention. End cap assemblies of a various geometries can be manufactured to provide an upwardly facing sidewall region having an opening for receiving the leading end portion of a corresponding snap-fit connector, and with the opening sized so that an edge portion of the side wall is captured by the deployable portions of the snap-fit connector as described herein. The internal components of the end cap assembly may by arranged in various ways to position an internal jack relative to the opening so that the integral leading end plug of the snap-fit connector properly seats within the jack receptacle when the end cap assembly and connector are in the fully engaged position. The electrical path from the jack to an internal connection point of the lamp body may take on various forms, and is not limited to the specific designs of the disclosed embodiments.

Figure 9A:
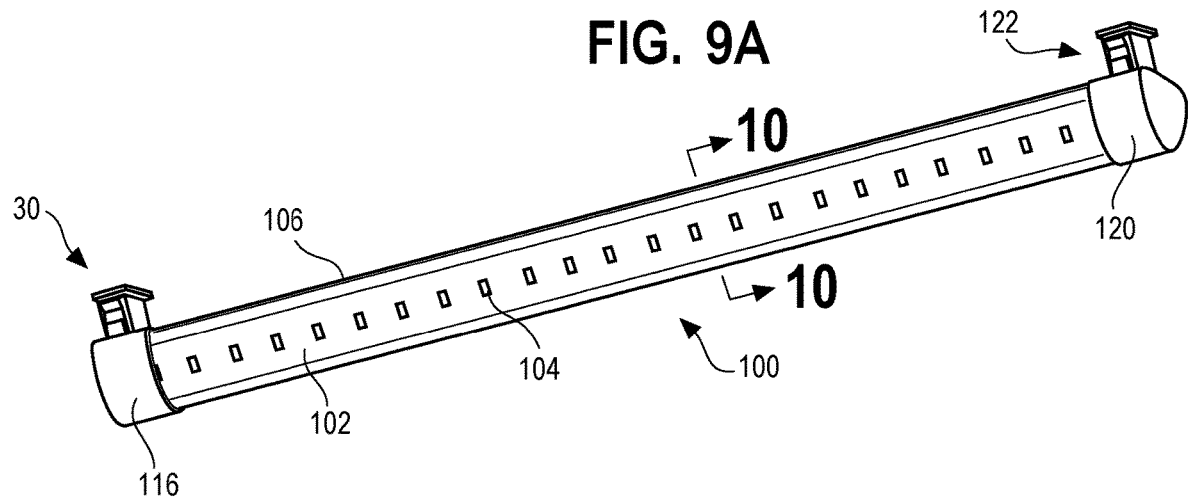
FIG. 9A is a perspective view of a linear LED lamp having a generally triangular cross-sectional shape and generally triangular end caps, and also showing snap-fit connector assemblies at opposite ends of the lamp body.
Figure 9B:
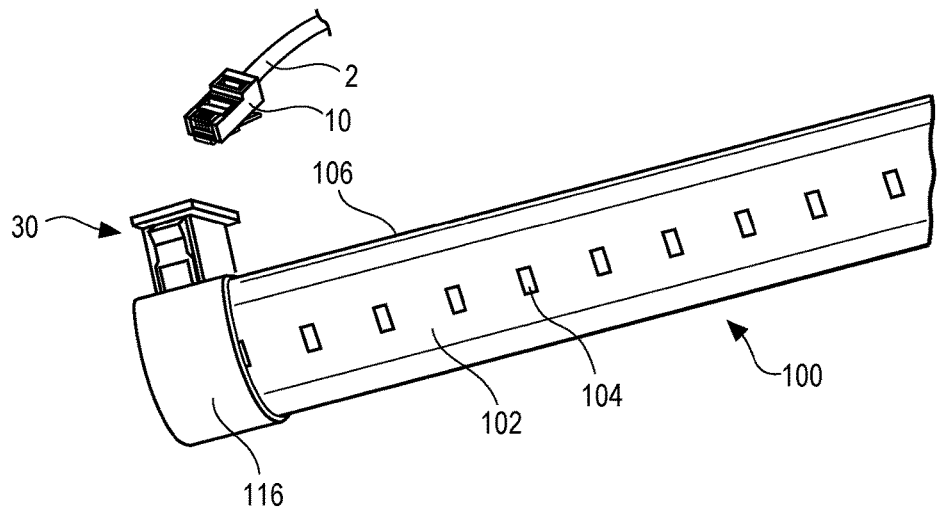
FIG. 9B is an enlarged view of one end of the lamp of FIG. 9A, and showing a PoE snap-fit connector configured to receive a male Ethernet connector plug at a base end thereof.
Figure 10:
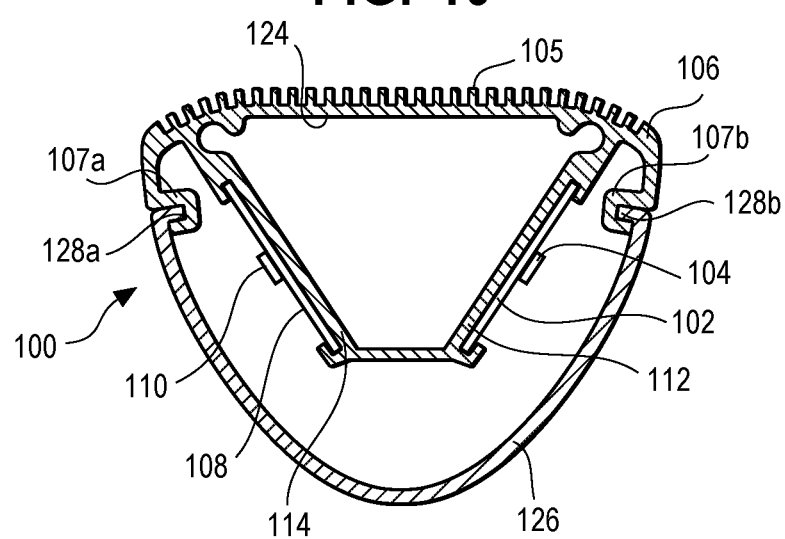
FIG. 10 is a cross-sectional view taken in a plane perpendicular to the longitudinal axis of the lamp of FIGS. 9A and 9B, and showing a generally trapezoidal, multi-sided heat sink providing support surfaces for mounting two LED emitter boards as shown, and with a light translucent lens cover joined to the heat sink.

FIGS. 9A, 9B, 10, 11A and 11B illustrate another lighting system comprising a non-cylindrical linear LED lamp 100, which is configured to be mounted to a lighting fixture using the same connector 30 described above. As is best shown in the cross-sectional view of FIG. 10, the heat sink 106 of the illustrated lamp 100 is multi-sided with a generally trapezoidal cross-sectional geometry in a plane perpendicular to the length of the lamp body. A first side 124 extends generally horizontally forming the upper surface of the lamp body in the installed configuration, and may include external fins 105 to improve heat dissipation. Angled second and third sidewalls 112, 114 provide mounting surfaces for supporting emitter panels 102 and 108 in a V-orientation such that LEDs 104, 110 arranged along the length of the emitter panels distribute light generally downward and laterally over a wide area. A generally V-shaped or U-shaped transparent or translucent lens removably attaches to the heat sink by inward projecting flanges 128a, 128b that engage and seat with external grooves 107a, 107b at opposite upper-right an upper-left corners of the heat sink. As shown in FIG. 9A, lamp 100 includes first and second end cap assemblies 116, 120 disposed at the opposite lamp ends having a corresponding generally triangular shape in a plane perpendicular to the length of the body. The lamp ends extend into a receptacle formed by the sidewalls of the end cap assemblies as illustrated.

The internal components of end cap assembly 116 in this embodiment are substantially similar to those described above in connection with the embodiment of FIG. 7, although other specific designs such as those disclosed in the embodiments of FIG. 5 and FIG. 6 could also be readily implemented in such an end cap. The end cap assembly 116, and optionally end cap assembly 120, of lamp 100 includes an internal vertically oriented Ethernet jack, which may be mounted within the end cap assembly in any known manner and connected by leads to a connection point internal to the lamp body using known techniques. In the particular embodiment shown, end cap assembly 116 includes Ethernet jack 130, which is pinned to a horizontally disposed PCB connector board 138 as shown in the cut-away view of FIGS. 11A and 11B.

Figure 11A:
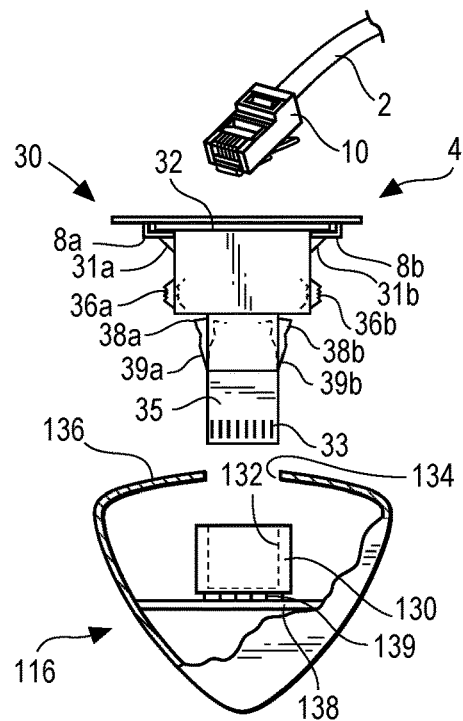
FIG. 11A is a perspective end view of the linear LED lamp of FIGS. 9A and 9B with the cylindrical end cap partially cut-away, a PoE snap-fit connector assembly mounted to a lighting fixture, and a male connector plug of an Ethernet LAN, with the components shown in a separated configuration.
Figure 11B:
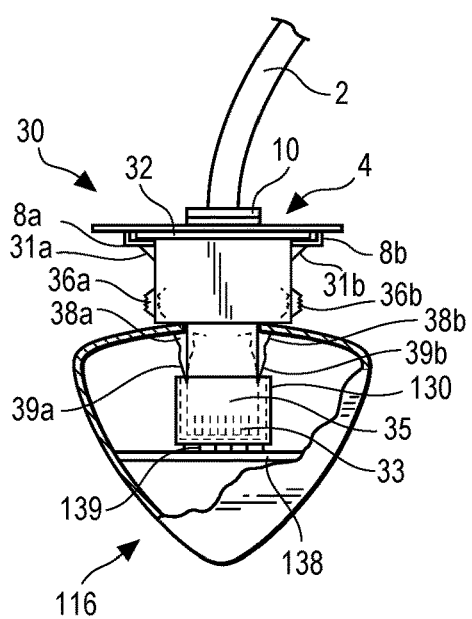
FIG. 11B is view of the components of FIG. 11A, with the lamp end cap, PoE snap-fit connector assembly and network cable joined in an assembled configuration.

FIGS. 11A and 11B show a perspective end view of the LED tube lamp of FIG. 9A with the cylindrical end cap partially cut-away to further illustrate how the components of the PoE snap-fit connector system cooperate during lamp installation. The lamp 100 may be mounted to a lighting fixture and placed in communication with a LAN utilizing the connector 30 of the present system in essentially the same manner described for the cylindrical format LED lamps above. The plug 35 of leading end 33 of connector 30 is compatible with the female jack 130. In FIG. 11A, connector 30 is shown mounted to support 4, and in this orientation the jack 37 at the base end of the connector opens upward, and plug 10 inserts into the jack as shown in FIG. 11B. The first end of lamp 100 may be mounted to the support 4 by first positioning its first end cap assembly 116 immediately below the connector 30 so that opening 134 is aligned with and opposes the downward extending plug 35 of the connector. In this separated configuration, deployable parts 38a and 38b are in the engaged position as shown by the solid lines in FIG. 11A. As the installer moves the lamp upward and leading end 33 is received within first end cap assembly 116, portions of wall 136 at the edge of opening 134 engage the deployable parts 38a, 38b and cause them to pivot inward towards their assembly position indicated by the dotted lines until the edge portions have advanced past the deployable parts. As the edge portions clear the deployable parts, the deployable parts pivot back to the engaged position shown in FIG. 11B to captively hold the edge portions of sidewall between the upward facing surfaces of the deployable parts and the opposite wall surfaces of the base portion 34 of connector 30 and prevent separation of the end cap assembly from the connector. In this engaged configuration, the plug 35 of connector 30 is fully seated within the jack 130 as shown in FIG. 11B and is prevented from backing out of the jack receptacle 132 by opposed surfaces of the deployable parts 38a, 38b and the edge portions of wall 136.

The snap-fit connection thus holds the lamp securely in place on the support of a lighting fixture and maintains the connection between plug 35 of connector 30 and the female jack 130. In this embodiment, the communication path for power and data signals extends from the connector 30 and through the jack 130 and PCB connector 138 to a connector internal to the lamp body, from where the signals are further distributed to other components internal to the lamp 100. The system may similarly transmit power and data signals emanating from the lamp 100 through the reverse path to another networked device of the LAN. Squeezing actuators 36a, 36b causes the deployable parts 38a, 38b to pivot to the assembly position shown by the dotted lines so that edge portions of wall 136 may slide downward below the deployable portions and to a position separated from the connector 30.

The format of lamp 100 supports implementing a variety of smart lighting technologies. The multi-sided heat sink 106 may house additional circuit boards containing sensors, wireless transmitters, processors and a variety of other electronic components. The planar, elongated internal surfaces of the heat sink walls provide convenient mounting locations for these components. End connector board 138 of end cap assembly 116 allows for connecting components housed within the end cap assembly with those components mounted to the heat sink. Additionally, the multiple LED emitter panel design provides for improved lighting performance and efficiency, as the LEDs may be driven at a lower voltage and still distribute an adequate amount of light to illuminate a broad area. The large number of available LEDs allows for other features, such as dedicating a subset of the LEDs to an emergency lighting circuit while the remaining LEDs are deployed for normal operation.

Figure 27A:
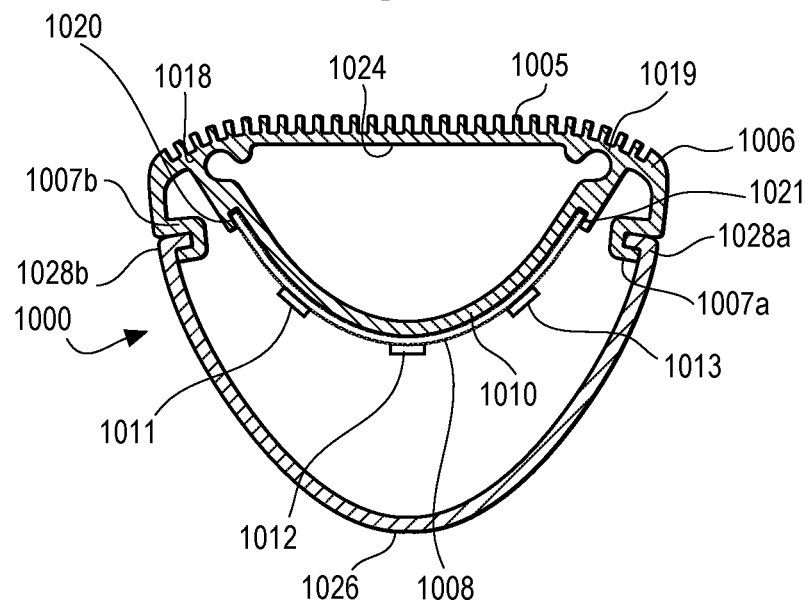
FIG. 27A is a cross-sectional view taken in a plane perpendicular to the longitudinal axis of another linear LED lamp embodiment, and showing a multi-sided heat sink providing a convexly curved support surface for mounting an arcuate LED emitter board as shown, and with a light translucent lens cover joined to the heat sink.
Figure 27B:
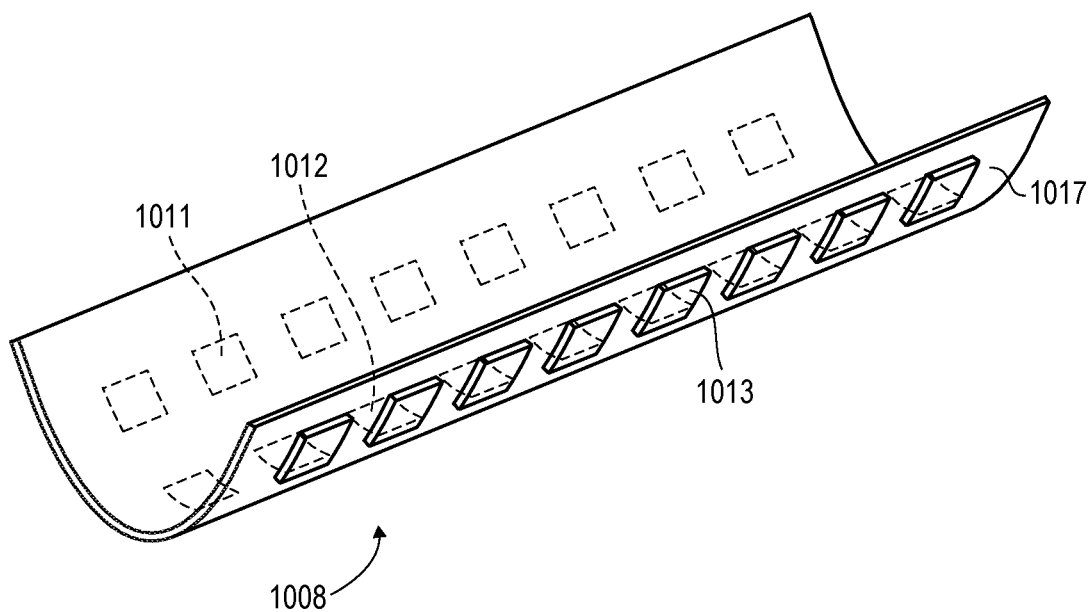
FIG. 27B is a perspective view of the arcuate LED emitter board prior to mounting to the heat sink of the lamp of FIG. 27A.

FIG. 27A shows a cross-sectional view of an alternative format that is also well-suited for implementing network addressable LED linear lamps according to the principles of the inventions disclosed herein. The heat sink 1006 of the illustrated lamp 1000 is multi-sided with a partially convexly curved cross-sectional geometry in a plane perpendicular to the length of the lamp body. A first side 1024 extends generally horizontally forming the upper surface of the lamp body in the installed configuration, and may include external fins 1005 to improve heat dissipation. An arc-shaped second side 1010 extends from the first side 1024 at opposite corners 1018 and 1019 of the heat sink. The second side 1010 has a convex outer surface providing a mounting surface for supporting LED emitter panel 1008, and a concave inner surface 1016. The first side 1024 and second side 1010 converge to provide an enclosed region internal to the lamp body. LED emitter panel 1008 comprises multiple LED emitters arranged on a PCB substrate 1017 and electrically connected in one or more circuits or subcircuits. It has a curved cross-sectional lateral profile that generally conforms to the cross-sectional lateral profile of sidewall 1010. The LED emitters are arranged in three spaced rows the substrate 1017, depicted as 1011, 1012 and 1013 respectively, which are arranged in three generally parallel rows along the length of LED emitter panel 1008. Mounting tabs 1020 and 1021 extend from corners 1018 and 1019 respectively, defining slots sized to receive edge portions of LED emitter panel 1008 to secure the LED emitter panel to mounting surface of sidewall 1010. A suitable adhesive material may be used in addition to or instead of the mounting tabs to secure LED emitter panel 1008 to the heat sink. As shown in FIG. 27A, the LED emitters of row 1012 are pointed downward along a vertical axis, and the LED emitters of rows 1011 and 1013 are pointed in opposite laterally outward directions from the vertical axis, when the lamp is in an installed overhead configuration with the first side 1024 facing upward. In this arrangement, the LED emitters distribute light generally downward and laterally over a wide area. A generally V-shaped or U-shaped transparent or translucent lens 1026 removably attaches to the heat sink by inward projecting flanges 1028a, 1028b that engage and seat with external grooves formed in mounting flanges 1007a, 1007b at opposite lateral corners of heat sink 1006.

The LED emitter panel 1008 may comprise a rigid PCB substrate material that is fabricated with an arc-shaped cross-sectional profile matched to that of sidewall 1010 or formed into such shape using a bending operation. Alternatively, the LED emitter panel 1008 may employ available flexible PCB technology, which is used in various circuit and connector applications, for example, in computer keyboards, cell phones, automotive dashboards, etc. The substrate may be formed of a flexible polymer material with a thin copper or other metal foil or film deposited on top of the substrate, from which the conductive elements of the circuit are etched. Other materials are also possible, as will be understood to persons of ordinary skill in the art.

The lamp 1000 is in other respects similar to the lamp 100, and includes first and second end cap assemblies (not shown) disposed at the opposite lamp ends thereof having a shape that conforms generally to the cross-sectional shape of the lamp 1000. The lamp ends extend into a receptacle formed by the sidewalls of the end cap assemblies. The lamp 1000 and its end cap assemblies may include internal components that are substantially the same as or similar to those described above in connection with the previously disclosed lamp embodiments, specifically including a network communications jack mounted within one or both of the end cap assemblies and in electrical communication with LED emitter panel 1008 and other internal components of lamp 1000 such that the lamp can be individually controlled as an addressable lighting node of a networked automated LED lighting system. Similar to lamp 100, the lamp 1000 is particularly well-suited for deploying a variety of smart lighting capabilities within the lamp itself, while providing optimized light performance and efficiency. The generally planar inner surface of first side 1024 provides a suitable mounting location, protected within internal chamber of heat sink 1006, for a variety of smart lighting components, including internal control modules, sensors, battery back-up circuits, etc. This format facilitates using a larger number of LED arranged to distribute light over a wide area, increases lamp efficiency by permitting the LEDs to be driven significantly below their maximum light output, and, as explained further below, enables a variety of advanced color shifting and color tuning capabilities.

Figure 25A:
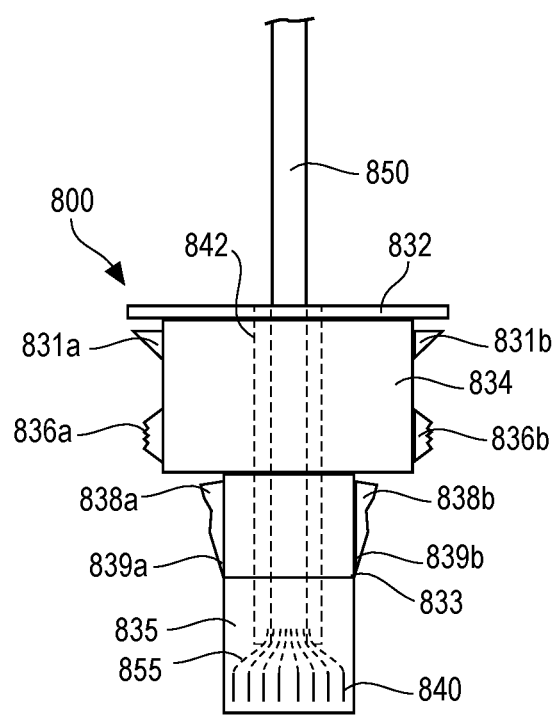
FIG. 25A is side perspective view of an embodiment of a PoE enabled snap-fit connector having a proximal base end for mounting to a lighting fixture, a mid-portion including a snap-fit actuator assembly and extending to a distal tip portion configured as integral Ethernet plug, and showing cable wiring crimped directly to pins of the Ethernet plug.
Figure 25B:
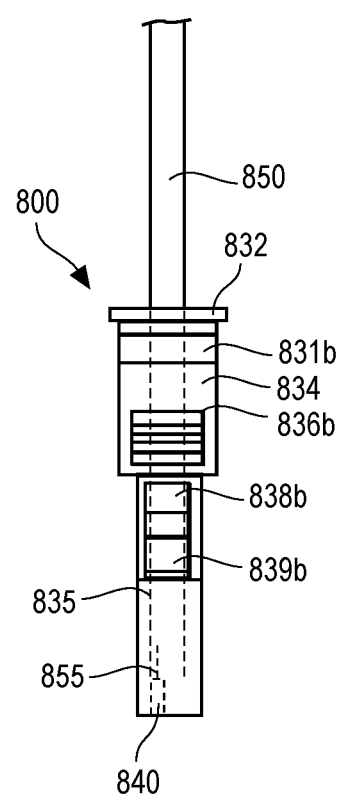
FIG. 25B is right side view of the PoE enabled snap-fit connector assembly of FIG. 25B.

Turning back to the disclosed connector devices, the present invention also contemplates a snap-fit connector and Ethernet plug assembly that directly terminates twisted wire Ethernet cable. One embodiment illustrating this aspect is shown in FIGS. 25A and 25B. The connector 800 is similar to the embodiment illustrated as connector 30. It has base portion 834 and a narrowed leading end portion 833. Flange 832 extends around the periphery of the base portion at a proximal end thereof. Flanges 831a and 831b extend outwardly from opposite sidewalls of base portion 834 and define slots between the flanges 831a, 831b and the peripheral flange 832 for engaging tabs of a support of a lighting fixture. Leading end portion 833 is configured to insert into an opening in an upper surface of a lamp end cap assembly, and the tip portion of the leading end is configured as an Ethernet standard plug 835 as shown. The leading end portion 833 has deployable parts 838a, 838b attached to the sidewalls by live hinges 839a, 839b, which operate in essentially the same manner as the corresponding parts of connector 30. Connector 800 also includes actuators 836a, 836b connected to the deployable parts 838a, 838b on opposite sides for causing the corresponding deployable parts to shift back and forth between the engaged and assembly positions.

In the connector 800, the integral jack shown in the previous connector embodiment 30 is eliminated, and connector 800 includes a central channel 842 extending from its base end to the leading end and providing a pathway for an end portion of cable 850 to extend through the connector directly to the pins or contacts 840 of plug 835. The individual wires 855 of the cable 850 are crimped to the pins or contacts 840 of plug 835 in the conventional manner. The wire crimping step can be performed during installation of the lighting system. Alternatively, the connector 800 may be supplied as an assembly including both the connector 800 and a pre-attached branch cable of predetermined length. The assembly may also include a modular connector at the opposite end of the branch cable allowing for the connector assembly to be conveniently plugged into a corresponding modular connector of a main cable line of a networked lighting system.

Figure 31A:
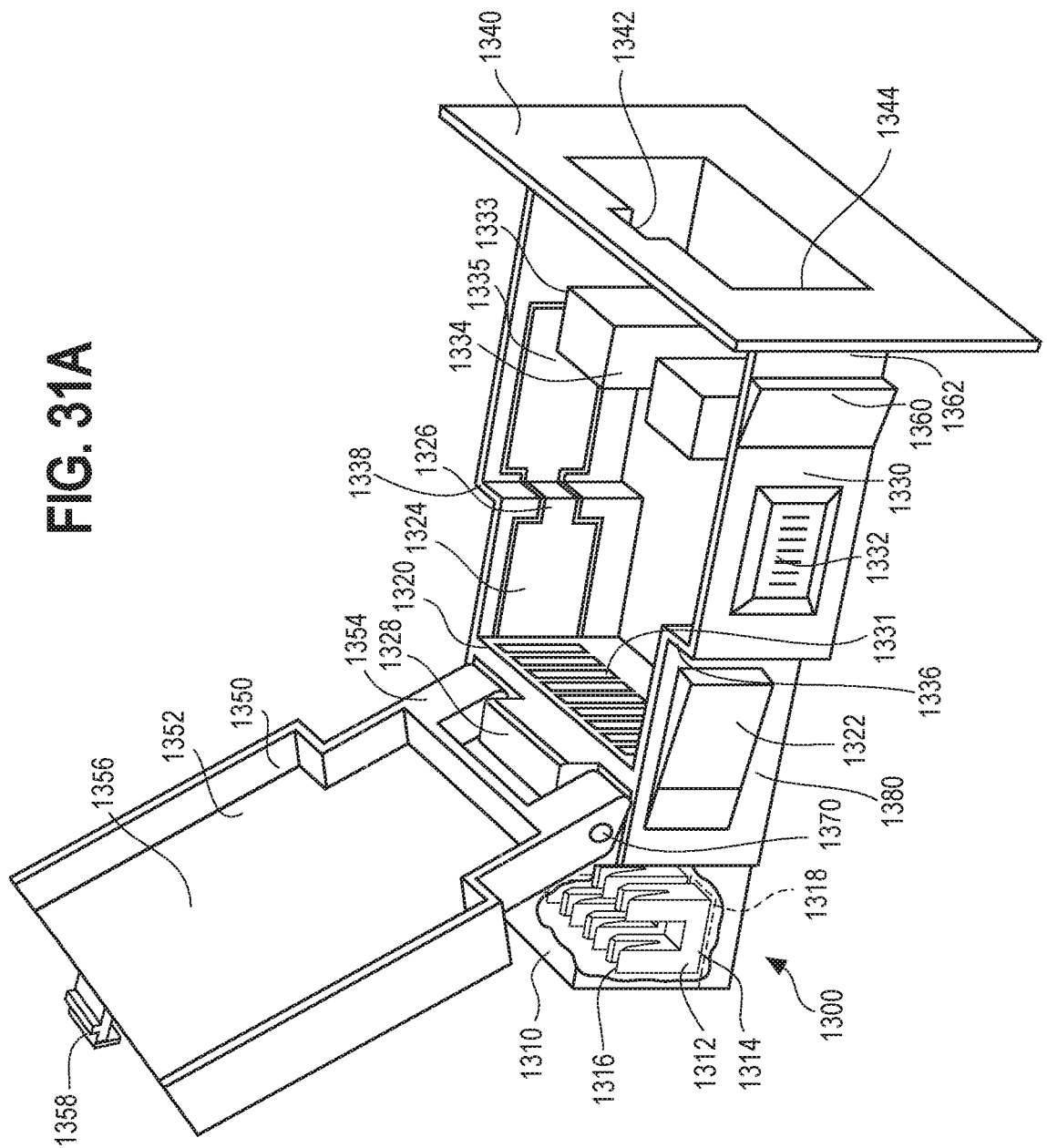
FIG. 31A is a perspective view of a PoE enabled snap-fit connector embodiment, and showing a proximal base end for mounting to a lighting fixture, a mid-portion including a snap-fit actuator assembly and extending to a distal tip portion configured as integral Ethernet plug having IDC terminals for connecting to wires of a network cable.
Figure 31B:
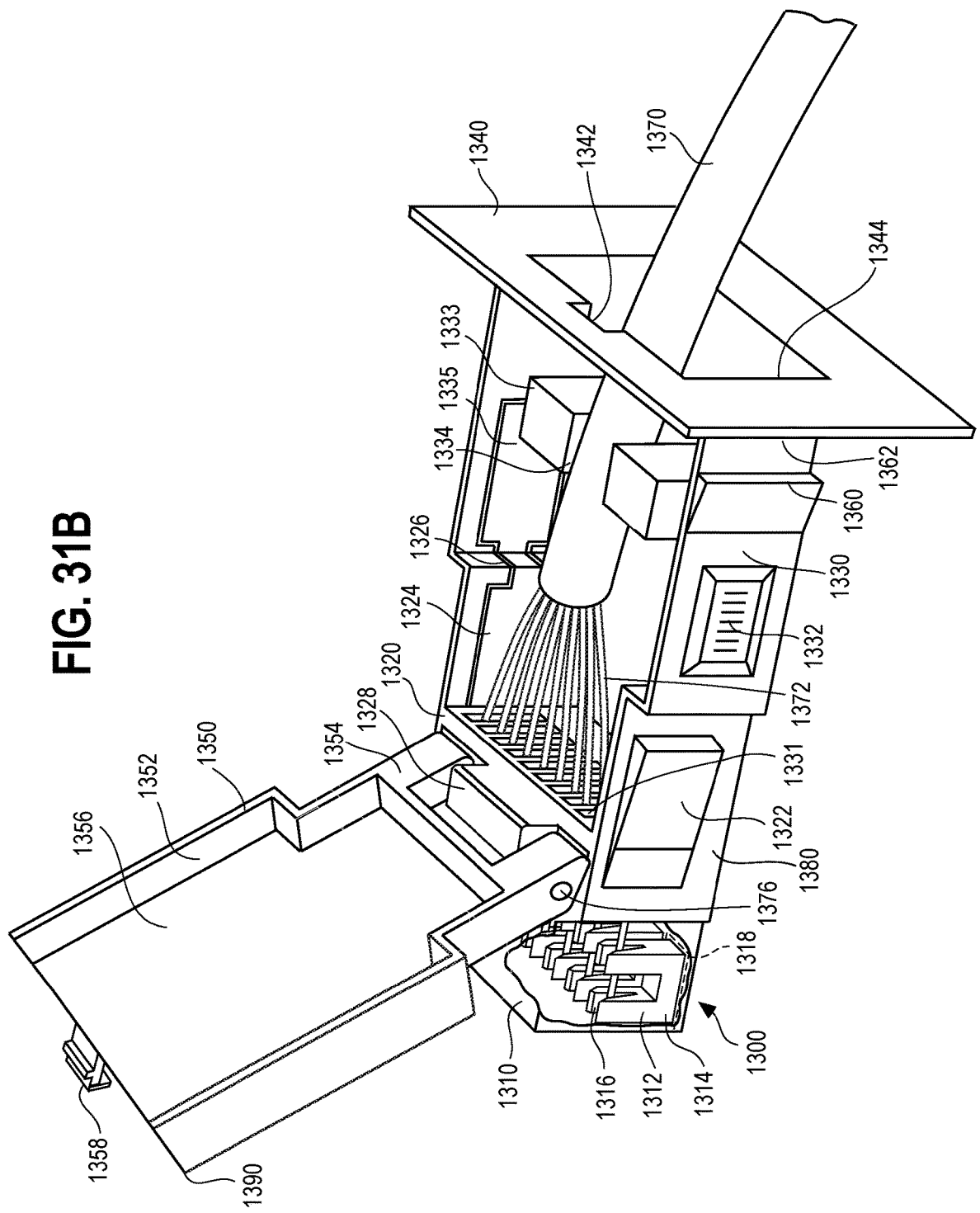
FIG. 31B shows the connector embodiment of FIG. 31A with a network cable attached to the IDC terminal of the plug.

FIGS. 31A and 31B provide a perspective view of an alternative connector suitable to directly terminate twisted wire Ethernet cable. The outer housing of connector 1300, and the primary mechanical components operable to connect an end of a linear tube lamp to a support, are substantially similar to corresponding components of the embodiments discussed above, in particular the embodiments of FIGS.

3A, 3B, 4A to 4C, 12A, 12B and 25A, 25B. Thus, as shown on FIG. 31A, connector 1300 has base portion 1330 and a leading end portion 1380. Flange 1340 extends around the periphery of the base portion at a proximal end thereof. The flange 1340 has peripheral portions that extend outwardly from opposite sidewalls of base portion 1330, which define slots 1362 on opposite sides of the base portion between opposed surfaces of flange portions 1360 extending from opposite sidewalls of the base portion. The slots are sized to receive and frictionally hold mounting tabs extending from a support surface of linear tube lamp lighting fixture or other support structure, whereby the connector 1300 and support can be press connected by a simple sliding movement of the connector relative to the mounting tabs.

The leading end portion 1380 has a narrowed profile sized to be inserted through an opening in an upper facing sidewall of an end cap assembly mounted at an end of a LED linear lamp. Shoulders 1336, 1338 at the juncture of leading end portion 1380 and base portion 1330 abut against the upper facing sidewall in this configuration. Leading end portion 1380 of connector 1300 has deployable parts 1322, 1324 formed on opposite sides thereof. The connector and lamp end cap assembly form a secure mechanical connection in essentially the same manner described in relation to previously explained embodiments. The connector 1300 is configured so that each deployable part 1322, 1324 engages an edge of the opening and is progressively cammed from a holding position, towards an assembly position, and back towards the holding position as the lamp end cap assembly is moved upward to and into the engaged position. Portions of the upper sidewall at the edge of the end cap assembly opening then reside captively between opposed surfaces of the deployable part 1322, 1324 and shoulders 1336, 1338 of connector 1300 in the engaged position.

As in other disclosed embodiments, connector 1300 has actuators 1332, 1335 connected to the deployable parts 1322, 1324 respectively on opposite sides for causing the corresponding deployable parts to shift back and forth between the holding and assembly positions. The installer can grip and squeeze the actuators, as between two fingers, towards each other, thereby shifting both deployable parts 1322, 1324 from their holding positions into their assembly positions.

FIG. 31B shows an Ethernet cable 1370 that has been terminated with the connector 1300. The cable 1370 has eight insulated conductors 1372, which may be insulated copper wires, enclosed in an outer jacket. The insulated wires 1372 are arranged as four twisted pairs of wires extending along of the length of the network cable. The insulator cover material for each wire will typically have a unique color pattern to enable each wire to be readily identified. To install the connector 1300 to the cable, the two wires of each pair are untwisted and partially separated from each other after an end portion of the outer jacked has been cut away and removed, as shown in the figure. The rear face of connector 1300 defines an opening 1344 providing a pathway for an end portion of network cable 1370 to be inserted into the interior space within sidewalls of the connector housing. The connector may include bracket member 1333 extending internal of the connector housing between opposite sidewalls of base portion 1330. Bracket member 1333 includes central guideway 1334. Network cable 1370 may thus be inserted through the opening 1344 and advanced linearly through guideway 1334 to position the end thereof centrally within the interior region of the connector.

Leading end portion 1380 of the connector 1300 includes an integral Ethernet compliant plug portion 1310 at its tip, as shown in FIGS. 31A and 31B. The body of the plug portion houses a series of insulation displacement contacts 1312, which are aligned with corresponding linearly extending slots 1318 formed in the outer housing of plug portion 1310. The particular plug illustrated provides eight positions, each containing a contact, which is representative of the conventional RJ-45 plug commonly used to terminate twisted pair cable in Ethernet networks. As mentioned above, other modular plugs containing 4, 6 and 10 positions, and varying numbers of contacts, are also available and known to those skilled in the art. Each of the IDC terminals 1312 includes an engagement portion 1314 that is exposed through a corresponding slot and configured to engage and form an electrical connection with a corresponding conductive contact of an Ethernet jack when the plug portion is inserted into the internal port of the jack. Multiple blades 1316 of a conductive material extend perpendicular from the engagement portion 1314. The blades 1316 include groves for receiving an insulated wire portion and have serrated or sharp edges for piercing the outer wire insulation and forming electrical contact with the conductive wire.

An internal wall 1320 of the connector 1300 adjacent a forward end thereof includes a series of adjacent passages 1331. Each passage extends from the main interior region of the connector to a forward end of plug portion 1310 and is sized to receive an individual wire of the network cable. Each passage is generally aligned laterally with the blade groove of a corresponding one of the insulation displacement contacts so that the passages guide each wire into proximity with one of the grooves as the wire is advanced linearly forward and into the plug portion. Each IDC terminal corresponds to a particular one of the wires in predetermined manner. A color coding or other scheme may be utilized to identify the passage or IDC terminal corresponding to each wire. After each of the eight wires have been so positioned adjacent the blades of a IDC terminals 1312, as illustrated in FIG. 31B, a crimping tool may be used to impart force on the contacts causing the blades to pierce the wire insulators in a manner familiar to those skilled in the art to electrically connect the cable wires to the plug portion of connector 1300.

Connector 1300 further includes a pivoting cover 1390, which opens to provide convenient access to the interior of the connector housing to allow for advancing the network cable wires through the slots and into engagement with the insulation displacement contacts as described. The cover 1390 includes a top wall 1356 that extends laterally between opposite sidewalls of the connector, and a pair of opposite sides 1352 extending perpendicular from the top wall 1356. The cover includes a pair of opposite legs 1354 that attach to opposite ends of mounting bracket 1328 by fasteners 1376. The cover can pivot about a rotational axis extending laterally through the mounting bracket. A latch 1358 is located at the opposite end of the cover. FIGS. 31A and 31B show the cover in an open configuration providing access to the interior of the connector. After threading the wires through the slots and into contact with the IDCs, the installer may rotate the cover to a closed orientation (not shown), in which edges 1350 of sides 1352 abut against edges of the opposite sidewalls of the connector so that the connector has a low profile rectangular shape similar to that of the previously described embodiments. With the cover in the closed position, the latch 1358 engages flange 1340 with a protruding portion of the latch seated within a notched region 1342 of the flange to hold the cover in the closed position. After the contacts have been crimped to the wires, the connector 1300 may then affixed to a lighting fixture or other support structure and used to mount one end of the lamp to the support. The latch may also be released from the flange portion to permit the cover to be opened should it later becomes necessary to access the interior wiring of the connector.

Figure 32:
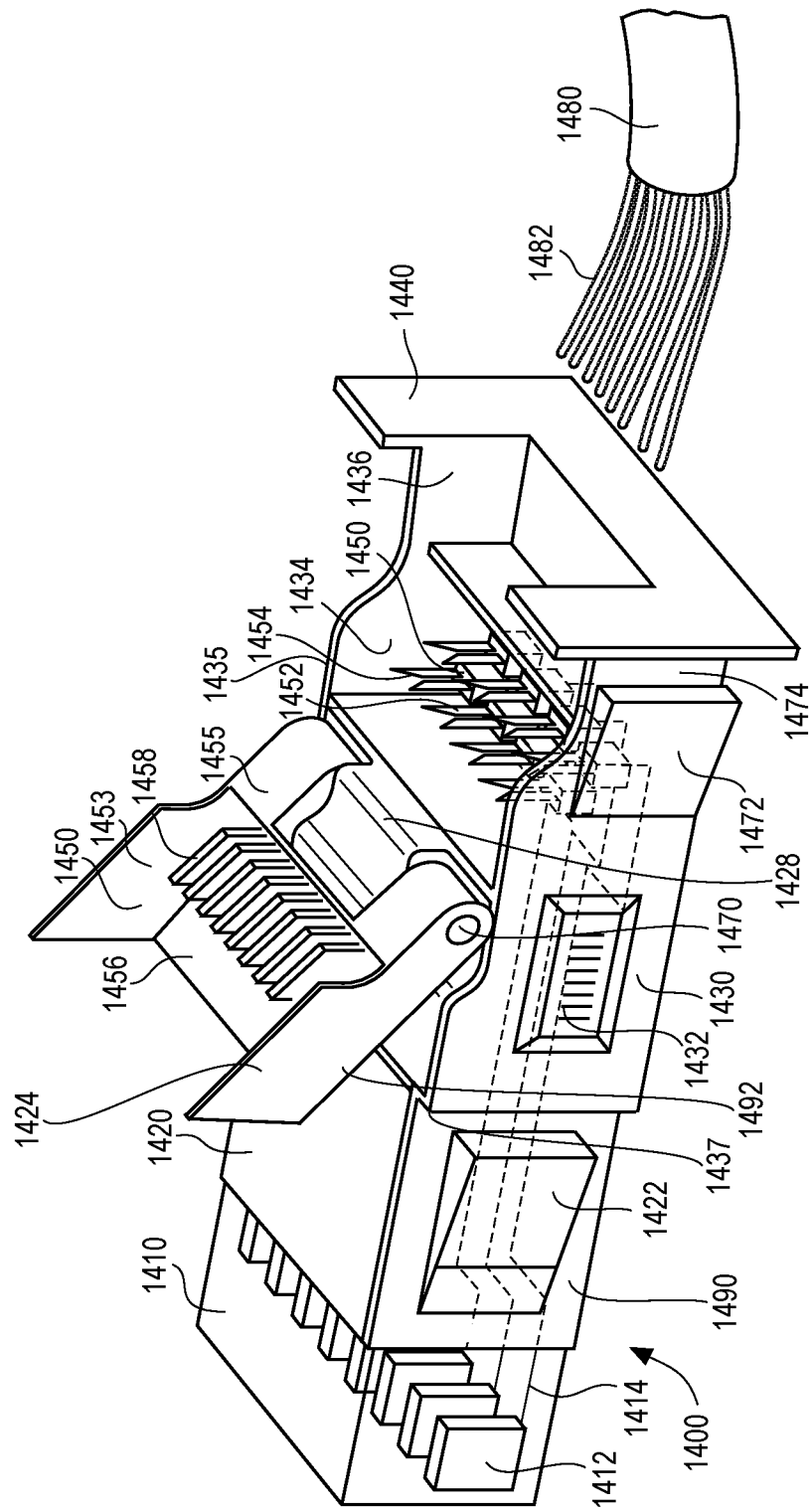
FIG. 32 is a side perspective view of a PoE enabled snap-fit connector embodiment, and showing a proximal base end for mounting to a lighting fixture, a mid-portion including a snap-fit actuator assembly and extending to a distal tip portion configured as integral Ethernet plug, and having IDC terminals at the base end for connecting to wires of a network cable.

An alternate embodiment of a PoE snap-fit connector and plug will now be described with reference to FIG. 32. The connector 1400 disclosed in this figure is configured to terminate a network cable via IDC terminals disposed at the base end of the connector. The mechanical components of connector 1400 for connecting an end portion of a linear lamp to a support are essentially the same as those of previously disclosed embodiments. Thus, connector 1400 includes base portion 1430 and a leading end portion 1490. Flange 1440 extends around the periphery of the base portion at a proximal end thereof. The flange 1440 has peripheral portions that extend outwardly from opposite sidewalls of base portion 1430, which define slots 1474 on opposite sides of the base portion between opposed surfaces of flange portions 1472 extending from opposite sidewalls of the base portion. The slots are sized to receive and frictionally hold mounting tabs extending from a support surface of linear tube lamp lighting fixture or other support structure, whereby the connector 1400 and support can be press connected by a simple sliding movement of the connector relative to the mounting tabs.

The leading end portion 1490 has a narrowed profile sized to be inserted through an opening in an upper facing sidewall of an end cap assembly mounted at an end of a LED linear lamp, with shoulders 1437, 1438 on opposite corners of base portion 1430 abutting against the upper facing sidewall in this engaged configuration. Leading end portion 1490 of connector 1400 has deployable parts 1422, 1424 formed on opposite sides thereof. The connector and lamp end cap assembly form a secure mechanical connection in essentially the same manner described in relation to previously explained embodiments. The connector 1400 is configured so that each deployable part 1422, 1424 engages an edge of the opening and is progressively cammed from a holding position, towards an assembly position, and back towards the holding position as the lamp end cap assembly is moved upward to and into the engaged position. Portions of the upper sidewall at the edge of end cap assembly opening then reside captively between opposed surfaces of the deployable part 1422, 1424 and shoulders 1437, 1438 of connector 1400 in the engaged position. Actuators 1432, 1435 are connected to the deployable parts 1422, 1424 respectively on opposite sides for causing the corresponding deployable parts to shift back and forth between the engaged and holding positions.

Ethernet compatible network cable 1480 has eight insulated wires arranged in twisted pairs enclosed in an outer jacket, and is shown with the forward ends of the wires 1482 untwisted and partially separated from each other after an end portion of the outer jacket has been removed. The rear face of connector 1400 defines an opening 1436 providing a pathway for the forward end portion of the cable to be inserted into the interior of the base portion of the connector housing. A series of eight IDC terminals 1450 are disposed internal of the base portion. The IDC terminals are mounted to a dielectric substrate (not shown). The IDC terminals may be arranged in a compact configuration consisting of two parallel rows extending between opposite sidewalls, with the rows staggered from each other in the lateral direction. Each IDC terminal corresponds to a particular one of the network cable wires in predetermined manner. A color coding or other scheme may be utilized to identify the IDC terminal corresponding to each wire. The terminals each have a pair of opposite conductive blades 1452 extending perpendicular from a base thereof. Sharp edge portions 1454 of the blades oppose each other on opposite sides of a vertical slot between the blades and are configured to pierce the outer wire insulation and form electrical contact with the conductive wire when the wire is positioned with the slot and wire and edge portions are forced against each other.

Connector 1400 further includes a pivoting cover 1492, which opens to provide access to the interior of the connector housing allowing for arranging the wires into engagement with the insulation displacement contacts. The cover 1492 includes a top wall 1456 that extends laterally between opposite sidewalls of the connector, and a pair of sides 1450 extending perpendicular from the top wall. The cover includes a pair of opposite legs 1455 that form pivoting connections at opposite ends of mounting bracket 1428 by means of fasteners 1470. FIG. 32 shows the cover in an open configuration providing access to the interior of the base portion of the connector. A series of spaced plastic fins 1458 extend perpendicular from the inside surface of top wall 1456 of the cover. The fins are positioned such that, with the cover in the closed position, the fins extend between pairs of adjacent IDC terminals. With the cover in a slightly open configuration, each wire may be manually positioned into one the slots formed between adjacent fins of the cover, which are aligned with the slots of the IDC terminals blades. After the wires have been so positioned, the cover may be rotated to a closed orientation (not shown), in which edges 1453 of sides 1450 abut against edges of the opposite sidewalls of the base portion of the connector so that the connector has a low profile rectangular shape similar to that of the previously described embodiments. Closing the cover forces the wires into engagement with the blades to facilitate piercing the wire insulators and to securely retain the wires in an engaged configuration with the IDC terminals. The fins also provide an insulating barrier between adjacent IDC terminals to electrical interference or "cross-talk" between the terminals.

Leading end portion 1490 of the connector 1400 includes an integral Ethernet compliant plug portion 1410 at its tip, as shown in FIG. 31. The body of the plug portion houses a series of IDC terminals 1412, which are aligned with corresponding linearly extending slots (not shown) formed in the outer housing of plug portion 1410. The particular plug illustrated provides eight positions, each containing a contact, which is representative of the conventional RJ-45 plug commonly used to terminate twisted pair cable in Ethernet networks, although other plug configurations may also be used. Each of the contacts 1412 includes an engagement portion that is exposed through a corresponding slot and configured to engage and form an electrical connection with a corresponding conductive contact of an Ethernet jack when the plug portion is inserted into the internal port of the jack. The IDC terminals 1450 at the base of the connector are electrically paired with corresponding ones of the contacts 1412 via internal conductive leads 1414 extending from the IDC terminals to the contacts 1412. The connector 1400 thus provides isolated pathways for communicating electrical signals received on respective wires of a network cable to a corresponding isolated conductive contact of an Ethernet jack, and also in the reverse direction. The conductive leads may be provided as a printed wire board extending within the housing from the base portion to the plug portion, in which the wires or traces are spaced from each other and extend substantially parallel to each other along a dielectric substrate (not shown). The wire board may be part of the same substrate board on which the IDC terminals are mounted or provided as a separate board. A base portion of each IDC terminal is formed to connect with one of the leads of the wire board so that the IDC terminal and corresponding trace form an electrical connection between a wire of the network cable and one of the contacts 1412 of the plug. Alternatively, the conductive leads may be mounted or adhered to an internal wall surface of the connector housing, integrated with the housing using in laid injection molding techniques, or provided by any other available means.

The connector 1400 can thus terminate a network cable at the base end of the connector and form an operable power and data interface with a jack associated with a linear LED lamp. Once affixed to a cable, the connector 1400 may be secured to a lighting fixture or other support structure in the manner described. In the case of a networked lighting system designed for network connectivity at both ends of the LED lamps, a second such connector is affixed to a second cable and installed at the opposite mounting location of the support. An LED lamp having the disclosed end connector and integrated Ethernet jack system at each lamp end may then be mounted on the support by advancing the lamp ends in a generally linear path traverse to the length of the lamp and into engagement with the connectors 1400 in the manner previously described. If it is desired to provide network connectivity to only one end of the lamp, an alternative snap-fit mechanical connector not configured with electrical networking components, such as the connector 750 of FIG. 23, may be used to secure the second end of the lamp to the support structure.

Another embodiment of an integrated connector and network plug system will now be described with reference to FIG. 33. The connector 1500 is similar in overall form and mechanical operation as the connector 1400 just discussed, but has an alternative DC terminal system at its base end for connecting to a network cable.

Thus, connector 1500 includes base portion 1536 and a leading end portion 1540. Flange 1510 extends around the periphery of the base portion at a proximal end thereof. The flange 1510 has peripheral portions that extend outwardly from opposite sidewalls of base portion 1536, which define slots 1512 on opposite sides of the base portion between opposed surfaces of flange portions 1539 extending from opposite sidewalls of the base portion. The slots are sized to receive and frictionally hold mounting tabs extending from a support surface of linear tube lamp lighting fixture or other support structure, whereby the connector 1500 and support can be press connected by a simple sliding movement of the connector relative to the mounting tabs.

The leading end portion 1540 has a narrowed profile sized to be inserted through an opening in an upper facing sidewall of an end cap assembly mounted at an end of a LED linear lamp, with shoulders 1544, 1545 on opposite corners of base portion 1536 abutting against the upper facing sidewall in this engaged configuration. Leading end portion 1540 of connector 1500 has deployable parts 1542, 1546 formed on opposite sides thereof. The connector and lamp end cap assembly form a secure mechanical connection in essentially the same manner described in relation to previously explained embodiments. The connector 1500 is configured so that each deployable part 1542, 1546 engages an edge of the opening and is progressively cammed from a holding position, towards an assembly position, and back towards the holding position as the lamp end cap assembly is moved upward to and into the engaged position. Portions of the upper sidewall at the edge of end cap assembly opening then reside captively between opposed surfaces of the deployable part 1542, 1546 and shoulders 1544, 1545 of connector 1500 in the engaged position. Actuators 1525, 1529 are connected to the deployable parts 1542, 1546 respectively on opposite sides for causing the corresponding deployable parts to shift back and forth between the engaged and holding positions.

Ethernet compatible network cable 1590 is shown with eight insulated wires 1592 having end portions extending from the outer jacket for engaging an IDC terminal of the connector. The rear face of connector 1500 defines an opening 1522 providing a pathway for the forward end portion of the cable to be inserted into the interior of the base portion of the connector housing. A series of eight IDC terminals 1538 are mounted on a dielectric board (not shown) internal of the base portion arranged in two rows of four terminals adjacent opposite sidewalls of the housing as shown. Each IDC terminal includes a pair of opposite conductive blades 1528 extending perpendicular from a base 1526 thereof. Sharp edge portions 1524 of the blades oppose each other on opposite sides of a vertical slot between the blades and are configured to pierce the outer wire insulation and form electrical contact with the conductive wire when the wire is positioned with the slot and wire and edge portions are forced against each other.

An insulative protective lid 1570 is disposed within the interior of the housing. The lid comprises a planar platform portion 1572 and has a series of vertically extending dividers 1576 arranged in two parallel rows at opposite lateral sides of the platform 1572. The lid is formed of plastic or other insulative material. It includes mounting posts 1574 extending from a bottom surface at each corner of the platform for engaging corresponding openings formed in the mounting board (not shown) of the IDC terminal system. The mounting posts position the lid so that openings 1578 in the platform 1572 between adjacent pairs of dividers are aligned with the vertically extending blades of the IDC terminals. The blades 1528 extend through the openings and reside within grooves 1571 formed in opposed sidewalls of the dividers, with the vertical slots between opposed sharp edge portions 1524 positioned in the space between adjacent dividers.

Figure 33:
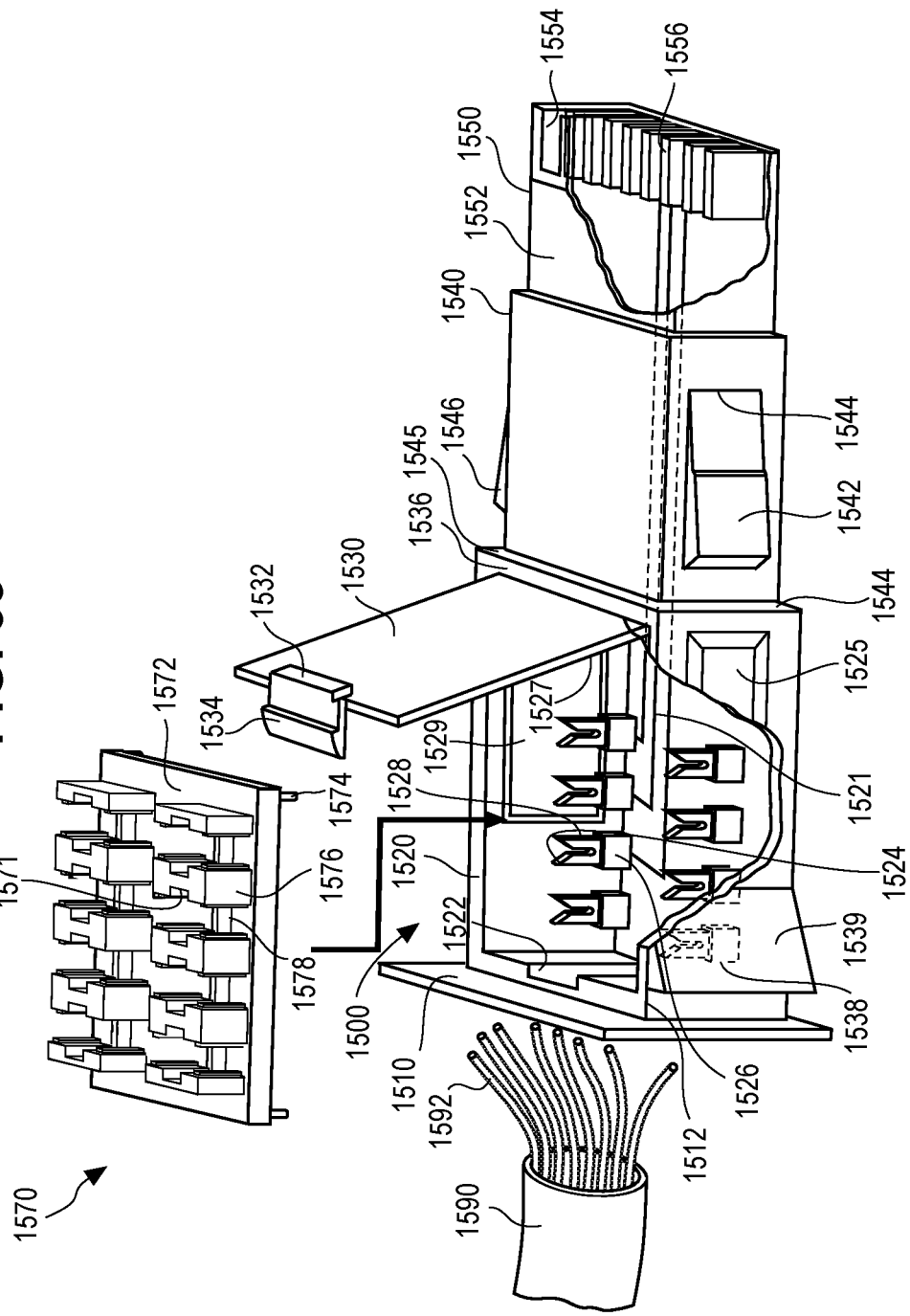
FIG. 33 is a perspective view of another PoE enabled snap-fit connector embodiment, and showing a proximal base end for mounting to a lighting fixture, a mid-portion including a snap-fit actuator assembly and extending to a distal tip portion configured as integral Ethernet plug, and having IDC terminals at the base end for connecting to wires of a network cable.

Leading end portion 1550 of the connector 1500 includes an integral Ethernet compliant plug portion 1550 at its tip, as shown in FIG. 33. The body of the plug portion houses a series of contacts 1556, which are aligned with corresponding linearly extending slots 1554 formed in the outer housing 1552 of plug portion 1550. The particular plug illustrated provides eight positions, each containing a contact, which is representative of the conventional RJ-45 plug commonly used to terminate twisted pair cable in Ethernet networks, although other plug configurations may also be used. Each of the contacts 1556 includes an engagement portion that is exposed through a corresponding slot and configured to engage and form an electrical connection with a corresponding conductive contact of an Ethernet jack when the plug portion is inserted into the internal port of the jack. The IDC terminals 1538 are electrically paired with corresponding ones of the contacts 1556 via conductive leads 1521 extending internal of the connector housing from the IDC terminals to the contacts. The connector 1500 thus provides isolated pathways for communicating electrical signals received on respective wires of a network cable to a corresponding isolated conductive contact of an Ethernet jack, and also in the reverse direction. The conductive leads may be provided as a printed wire board extending within the housing from the base portion to the plug portion, in which the wires or traces are spaced from each other and extend substantially parallel to each other along a dielectric substrate (not shown). The wire board may be a portion of the same board that supports the DC terminals or as a separate board. The base portion 1526 of each IDC terminal 1538 is formed to connect with one of the leads of the wire board so that the IDC terminal and corresponding trace form an electrical connection between a wire of the network cable and one of the contacts 1556 of the plug. Alternatively, the conductive leads may be mounted or adhered to an internal wall surface of the connector housing, integrated with the housing using in laid injection molding techniques, or provided by any other available means.

Connector 1500 further includes a pivoting cover 1530, which opens to provide convenient access to the interior of the connector housing to allow for arranging the wires into engagement with the insulation displacement contacts. FIG. 33 shows the cover in an open configuration providing access to the interior of the base portion of the connector. With the cover in the open configuration, and the lid 1570 mounted over the IDC terminals, network cable 1590 may be inserted through opening 1522 and into the central interior region of the base portion of the housing between the two rows of dividers 1576. The installer may manipulate each wire so that its end portion extends laterally along the space between a pair of adjacent dividers. The wire is then pushed into the vertical slot between opposite blades of the corresponding IDC terminal and against the sharp edge portions 1524 thereof to pierce the wire insulators and securely retain the wires in an engaged configuration with the IDC terminals. A suitable tool may be used to "punch" the wires into engagement with the IDC blades, as is generally known in the art for other IDC connection systems. Four wires are brought into contact with corresponding ones of the first row of IDC terminals on one lateral side, and four wires are brought into contact with corresponding ones of the second row of IDCs at the opposite lateral side. Each IDC terminal corresponds to a particular one of the network cable wires in predetermined manner. A color coding or other scheme may be utilized to identify the IDC terminal corresponding to each wire.

After the wires have been connected with the IDC terminals, the cover may be rotated to a closed orientation (not shown) so that the connector has a low profile rectangular shape similar to that of the previously described embodiments. The cover includes latch member 1532 having resilient protrusion 1534 configured to engage a notched portion of housing and retain the cover in a closed configuration. Once affixed to a cable, the connector 1500 may be secured to a lighting fixture or other support structure in the manner described and used in a variety of networked lighting system architectures much like the other disclosed connector embodiments.

An alternative embodiment of a PoE enabled snap-fit connector assembly providing network cable access from a lateral approach will now be discussed. As shown in FIGS. 12A and 12B, connector 150 is substantially similar to the connector 30 described above except that its jack 157 is accessible through a sidewall of base portion 154 rather than through the end wall of the base portion. Thus, connector 150 has base portion 154 and a narrowed leading end portion 153. Flange 152 extends around the periphery of the base portion at a proximal end thereof. Flanges 151a and 151b extend outwardly from opposite sidewalls of base portion 154 and define slots between the flanges 151a, 151b and the peripheral flange 152 for mounting to tabs of a lighting fixture or other support. Leading end portion 153 has narrowed profile configured to permit the leading end to insert into an opening in an upper surface of a lamp end cap assembly, and the tip portion of the leading end is configured as an Ethernet standard plug 155 as shown. The leading end portion 153 has deployable parts 158a, 158b formed on opposite sides thereof and attached by live hinges 159a, 159b to the sidewalls, which operate in essentially the same manner as the corresponding parts of connector 30. Connector 150 also includes actuators 156a, 156b connected to the deployable parts 158a, 158b on opposite sides for causing the corresponding deployable parts to shift back and forth between the engaged and assembly positions.

The jack 157 is mounted internal to base portion 154 of connector 150 and oriented with its receptacle accessible through a sidewall thereof. In the embodiment shown, jack 157 is a standard Ethernet jack containing internal leads 157a and adapted to receive an RJ-45 type plug, to connect the connector 30 to a LAN. The connector 150 has internal leads (not shown) connecting the leads of jack 157 to the pins 155a of leading end plug 155. The connector 150 is mounted to the lighting fixture so that the receptacle opening of jack 157 faces outward away from the LED tube lamp. The connector 150 is suitable for installations in lighting fixtures or other support structures whose geometry provides a pathway for the network cable to be plugged into the jack using a lateral approach. It circumvents potential difficulties associated with routing the network cable to the connector from above the lighting fixture or other support structure in a vertical approach. Connector 150 also permits the plug to be removed from the jack without detaching the connector 150 from the support or displacing ceiling tiles to access the area above the lighting fixture.

The embodiments disclosed above illustrate various non-limiting embodiments of a network enabled snap-fit connector assembly that functions as a safe and secure lamp holder for LED tube lamps and also provides integrated power and data communications directly to individual lamps. The snap-fit connector embodiments disclosed thus far are configured for LED lighting systems deployed over Ethernet networks. Because Ethernet computer networks are an attractive option for deploying connected solid state linear lighting systems, the principles of the snap-fit connector assemblies and novel LED tube lamp end cap assemblies of the invention have been illustrated by reference to embodiments configured for standard Ethernet plugs and jacks. However, the invention is not limited to Ethernet implementations. The disclosed snap-fit connector system is readily adaptable to a variety of other integrated power and data networking standards including, for example, USB, FireWire and any other existing or future standard utilizing small form factor plug-in type connectors. By eliminating externally protruding bi-pins of traditional fluorescent tubes and first generation LED replacement tubes, the disclosed end caps provide an enlarged housing while keeping the overall lamp length compatible with existing lighting fixtures. This makes it possible to house modular connectors of various geometries within the end cap. The end cap assemblies further accommodate one or more PCB connector boards and associated control and communications modules, processors and or circuitry. The particular electronic components required for a given power and data communications protocol can easily be included on the end cap PCB connector and/or on a PCB inside the lamp body.

The disclosed network compatible snap-fit connectors may be produced using conventional manufacturing techniques with the leading end conforming to any standardized plug design. As discussed above, the snap-fit mechanism provides a secure connection between the connector and end cap assembly that supports the weight of the lamp. It allows for engaging the lamp end cap assembly and the connector using a linear approach not involving rotational motions during installation. This facilitates deploying standard, linearly engaging plugs and jacks to make a network connection within the end cap assembly as a consequence of the lamp being attached to the connector. The snap-fit mechanism secures the lamp so that the network connection internal to the end cap assembly need not be designed to be weight bearing. The disclosed snap-fit connector system is thus highly customizable, and can be adapted to mechanically and digitally connect network capable LED tube lamps of the type disclosed herein to any type of integrated power and data network using the particular network connection protocols and modular connector designs of the applicable standard.

In another aspect, the invention contemplates a connector assembly configured with essentially the same snap-fit mechanism previously disclosed, but adapted to permit a network cable to extend through the connector body and plug directly into the lamp end cap assembly jack. FIGS. 13A to 13D show an embodiment of a connector assembly in accordance with this aspect of the invention. The illustrated connector 160 has base portion 164 with flange 162 extending around the periphery of the base portion at a proximal end thereof. Flanges 161*a* and 161*b* extend outwardly from opposite sidewalls of base portion 164 and define slots between the flanges 161*a*, 161*b* and the peripheral flange 162 for engaging tabs of a support of a lighting fixture. Leading end portion 170 has a narrowed profile to permit the leading end to insert into an opening in an upper surface of a lamp end cap assembly. The leading end portion 170 has deployable parts 168*a*, 168*b* attached to the sidewalls by live hinges 169*a*, 169*b*, which operate in essentially the same manner as described above with respect to the corresponding parts of connector 30. Connector 160 also includes actuators 166*a*, 166*b* connected to the deployable parts 168*a*, 168*b* on opposite sides for causing the corresponding deployable parts to shift back and forth between the engaged and assembly positions. It operates in substantially the same way as the previously disclosed connector embodiments to engage and connect to a lamp end cap assembly, with leading end 170 inserting through an opening and residing internal to the end cap assembly, and deployable parts 168*a*, 168*b* capturing edge portions of the end cap side wall proximate the opening between upper surfaces thereof and opposed surfaces of base portion 164.

Figure 13A:
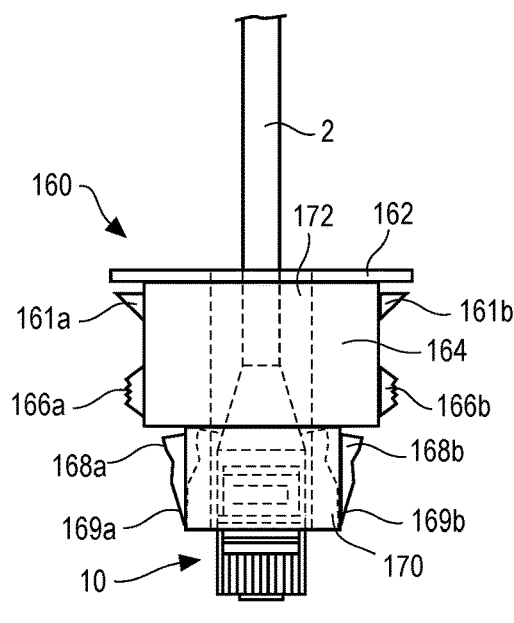
FIG. 13A is a side perspective view of an embodiment of a PoE enabled snap-fit connector assembly, and showing a proximal base end for mounting to a lighting fixture, a mid-portion including a snap-fit actuator assembly, and a distal tip portion, and with an Ethernet plug and cable extending through an internal channel extending from the proximal base end to the distal tip end.
Figure 13B:
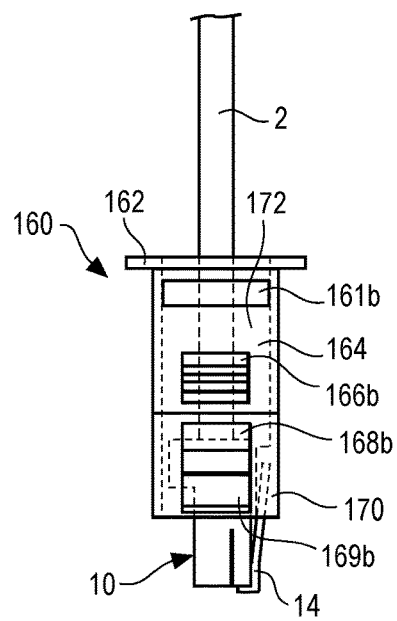
FIG. 13B is a right side view of the PoE enabled snap-fit connector assembly and Ethernet cable shown in FIG. 13A.
Figure 13C:
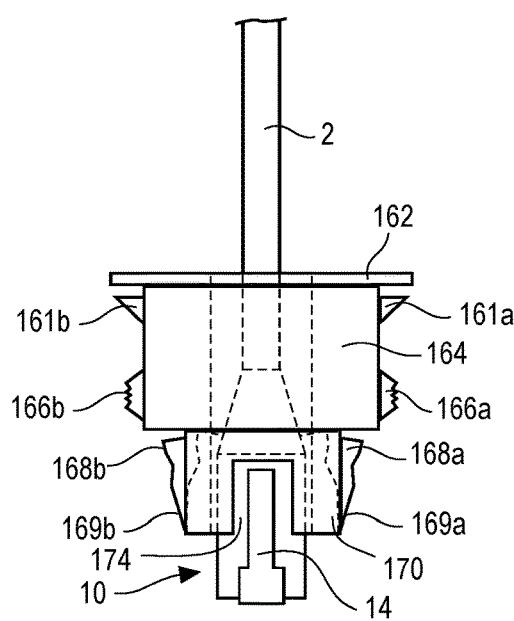
FIG. 13C is an opposite side view of the PoE enabled snap-fit connector assembly and Ethernet cable shown in FIG. 13A.
Figure 13D:
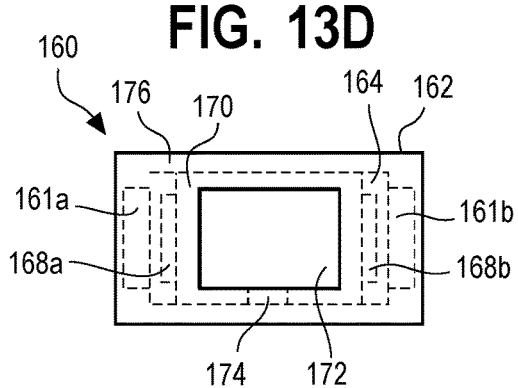
FIG. 13D is an end view of the base end of PoE enabled snap-fit connector assembly shown in FIG. 13A with the Ethernet cable removed to show an internal channel extending from the proximal base end to the distal tip end.

In the connector 160, the integral jack and leading end plug of the previously discussed connector embodiment 30 are eliminated. The connector 160 includes a central channel 172 extending from a first opening in the end wall at its base end to a second opening in the opposite end wall of the leading end. The channel 172 provides a pathway allowing an Ethernet cable 2 with terminal plug 10 to extend through connector 160 from its base end to its leading end as shown. A first sidewall of leading end portion 170 defines a rectangular cutout 174 extending from its leading edge as shown in FIG. 13C. When the lamp end cap assembly, connector 160 and plug 10 are in an engaged configuration, a leading end first portion of plug 10 and its latching tab 14 are positioned forward of the leading edge of connector 160, and a second portion of the plug and latching tab are positioned rearward of the leading edge. In that position, the cutout 174 is aligned adjacent to the second portion of the tab 14 to allow the tab to be shifted between a depressed position in which the tab resides within the sidewall and its natural position in which a portion of the tab extends through the cutout and external to the sidewall.

Figure 13E:
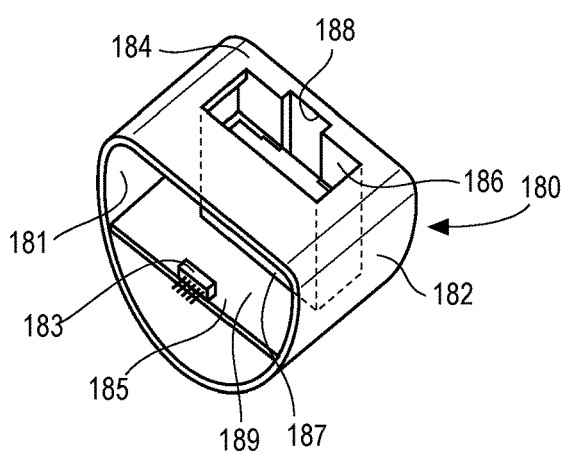
FIG. 13E shows a linear LED lamp end cap defining an opening in an upward facing sidewall thereof and internal Ethernet jack configured to receive the distal tip end of the PoE enabled snap-fit connector assembly and the Ethernet cable plug shown in FIG. 13A.

FIG. 13E shows one embodiment of an end cap assembly 180 of an LED tube lamp (not shown) designed to be installed on a support using connector 160. FIG. 13E has a reduced scale relative to that of FIGS. 13A-D. The end cap assembly 180 has a generally planar upper sidewall 184 and curved sidewall 182 which define a receptacle 181 for receiving an end of the body portion of an LED tube lamp. PCB connector board 189 is mounted in a horizontal orientation within the receptacle, and jack 187 is mounted on the connector board as shown. The PCB connector board 189 further comprises connector 183 having leads 185 for communicating power and/or data signals to components within the associated LED lamp body. The upper sidewall 184 defines generally rectangular opening 186 for receiving leading end portion 170 of connector 160. Jack 187 opens upward toward the opening 186 in upper sidewall 184, and the two openings are generally aligned. The opening 186 includes groove 188 extending along the internal surface of the end wall. The grove 188 is aligned with cutout 174 when the connector 160 and end cap assembly 180 are in the engaged configuration, and also aligned with latching tab 14 of plug 10 when the plug is inserted in the jack 187.

The end cap assembly 180 disposed at a first end of an LED tube lamp may engage with connector 160 to secure a first lamp end to a support. In one approach, end cap assembly 180 is translated upward in a substantially straight path and into an engaged position in which leading end portion 170 of connector 160 resides within the end cap assembly and deployable parts 168*a*, 168*b* capture edge portions of upper sidewall 184 proximate opening 186. After the end cap assembly 180 is securely mated with connector 160, the plug 10 and cable 2 may be advanced through the central channel 172 of the connector downward towards jack 187. As the plug 10 is advanced along this pathway, its tab 14 is held in its depressed position by the opposed internal sidewall of the channel 172. The plug 14 is advanced downward in the channel until the leading end portion thereof passes through the opening 186 into the end cap assembly and inserts within the receptacle of jack 187 to connect the lamp to the network. In this position, the latching tab 14 shifts back to its natural position as permitted by the cutout 174 in connector 160 and the groove 188 of the end cap assembly. In an alternative approach, the installer may first advance plug 10 through connector 160 and into engagement with jack 187 of end cap assembly 180, and then move the end cap assembly and plug upward and into the engaged position relative to connector 160 to attach a first end of the lamp to the support. To separate the components, the tab 14 is depressed to unlock plug 14 from the jack 187, and the actuators 166*a*, 166*b* are squeezed to disengage the deployable parts 168*a*, 168*b* from the end cap assembly 180, permitting the end cap assembly to be separated from connector 160 in the same manner described with regard to other embodiments above.

As with the earlier disclosed lamps and end cap embodiments, LED tube lamps may be provided with an end cap assembly 180 at a single end or at both ends of the lamp, depending on whether it is desired to communicate power and data to and/or from the lamp at one or both ends. For lamps designed to receive or transmit power and/or data at only one end, the opposite end preferably includes an end cap of similar design having an opening sized to receive the leading end of another connector 160 but omitting the internal PCB connector board and jack assembly.

Figure 14A:
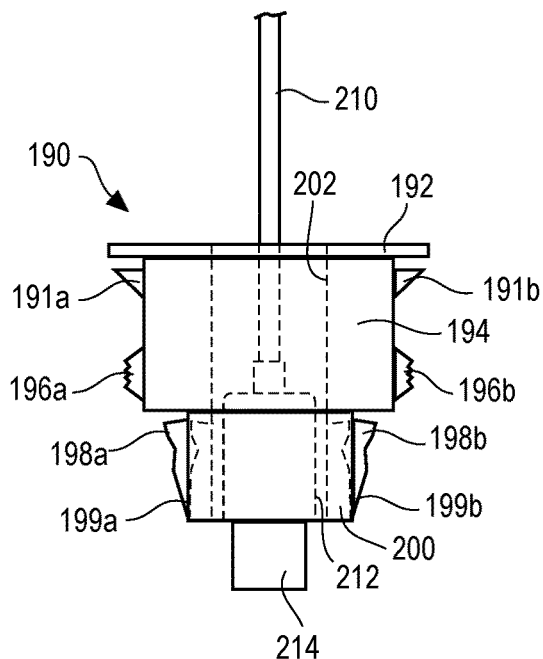
FIG. 14A is a side perspective view of an embodiment of the snap-fit connector assembly, and showing a proximal base end for mounting to a lighting fixture, a mid-portion including a snap-fit actuator assembly, and a distal tip portion, and with a USB plug and cable extending through an internal channel extending from the proximal base end to the distal tip end.
Figure 14B:
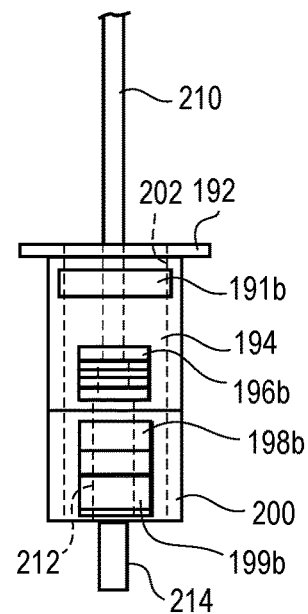
FIG. 14B is a right side view of the snap-fit connector assembly and USB cable shown in FIG. 14A.

FIGS. 14A and 14B illustrate another embodiment of a snap-fit connector assembly in accordance with the invention. The connector 190 shown in this embodiment is similar to the previously described connector 160 except that it is adapted for use with a standard Universal Serial Bus (USB) cable instead of an Ethernet cable. As mentioned above, USB cables and connectors conform to industry standards, which include communications protocols for connection, data communication, and power supply between computers, computer peripherals and other devices, such as smartphones, PDAs and video game consoles. Current USB standards specify the use of twisted pair cabling and specify standard cable can have a maximum length of 3-5 meters depending on device type. There are currently several available types of USB cable plugs available and known to those skilled in the art (including for example Type-A, Type-B, Mini-A, Mini-B, Micro-A, Micro-B, Standard A, Standard B, USB 3.0 micro B, and Type-C), and the connector assemblies disclosed herein can readily be adapted for use with any of these. Each plug type has a corresponding port type into which the plug may insert (Type-A plugs mate only with Type-A port, etc.). In the embodiment illustrated in FIGS. 14A and 14B, standard USB cable 210 terminates in a Type-A plug 212, which has a leading end 214 in the form of a flattened rectangle that inserts into a port receptacle on the USB host, or a hub, and carries both power and data. This type of plug is frequently used on cables that are permanently attached to a device, such as one connecting a keyboard or mouse to the computer via USB connection. The plug 212 includes both data pins and power pins (not shown) recessed within the plug. In one alternative, available USB plugs that provide power connections but no data connections may be used if only power is to be supplied to the lamp.

Embodiments according to this aspect of the invention provide a convenient and reliable mechanism for mounting an LED tube lamp to a support and communicating power and/or data to and from the lamp using standard USB cabling and protocols. Given the length limitation imposed by applicable standards, the USB cables would typically be deployed as branch cables a main network line to LED lamps over short distances. As shown in the figures, connector 190 has base portion 194 with flange 192 extending around the periphery of the base portion at a proximal end thereof. Flanges 191a and 191b extend outwardly from opposite sidewalls of base portion 194 and define slots between the flanges 191a, 191b and the peripheral flange 192 for engaging tabs of a support of a lighting fixture. Leading end portion 200 has a narrowed profile to permit the leading end to insert into an opening in an upper surface of a corresponding lamp end cap assembly. The leading end portion 200 has deployable parts 198a, 198b attached to the sidewalls by live hinges 199a, 199b, which operate in essentially the same manner as described above with respect to the corresponding parts of connector 30. Connector 190 also includes actuators 196a, 196b connected to the deployable parts 198a, 198b on opposite sides for causing the corresponding deployable parts to shift back and forth between the engaged and assembly positions. It operates in substantially the same way as the previously disclosed connector embodiments to engage and connect to a lamp end cap assembly, with leading end 200 inserted through an opening extending internal to the end cap assembly and deployable parts 198a, 198b capturing edge portions of the end cap side wall proximate the opening between upper surfaces thereof and opposed surfaces of base portion 194.

The connector 190 includes a central channel 202 extending from a first opening in the end wall at its base end to a second opening in the opposite end wall of the leading end. The channel 202 is sized to provide a pathway allowing USB cable 220 with terminal USB plug 212 to extend through connector 200 from its base end to its leading end as shown. When the lamp end cap assembly, connector 200 and plug 212 are in an engaged configuration, at least the leading end portion 214 of the plug is positioned forward of the leading edge of connector 200.

Figure 14C:
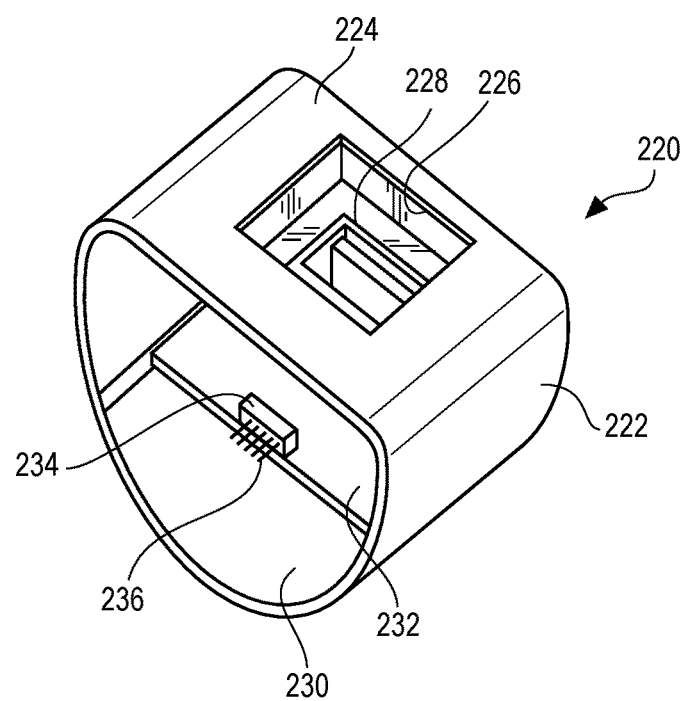
FIG. 14C shows a linear LED lamp end cap defining an opening in an upward facing sidewall thereof and an internal USB port configured to receive the distal tip end of the snap-fit connector assembly and the USB cable plug.

FIG. 14C shows one embodiment of an end cap assembly 220 of an LED tube lamp (not shown) designed to be installed on a support using connector 200. The end cap assembly 220 has a generally planar upper sidewall 224 and curved sidewall 222 which define a receptacle 230 for receiving an end of the body portion of an LED tube lamp. PCB connector board 232 is mounted in a horizontal orientation within the receptacle, and a Type-A USB port 228 is mounted on the connector board as shown. The PCB connector board 232 further comprises connector 234 having leads 236 for communicating power and/or data signals to components within the associated LED lamp body. The upper sidewall 224 defines generally rectangular opening 226 sized for receiving leading end portion 200 of connector 190. The USB port 228 opens upward toward the opening 226 in upper sidewall 224, and the two openings are generally aligned.

LED tube lamps may be provided with an end cap assembly 220 at a single end or at both ends of the lamp, depending on whether it is desired to communicate power and data to and/or from the lamp at one or both ends. For lamps designed to receive or transmit power and/or data at only one end, the opposite end preferably includes an end cap of similar design having an opening sized to receive the leading end of another connector 190 but omitting the internal PCB connector board and USB port assembly.

The end cap assembly 220 disposed at a first end of an LED tube lamp may engage with connector 190 to secure a first lamp end to a support. In one approach, end cap assembly 220 is translated upward in a substantially straight path and into an engaged position in which leading end portion 200 of connector 190 resides within the end cap assembly and deployable parts 198a, 198b capture edge portions of upper sidewall 224 proximate opening 226. After the end cap assembly 220 is securely mated with connector 190, the plug 212 and cable 210 may be advanced through the central channel 202 of the connector downward towards port 228. The plug 212 is advanced downward in the channel until its leading end portion 214 enters passes through opening 226 into the end cap assembly and inserts within the receptacle of port 228 to connect the lamp to the network. In an alternative approach, the installer may first advance plug 212 through connector 190 and into engagement with port 228 of end cap assembly 220, and then move the end cap assembly and plug upward and into the engaged position relative to connector 190 to attach a first end of the lamp to the support. Squeezing the actuators 196a, 196b allows the end cap assembly 220 to be separated from connector 190 in the same manner described with regard to other embodiments above. The plug 212 may then be disengaged from port 228.

Lighting systems in which a network cable runs through the snap-fit connector and plugs directly into a jack of the lamp end cap assembly may be also be provided to support other integrated power and data standards besides Ethernet and USB. As will be recognized by those skilled in the art, the snap-fit connector may be customized to confirm to other standards by providing an appropriately sized internal channel to accommodate the particular cable plug geometry, providing a compatible jack in the lamp end cap assembly, and providing suitable controllers or other circuitry on the end cap PCB or another PCB of the lamp.

The snap-fit connector assemblies disclosed herein may be deployed in other applications beyond retrofitting of conventional fluorescent lighting fixtures and new installations of ceiling grid or pendant troffer type fixtures. In one aspect, pendant lighting fixtures may be provided by suspending supports comprising an elongate rectangular flat stock of aluminum or other suitable material by cables from the main structural ceiling. A pair of snap-fit connectors are mounted at opposite ends of the support stock, and a network compatible LED tubed lamp is snap connected at its end cap assemblies to the connectors. Networked power and data connectivity are provided to the lamp by plugging a branch cable of the LAN into the jack of a lamp end cap. Multiple lamps may be included in each fixture if desired. Using conventional molding techniques, the base portion of the snap-fit connectors may be adapted so that it interlocks with the particular tabs, slots or other mounting mechanism of the particular support structure used.

The network enabled LED tube lighting systems described thus far utilize a snap-fit connector assembly of the type disclosed to mount the LED tubes to a conventional tube lighting fixture. In another aspect, networked enabled LED tube lamps adapted to be mounted directly to a ceiling grid are also disclosed. Alternative embodiments illustrating such a lamp format, and novel mounting clips for securing the lamps to an overhead ceiling grid will now be discussed.

Figure 15:
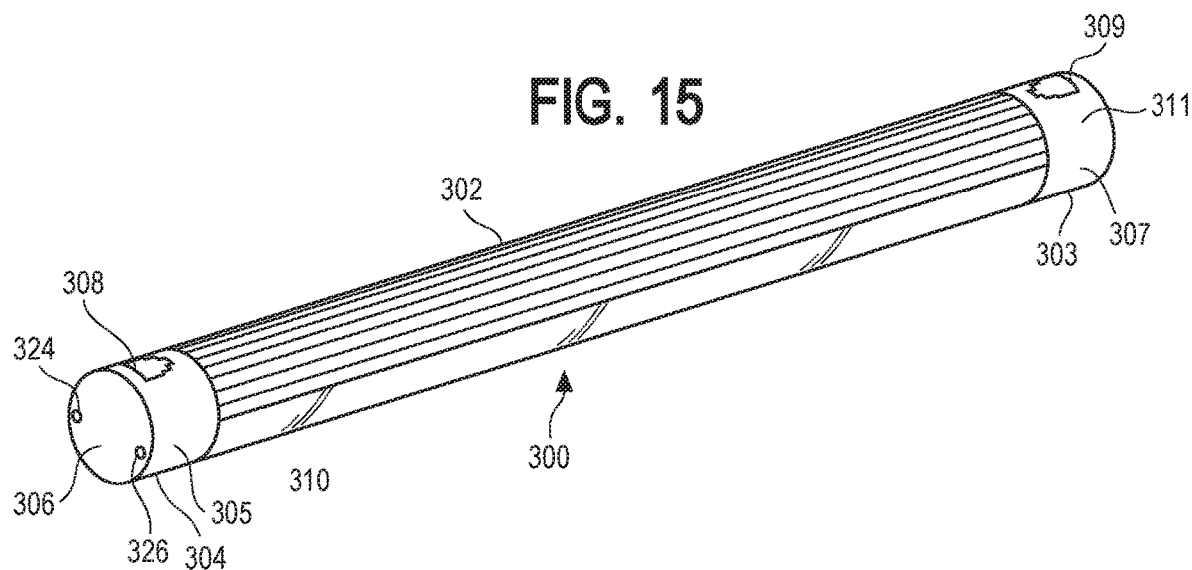
FIG. 15 is a perspective view of a cylindrical, network compatible linear LED lamp having an external heat sink extending over a portion of the circumference of an elongate body portion and having end cap assemblies at opposite ends of the body, showing an Ethernet jack integral with each end cap and accessible through a sidewall of the end cap.
Figure 16:
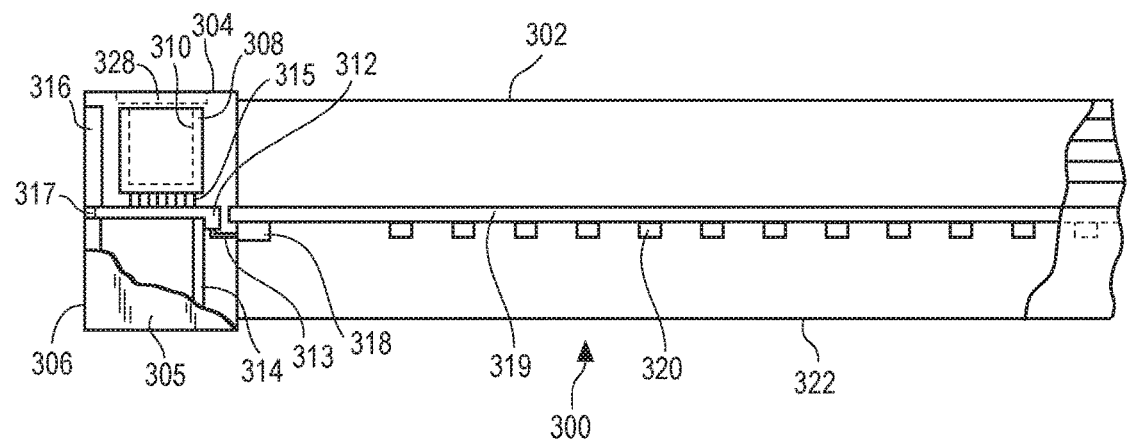
FIG. 16 is a partial side perspective view of the lamp of FIG. 15 with portions cut away to expose internal components, and showing an enlarged view of an end cap assembly comprising an Ethernet jack mounted to a horizontally oriented PCB connector board for receiving the terminal plug of an Ethernet cable and transferring power and data between a network and internal components of the lamp.

FIG. 15 shows a perspective view of a cylindrical linear LED lamp 300 having an external heat sink 302 extending over a portion of the circumference of an elongate body portion, and having end cap assemblies 303 and 304 at opposite ends of the body secured to the body by fasteners 324 and 326. Both end cap assemblies are the same in the illustrated lamp 300, and FIG. 16 shows the internal design thereof by providing a partial cut-away view of a portion of the LED tube lamp 300 with an enlarged view of end cap assembly 304. The lamp body as depicted illustrates a standard LED tube lamp design having an internally mounted LED emitter board 319 on which a series of LEDs 320 are arranged in one or more rows. A transparent or translucent outer lens 322 extends around a portion of the body. Other lamp designs are also possible, including those having multi-sided heat sink and multiple LED emitter boards mounted at angles to each other similar to the embodiment of FIGS. 9A, 9B and 10.

The end cap assembly 304 shown in FIG. 16 is similar to end cap assembly 90 of FIG. 7. As shown in FIG. 16, end cap assembly 304 houses a horizontally disposed internal PCB connector 312, which is in communication with connector 318 internal to the lamp body through conductive leads 313. An edge portion of PCB 312 is supported within a slot 317 extending horizontally along inner surface 316 of end wall 306 of the end cap assembly, and a post 314 supports the PCB at its opposite end. Ethernet jack 308 is mounted on the PCB 312 and electrically connected to it by pins 315. The upper facing curved sidewall portion 305 defines opening 328. The jack 308 is positioned so that its receptacle 310 opens upward and is generally aligned with sidewall opening 328. The other end cap assembly 303 includes a comparable jack 309 also orientated such that its receptacle 311 opens upward and is generally aligned with an opening in an upper portion of curved sidewall 307. The end cap assembly 304 differs from end cap assembly 90 of FIG. 7 primarily in that PCB 312 and jack 308 are mounted at a raised position so that the vertical distance between the jack receptacle 310 and the opening 328 is substantially reduced. This configuration permits a standard Ethernet cable plug to insert directly into the jack along a pathway perpendicular to the length of the lamp for communicating power and data between a computer network and internal components of the lamp. As a result of the elevated vertical position of jack 308, only the leading end portion of the cable plug is internal to the end cap assembly, and a portion of the latching tab thereof projects external to the end cap and is accessible to disengage the plug from the jack.

Figure 17:
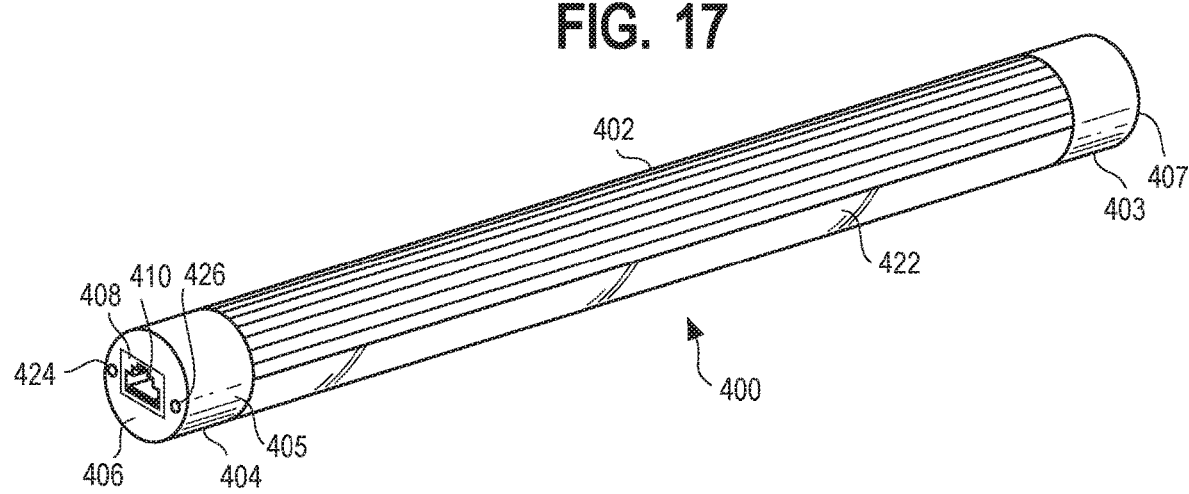
FIG. 17 is a perspective view of a cylindrical, network compatible linear LED lamp having an external heat sink extending over a portion of the circumference of an elongate body portion and having end cap assemblies at opposite ends of the body, showing an Ethernet jack integral with an end cap and accessible through the end wall of the end cap.
Figure 18:
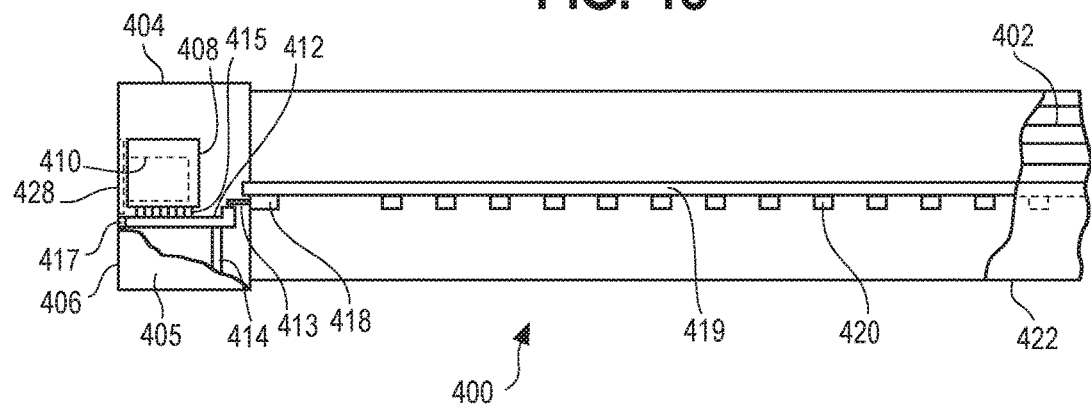
FIG. 18 is a side perspective view of the lamp of FIG. 17 with portions cut away to expose internal components, and showing an enlarged view of an end cap assembly comprising an Ethernet jack mounted to a horizontally oriented PCB connector board for receiving the terminal plug of an Ethernet cable and transferring power and data between a network and internal components of the lamp.

FIGS. 17 and 18 illustrate a networkable linear LED lamp similar to the lamp of the previous embodiment, except that the internal jacks can be accessed through the end wall of the end cap assemblies. Thus, FIG. 17 shows a perspective view of a linear cylindrical LED lamp 400 having an external heat sink 402 extending over a portion of the circumference of an elongate body portion, and having end cap assemblies 403 and 404 at opposite ends of the body secured to the lamp body by fasteners 424 and 426. Both end cap assemblies are the same in the illustrated lamp 400, and FIG. 18 shows the internal design thereof by providing a partial cut-away view of a portion of the linear LED lamp 400 with an enlarged view of end cap assembly 404. The lamp body as depicted illustrates a standard LED tube lamp design having an internally mounted LED emitter board 419 on which a series of LEDs 420 are arranged in one or more rows. A transparent or translucent outer lens 422 extends around a portion of the body. Other lamp designs are also possible, including those having multi-sided heat sink and multiple LED emitter boards mounted at angles to each other similar to the embodiment of FIGS. 9A, 9B and 10.

As shown in FIG. 18, end cap assembly 404 houses a horizontally disposed internal PCB connector 412, which is in communication with connector 418 internal to the lamp body through conductive leads 413. An edge portion of PCB 412 is supported within a slot 417 extending horizontally along inner surface of end wall 406 of the end cap assembly, and a post 414 supports the PCB at its opposite end. Ethernet jack 408 is mounted on the PCB 412 and electrically connected to it by pins 415. The end wall 406 defines opening 428. The jack 408 is positioned so that its receptacle 410 opens laterally and is generally aligned with end wall opening 428. The other end cap assembly 403 includes a comparable jack (not shown) also orientated such that its receptacle opens laterally and is generally aligned with an opening in its end wall. The jack 408 is positioned with minimal distance between receptacle 410 and the opening 428. This configuration permits a standard Ethernet cable plug to insert directly into the jack using a lateral approach along the direction of the length of the lamp for communicating power and data between a computer network and internal components of the lamp. When the plug is engaged within jack 408, a portion of the latching tab thereof projects external of the end cap and is accessible to disengage the plug from the jack.

The network enabled LED tube lamps of the type illustrated in FIGS. 15 to 18 may be modified to conform to other power and data communications standards by utilizing the applicable module jacks within the end cap assemblies and including the appropriate communication chip sets in a PCB of the end cap assembly or internal to the lamp body.

The end cap assemblies 303 and 304 of the disclosed lamp 300 are not compatible with the snap-fit connectors disclosed above, as the jack occupies the internal region where the leading end of the connector would typically reside. The lamp 400 is also not configured for use with the snap-fit connector system; it does not have openings in a sidewall of the end caps for receiving the leading end of a snap-fit connector. These lamps are instead adapted for use in an overhead lighting system that includes an arrangement of networked LED tube lamps mounted directly to an overhead ceiling grid by other means. This is explained more fully below with reference to the further illustrations in FIGS. 19 to 22.

As is known to those skilled in the art, a dropped ceiling is a secondary ceiling hung below the main structural ceiling. Drop ceilings are common in both residential and commercial buildings. They advantageously hide the building infrastructure, including piping, wiring, sprinkler systems and/or ductwork, by creating a plenum space above the dropped ceiling, while allowing access for repairs and inspections. Other advantages include improved room acoustics and thermal energy insulation. A typical dropped ceiling consists of a grid-work of metal channels in the shape of an upside-down "T", suspended on wires from the overhead structure. These channels snap together in a regularly spaced pattern of cells. Each cell is then filled with lightweight ceiling tiles or "panels" which simply drop into the grid. Standard cell sizes may vary by region. In the United States, for example, the cell size in the suspension grids is typically either 2 ft×2 ft or 2 ft×4 ft and the ceiling tiles are the same size. In Europe the cell size in the suspension grids is 600×600 mm, while the ceiling tiles are slightly smaller. An older, less common type of dropped ceiling is the concealed grid system, in which panels are interlocked into each other and the grid with the use of small strips of metal called "splines". Normally, these type of ceilings will have a "key panel" which can be removed, allowing for the other panels to be slid out of the grid.

Figure 21:
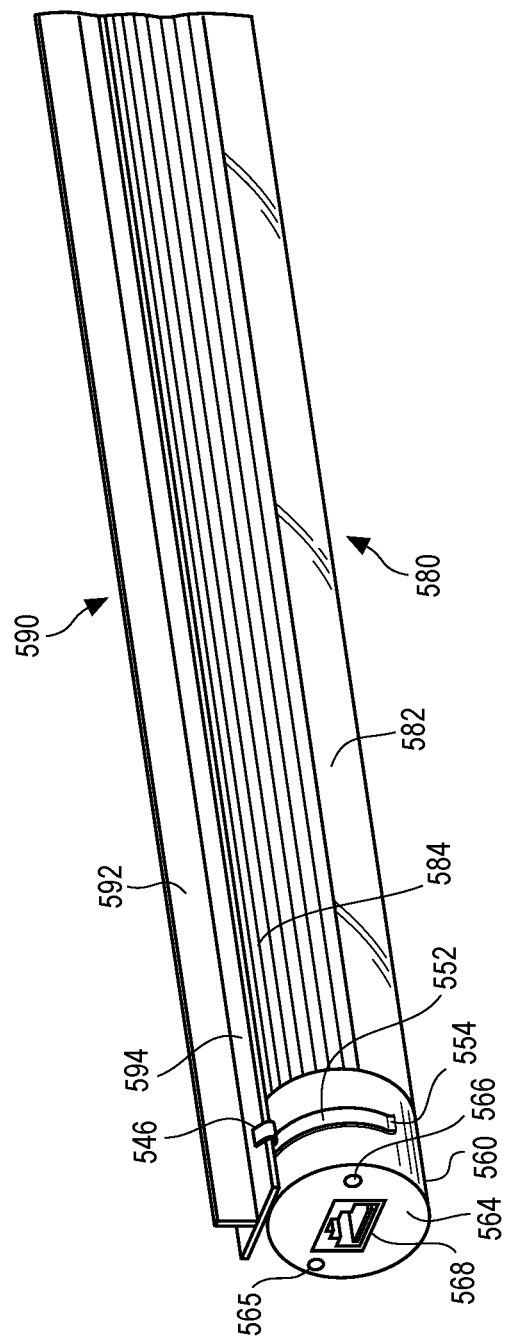
FIG. 21 is a perspective view showing the mounting clip and generally cylindrical LED tube lamp of FIGS. 20A and 20B joined to a cross member of a ceiling grid of a suspension ceiling system.

FIG. 21 illustrates the direct mounting of an LED tube lamp of the type disclosed in FIGS. 17 and 18 to a ceiling grid using a novel clip mounting system disclosed herein. The lamp 580 depicted in FIG. 21 has an elongated cylindrical body with external heat sink 584 extending along an upper portion thereof and translucent or transparent lens 582 extending along a lower portion of the body. The lamp 580 includes end cap assemblies at each end, which are designed and operate substantially the same as those disclosed in the lamp of FIGS. 17 and 18. FIG. 21 shows a perspective view of end cap assembly 560 at a first end of the lamp, which is attached to the lamp body by fasteners 565 and 566. An integrated Ethernet jack 568 is accessible through the end wall 564 of the end cap assembly. The lamp 580 is shown suspending from metal channel 590 of a drop ceiling grid. The channel 590 includes horizontally extending ledge 594 and vertically extending divider 592, as is typical of the upside down T channels suspended by wires, cables or other means from the overhead structure. A first end of lamp 580 is mounted to channel 590 by a mounting clip having a first upper portion that snap clamps on the ledge of channel 590 and a second lower portion that holds the end cap assembly 560 of the lamp. Although not shown in the figure, a second substantially identical clip secures the opposite end of the lamp to the ceiling grid.

Figure 20A:
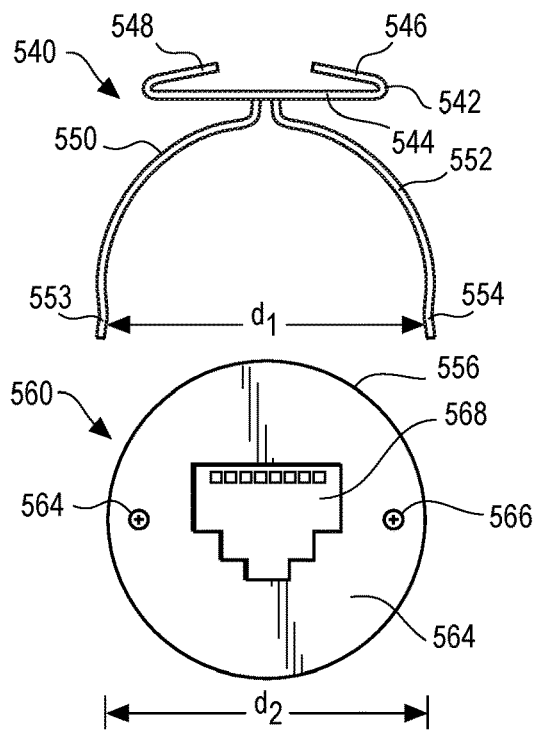
FIG. 20A is a perspective end view showing the end cap of a linear LED lamp of generally circular cross-section and a mounting clip for securing the end cap and lamp to a ceiling grid.

FIG. 20A shows a view of lamp 580 facing its end cap assembly 560, together with mounting clip 540. The mounting clip 540 is preferably formed of a thin piece of spring steel having a high yield strength that allows it to be deformed and return to its original shape despite significant deflection. It has an upper clip portion 542 comprising a pair of tabs 546 and 548 extending at an angle from opposite ends of horizontally extending mid-portion 544. As shown in FIG. 21, the tabs 546 and 548 function to grasp ledge 594 with the inner surface of the tabs opposing the upper facing surface of the ledge to secure the mounting clip 540 to the channel 590. To secure the mounting clip 542 to the channel 590, the resilient tabs 546 and 548 may be deflected upward from their relaxed shape into an expanded, generally vertical orientation (increasing the included angle between the tabs and mid-portion 544) so that mid-portion 544 may be moved upward against the ledge 594 of channel 590 with the ledge residing between the tabs. When the tabs are released, they return to their relaxed shape to maintain a secure connection between the opposed surfaces of the tabs and the ledge. The position of the mounting clip is easily adjusted by sliding it along the length of the channel 590.

A pair of fingers 550 and 552 extend from the upper clip portion 542. Each finger is connected at its proximal end by a short vertical strut to upper clip portion 542 and extends outwardly in a curved profile to define a generally semicircular interior space between the opposite fingers. The distal tip 553 of finger 550, and distal tip 554 of finger 552 extends inward towards each other. The fingers 550 and 552 are of a size and shape adapted to conform to the outer circumferential geometry of the lamp 580, and the distance $d_1$ between the opposite distal tips 553 and 554 is slightly less than the maximum cross sectional outer diameter $d_2$ of the end cap assembly 560. Thus, with mounting clip 590 secured to the ceiling grid, the lamp 580 may be mounted to the grid by moving end cap assembly 560 upward and into engagement with the fingers 550 and 552. The engagement between the sidewall surfaces of the end cap assembly and the distal tips 553 and 554 of the fingers causes the fingers to deflect outwardly to an expanded assembly configuration, with the spring force of each finger pressing the finger inwardly against the outer surface of the end cap assembly. The fingers reach a fully expanded configuration when their distal tips engage the maximum diameter region of the end cap 560. As the end cap is advanced further upward towards the ceiling grid, the fingers engage reduced diameter portions of the end cap and contract in a direction towards each other under biasing spring forces. With the end cap assembly 560 and mounting clip 540 in the fully engaged configuration shown in FIG. 20B, the fingers 550 and 552 firmly grasp the end cap assembly, with their inwardly curved distal tip portions 553 and 554 imparting vertical forces preventing end cap assembly from detaching from the mounting clip during normal operation of the lamp. The opposite end of lamp 580 is secured to the ceiling grid using a second such clip in the same manner. Although the mounting clip 540 is shown in the figures engaging the end cap assembly of lamp 580, it may alternatively be positioned along the ceiling grid channel 590 to grasp the body portion of the lamp between the end caps.

Figure 19A:
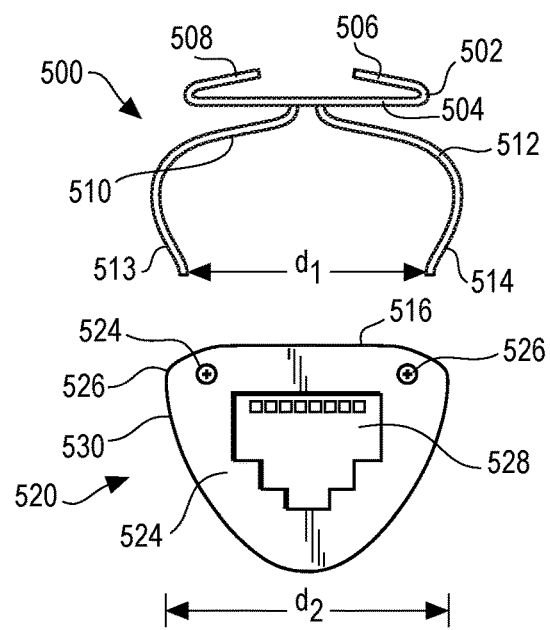
FIG. 19A is a perspective end view showing the end cap of a linear LED lamp of generally triangular cross-section and a mounting clip for securing the end cap and lamp to a ceiling grid.
Figure 19B:
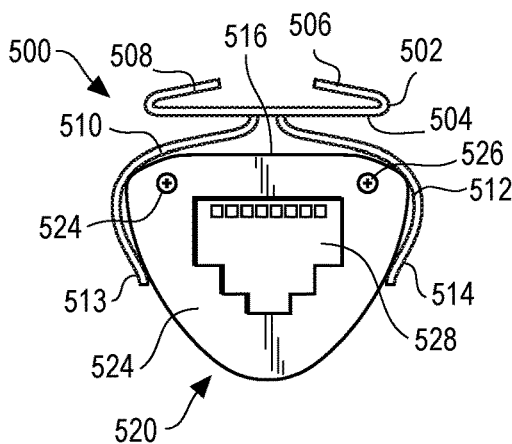
FIG. 19B is a view of the components of FIG. 19A, with the mounting clip and end cap joined in an assembled configuration.

The disclosed mounting clips may be provided in different shapes adapted to the particular outer geometry of the LED tube lamp. As another example, FIGS. 19A and 19B illustrate one such mounting clip adapted to hold a lamp having a generally U-shape cross-sectional configuration. The disclosed mounting clip 500 has an upper clip portion 502 comprising a pair of tabs 506 and 508 extending at an angle from opposite ends of horizontally extending mid-portion 504. The upper clip portion functions in the same manner described for mounting clip 540 to clamp the mounting clip to a channel of an overhead ceiling grid.

A pair of fingers 510 and 512 extend from the upper clip portion 502. Each finger is connected at its proximal end by a short vertical strut to upper clip portion 502 and extends outwardly in a curved profile corresponding generally to the upper portion of U-shaped end cap assembly 520. The distal tip 513 of finger 510, and distal tip 514 of finger 512, extend inward toward each other. As with the previous embodiment, the distance $d_1$ between the opposite distal tips 513 and 514 is slightly less than the maximum cross sectional outer diameter $d_2$ of the end cap assembly 520. With mounting clip 500 secured to the ceiling grid, the lamp may be mounted to the grid by moving end cap assembly 520 upward and into engagement with the fingers 510 and 512. The sidewall surfaces of the end cap assembly and the distal tips 513 and 514 of the fingers interact with each other in essentially the same manner as in the previous embodiment during lamp installation. FIG. 19B shows the end cap assembly 560 and mounting clip 540 in the fully engaged configuration, with the fingers 510 and 512 firmly holding the end cap assembly and preventing the end cap assembly from detaching from the mounting clip during normal operation of the lamp. Although the mounting clip 500 is shown in the figures engaging the end cap assembly of the lamp, it may alternatively be positioned along the ceiling grid channel 590 to grasp the body portion of the lamp between the end caps.

Figure 26A:
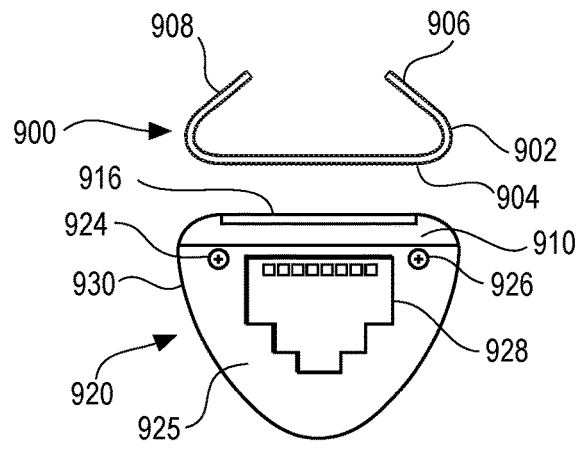
FIG. 26A is a perspective end view showing the end cap of an alternative linear LED lamp of generally triangular cross-section and an alternative mounting clip for securing the end cap and lamp to a ceiling grid.

FIGS. 26A-26D illustrate an alternative linear LED lamp and ceiling grid mounting clip system in accordance with the principals of the disclosed invention. The mounting clip 900 is similar to the mounting clips of the previously disclosed embodiments but does not include finger extensions for engaging and grasping outer surfaces of the lamp. Mounting clip 900 connects to the ceiling grid in essentially the same manner described for the previous embodiments. As shown in FIG. 26A, the clip 900 comprises a pair of tabs 906 and 908 extending at an angle at elbow portions 902 from opposite ends of horizontally extending mid-portion 904, which function to grasp the horizontally extending ledge of a T-channel of an overhead drop ceiling grid structure, with the inner surface of the tabs opposing the upper facing surface of the ledge to secure the mounting clip 900 to the T-channel. The tabs 906 and 908 are formed of a resilient material that deflects upward from their relaxed shape into an expanded, generally vertical orientation so that mid-portion 904 may be moved upward against the ledge of the T-channel with the ledge residing between the tabs. When the tabs are released, they return to their relaxed shape to maintain a secure connection between the opposed surfaces of the tabs and the ledge.

Figure 26B:
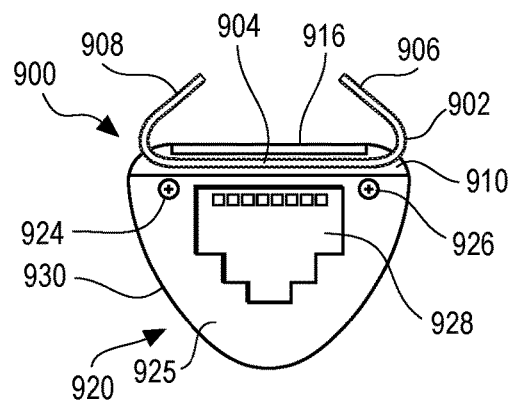
FIG. 26B is a view of the components of FIG. 26A, with the mounting clip and end cap joined in an assembled configuration.
Figure 26C:
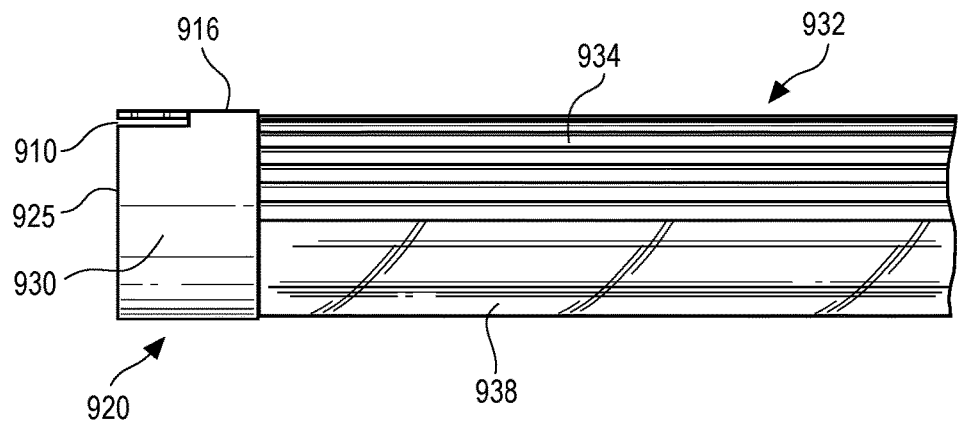
FIG. 26C is a partial side perspective view of the linear LED lamp of FIG. 26A.
Figure 26D:
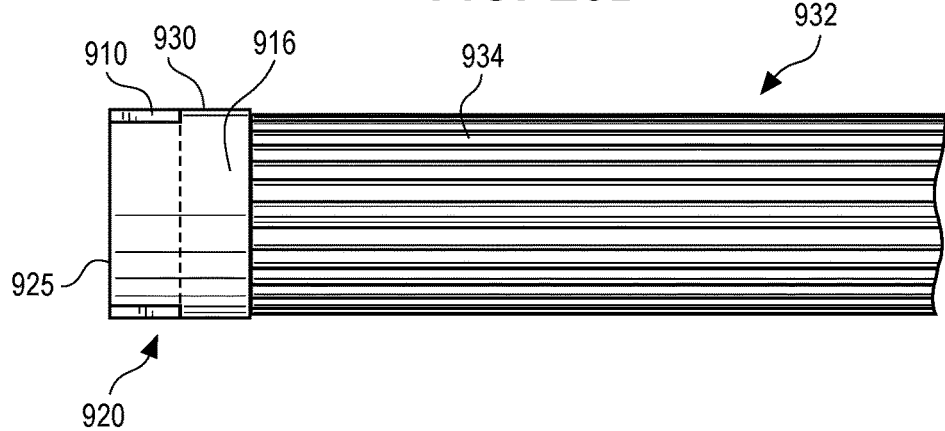
FIG. 26D is another partial side perspective view of the lamp of FIG. 26A.

The lamp 932 is similar to the lamp 520 illustrated in FIG. 19A. As depicted in FIGS. 26C and 26D, it has an elongated cylindrical body with external heat sink 934 extending along an upper portion thereof and translucent or transparent lens 938 extending along a lower portion of the body. The lamp 932 includes end cap assemblies at each end. FIG. 26A shows an end view of end cap assembly 920 at a first end of the lamp, which is attached to the lamp body by fasteners 924 and 926. End cap assembly 920 includes end wall 925 extending traverse to the length of the lamp body, and sidewall portions 930 extending generally perpendicular from the end wall toward and along a portion of the length of the lamp body and defining a receptacle opening into which the first end of the lamp body extends. An integrated Ethernet jack 928 is accessible through the end wall 925 of the end cap assembly. End cap assembly 920 includes upper sidewall portion 916 which faces upward when the lamp 932 is mounted to an overhead ceiling structure. As shown in FIG. 26C, upper sidewall portion 916 extends to the end wall 925. End wall 925 includes slot 910, which extends laterally across the end wall and into the sidewall portions immediately below upper sidewall portion 916. The slot 910 is shown from a side view in FIG. 26C and from a perspective looking down on the upper surface of lamp 932 in FIG. 26D.

Mid-portion 904 of mounting clip 900 is dimensioned so that it may be inserted linearly into slot 910 along the direction of the length of the lamp body, where it is trapped between an end portion of upper sidewall portion 916 and portions of end wall 925 and sidewalls 930 of end cap assembly 920. This is illustrated in FIG. 26B. With the mounting clip 900 secured to the end cap assembly in this manner, the mounting clip may be clamped on the ledge a T-channel to secure the lamp 932 to the overhead ceiling grid system. One advantage of the approach illustrated in this embodiment is that the mounting clip 900 may be fully concealed from view when the lamp 932 is secured to an overhead ceiling grid.

Although not shown in the figure, a second substantially identical end cap assembly and mounting clip secures the opposite end of the lamp to the ceiling grid. The end cap assembly at the opposite end of the lamp may or may not include an integrated network communications jack, depending on the needs of the networked LED linear lighting system deployed. Of course, based on the teachings herein, the alternative end cap assembly and mounting clip system illustrated in the embodiment of FIGS. 26A-26D may also be readily adapted to be deployed to mount linear tube LED lamps of different sizes and geometries, including for example lamps having generally cylindrical cross-sectional profiles.

Figure 20B:
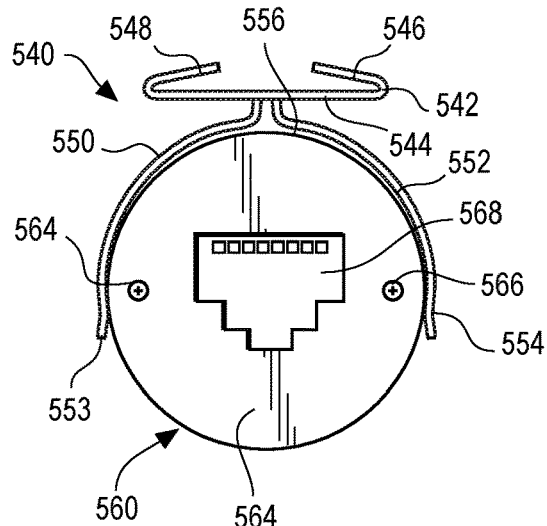
FIG. 20B is a view of the components of FIG. 20A, with the mounting clip and end cap joined in an assembled configuration.
Figure 22:
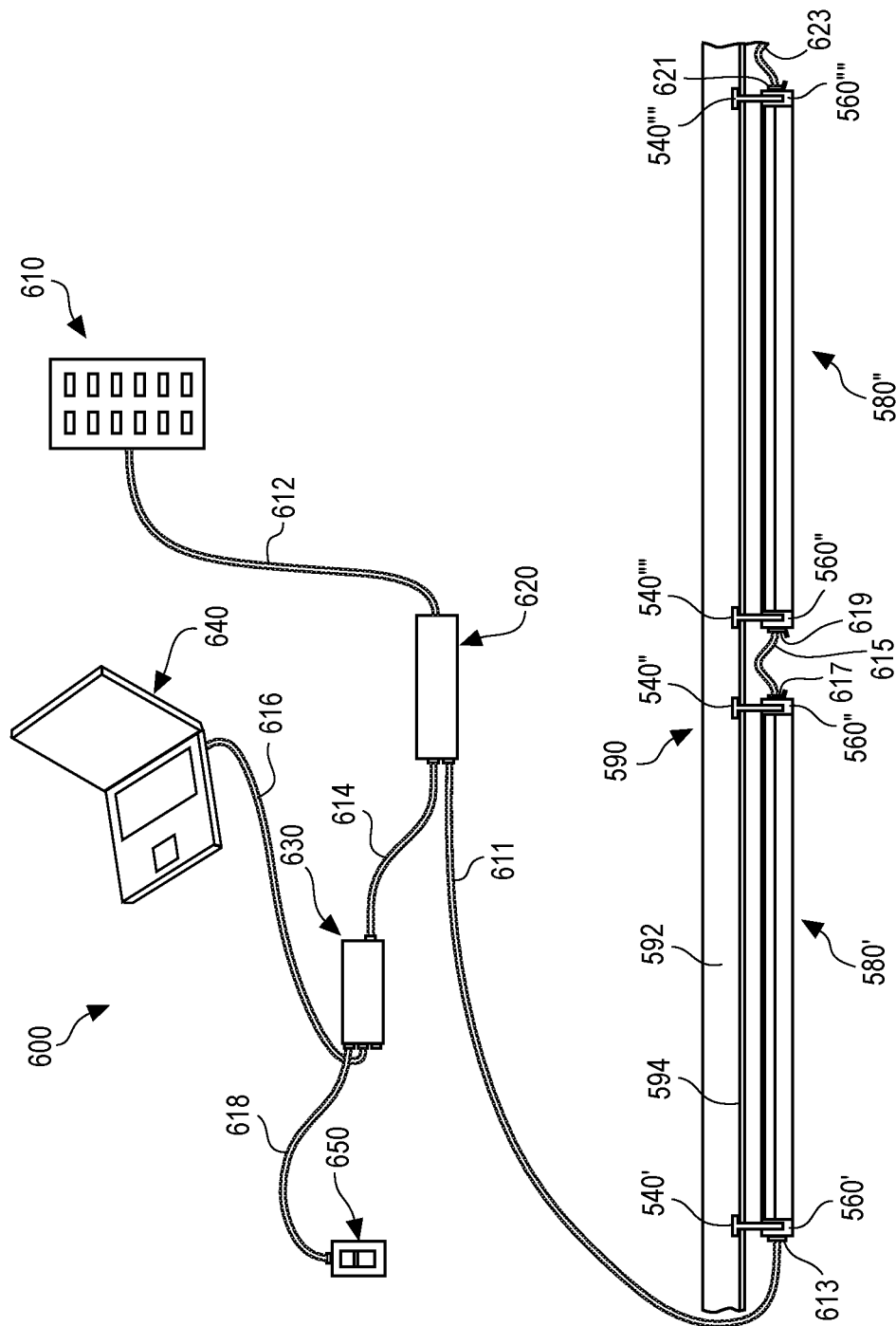
FIG. 22 is system diagram of a networked lighting system showing multiple linear LED lamps of the type depicted in FIG. 21 mounted to a ceiling grid using mounting clips as shown in FIGS. 20A and 20B.

The network compatible linear LED lamps and mounting clip system disclosed herein make it possible to deploy a complete room lighting system without installing new lighting fixtures or being confined to the physical arrangement of existing tube lighting fixtures in the ceiling grid. One such system 600 is illustrated in FIG. 22, which shows a networked lighting system having multiple linear LED lamps of the type depicted in FIG. 21 mounted to a ceiling grid with mounting clips as shown in FIGS. 20A and 20B. The figure shows two such lamps, 580' and 580", arranged end-to-end in series along a channel 590 of the ceiling grid. The lamp 580' has opposite end cap assemblies 560' and 560", which are secured to the ceiling grid by mounting clips 540' and 540" respectively. The lamp 580" is similarly mounted using clips 540''' and 540''''. The lamps are networked to each other by a jumper cable 615 having a male plug at each end mated with the corresponding Ethernet jack in the end wall of end cap assemblies 560" and 560'''. The lamp 580" is networked to another adjacent lamp of the system (not shown) using another jumper cable 623, and additional lamps may be similarly mounted to the ceiling grid and connected to each other. This serially connected branch of lamps is networked to a centralized power distribution and control system through cable 611 having plug 613 inserted in the jack of end cap assembly 560' of lamp 580'. If the jumper cables are sufficiently long, it may be preferable to keep their main span above the ceiling tiles and concealed from view. Alternatively, the cable may be concealed using a wiring raceway adapted to connect to the ceiling grid channels between adjacent lamps.

As FIG. 22 illustrates, the disclosed power and control system includes Ethernet switch 620, which receives AC power over line 612 from a conventional AC power panel 610. Power and data is communicated from the switch and to the serially connected LED lamps over cable 611 and the intermediate jumper cables. A control module 630 is also plugged into the switch for receiving power at the control module and communicating data between the control module and switch. The control module is a central point of communication and coordinates all data communications with the lamps and also controls the power supplied to the lamps. Various peripheral devices may be networked to the control module, such as computer 640 connected via cable 616 and peripheral device 650, which may represent a variety of devices such as dimmers, sensors and controllers. Other peripheral devices may communicate with the control module wirelessly, using Bluetooth or other available wireless communication protocols. In one alternative, control module 630 and switch 620 may be implemented as one unit rather than as separate connected components.

The system 600 is thus a fully networked LED lighting system capable of a variety of smart lighting functionalities. Power provided to the first lamp 580' can be further distributed over jumper cable 615 to the next lamp 580" and then to each consecutive lamp in the chain in a like manner. Control data and commands may be communicated to control modules mounted within each lamp of the chain using a suitable addressing mechanism, with each control module processing only those messages that are addressed to that lamp. Operational data generated or collected by individual lamps may be communicated back to the central control module 630 and/or one or more peripheral devices over the same network path. The system is easily and inexpensively deployed using standard computer and networking equipment without requiring alteration or removal of existing lighting infrastructure or the installation of conventional tube lighting fixtures in the case of new construction.

Although FIG. 22 shows the lamps mounted close together for purposes of illustrating the features of the system, the mounting clips and integrated PoE capabilities of the lamps provide the flexibility to arrange the lamps as desired to provide efficient lighting that meets the characteristics and needs of each particular application. Importantly, lamp distribution is not confined by the location of existing fixtures or building codes governing the placement of new fixtures in drop ceiling grids. A 30 ft×20 ft room, for example, may be illuminated by fifteen T8 (4 foot) lamps, arranged in three rows spaced approximately 6 ft apart and with 2 ft spacing between the ends of the five lamps in each row. In another example, a commercial work space may have employee work stations that receive inadequate lighting due to their location between adjacent banks of ceiling grid lighting fixtures. Such a lighting system is easily augmented by mounting the disclosed linear LED lamps to the ceiling grid in between the existing fixtures to provide supplemental illumination on those intermediate regions.

Of course, many variations of the system 600 illustrated are possible, supported by the network enabled linear LED lamps disclosed herein and convenient mounting clips for mounting the lamps to the ceiling grid. Various control, sensor and computing devices may be included in the lighting system to achieve desired objectives, and the centralized control system may connect to individual lamps using a variety of network configurations, including the branch chain configuration shown, direct hub and spoke connections to individual lamps, or any other network configuration. The lamps may be equipped with network enabled jacks and associated electronic components at one or both ends to support the desired network architecture.

Other mechanisms may be utilized to secure the lamps to the ceiling grid. In one aspect, the lamps can be secured to the ceiling grid using magnets to force the lamp upward against one or more metal channels of the ceiling grid. The magnets may be integrated, for example, into the end cap assemblies of the lamp, or may be provided separate from the lamps.

A networked automated linear lamp based LED lighting system consisting of individual lamps mounted directly the ceiling grid offers certain advantages. Building and safety codes govern various aspects of the wiring, electrical equipment and other devices installed in the space above a dropped ceiling. New wiring must be routed in a way that will not interfere with existing equipment, and any installation into this space must comply with all regulations and will normally require the building owner to obtain a new inspection to certify compliance. The disclosed network compatible linear LED lamps allow the entire system to be installed below the drop ceiling without altering the space above.

The installation process is simple, comparable to hanging holiday lighting. It involves simply attaching the mounting clips or other mounting devices to the ceiling grid at the desired locations, securing the LED lamps to the clips, and then connecting the lamps to the network using standard Ethernet cables. Setting up the centralized control equipment involves routine plug-and-play steps comparable to connecting peripherals to a personal computer, mostly involving plugging cables into corresponding jacks and turning on power switches. The system may be installed directly by the consumer or a professional technician, but does not require use of an electrician or follow-up evaluation by a building inspector. And it makes it possible to quickly and economically install lighting in any room having a dropped ceiling and access to a high speed Internet connection.

Figure 34A:
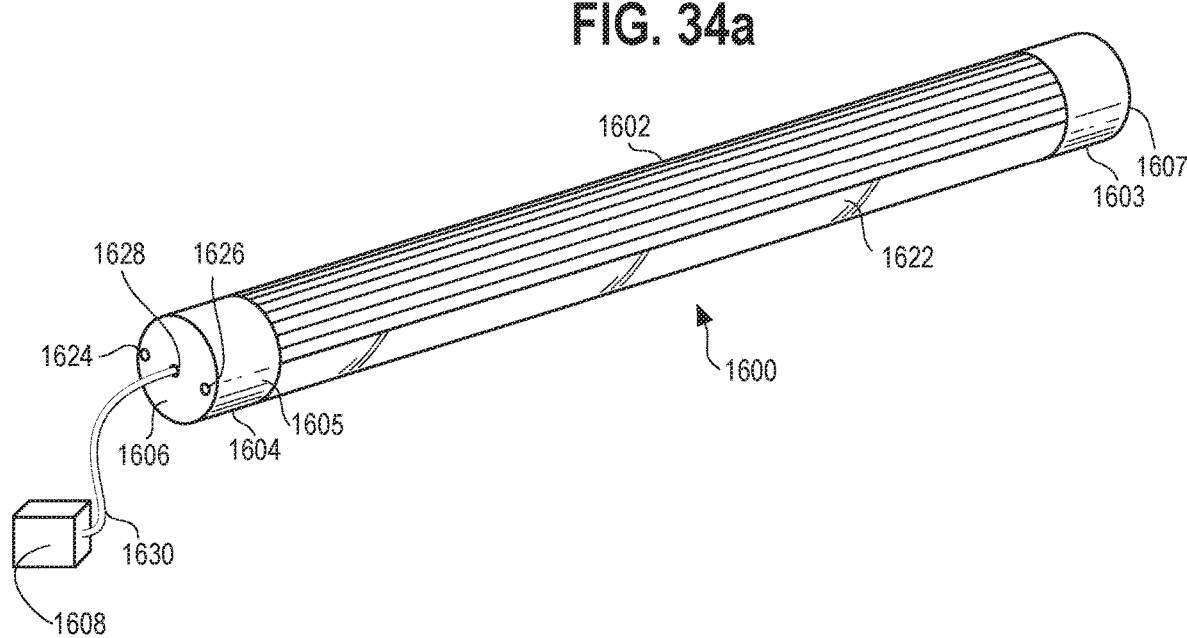
FIG. 34A is a perspective view of a cylindrical, network compatible linear LED lamp having an external heat sink extending over a portion of the circumference of an elongate body portion and having end cap assemblies at opposite ends of the body, showing an external Ethernet jack connected to the lamp by a jumper cable extending through the end wall of the end cap.
Figure 34B:
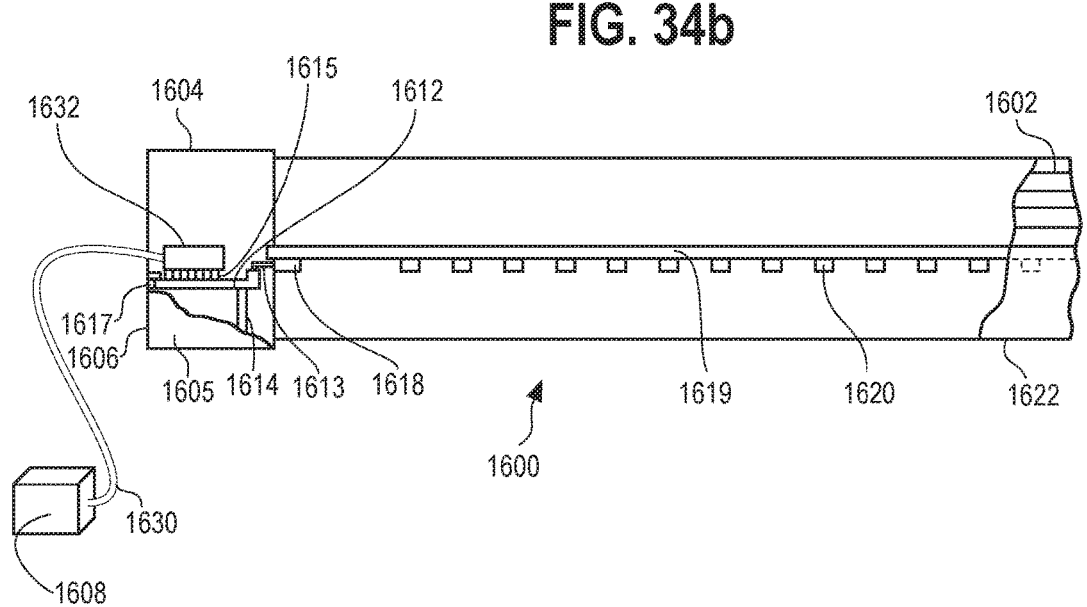
FIG. 34B is a side perspective view of the lamp of FIG. 34A with portions cut away to expose internal components, and showing an enlarged view of an end cap assembly comprising and cable connector mounted to a horizontally oriented PCB connector board for connecting an Ethernet cable and jack between a network and internal components of the lamp.

In FIGS. 34A and 34B, a further embodiment is shown which is similar to that shown in FIGS. 17 and 18 with the exception that the lamp includes has an external modular network connector instead of a jack mounted within the end cap assembly. However, the function of this lamp is essentially the same as that of the aforementioned lamps. Thus, FIG. 34A shows a perspective view of a cylindrical LED tube lamp 1600 having an external heat sink 1602 extending over a portion of the circumference of an elongate body portion, and having end cap assemblies 1603 and 1604 at opposite ends of the body secured to the tube body by fasteners 1624 and 1626. FIG. 34B shows a partial cut-away view of a portion of the LED lamp 1600 with a view of internal components of end cap assembly 1604. The lamp body as depicted illustrates a standard LED tube lamp design having an internally mounted LED emitter board 1619 on which a series of LEDs 1620 are arranged in one or more rows. A transparent or translucent outer lens 1622 extends around a portion of the lamp body. Other lamp designs are also possible, including those having multi-sided heat sink and multiple LED emitter boards mounted at angles to each other as disclosed in other embodiments.

As shown in FIG. 34B, end cap assembly 1604 houses a horizontally disposed internal PCB connector 1612, which is in communication with connector 1618 internal to the lamp body through conductive leads 1613. An edge portion of PCB connector 1612 is supported within a slot 1617 extending horizontally along inner surface of end wall 1606 of the end cap assembly, and a post 1614 supports the PCB at its opposite end. Connector 1632 is mounted on the PCB 1612 and electrically connected to it by pins 1615. A short branch of network cable 1630 extends from the connector 1632 to external modular 1608, which in this embodiment is an Ethernet jack configured to receive a standard Ethernet cable plug to for communicating power and data between a computer network and internal components of the lamp 1600. The branch cable 1630 extends through opening 1628 formed in end wall 1606 of the end cap assembly. The connector 1632 may alternatively connect to the emitter board 1619 or to another circuit board associated with the lamp body, and the cable may extend through an opening located on a different surface of the end cap assembly or through an opening of the heat sink 1602. The lamp 1600 may be mounted to a ceiling grid using the clip system or as otherwise described herein, with the branch cable 1630 and jack 1608 positioned above the ceiling tiles to be out of view.

FIGS. 23 and 24 illustrate another linear LED lamp system adapted to be connected to a network for power and data communications and centralized smart lighting control. The illustrated system 700 is intended primarily for use with single end power linear LED lamps in which only one end of the lamp is configured to connect to and receive power from a LAN. One end of lamp 701 includes end cap 706 having an opening 712 in a sidewall thereof for engaging a snap-fit connector 750. The connector 750 includes a base portion 754 extending to a narrowed leading end portion 755. It mounts to tabs of a lighting fixture support via slots adjacent side flanges 751 and in the same manner as the previously described snap-fit connector. The connector 750 is not configured to receive external power or communicate data signals, and functions only to secure the end cap 706 to support 720. It utilizes essentially the same snap-fit mechanism discussed above to securely engage the end cap. Thus deployable portions 758 are attached via a live hinge 759 to opposite sides of base portion 754, and capture an upper sidewall portion of the end cap assembly 706 as the leading end portion 755 is inserted through the opening 712 and into an engaged position. Actuators 758 connected to the deployable portions allow the snap-fit mechanism to be disengaged from the end cap assembly to separate the two components. The opposite end of lamp 701 has an end cap assembly 708 comprising an integral Ethernet jack (not shown) accessible from the end wall 710 of the end cap. The internal design of end cap assembly 708 may, for example, be essentially the same as that of lamp 400 shown in FIGS. 17 and 18.

The system also includes plastic connector sleeve 760, which is adapted to mount to support 720. A base portion 768 of connector sleeve 760 includes slots 772 between flanges 761 and 770 on opposite sides thereof into which tabs of support 720 slide so that connector sleeve 760 can be secured to support. The base portion 768 extends toward sleeve portion 762 comprising a continuous cylindrical sidewall, which forms a receptacle 763 having an open end facing towards the opposite first connector 750 and sized to receive the end cap assembly 708 of the LED lamp. The sleeve portion 762 is preferably of a cross-sectional shape that conforms to the cross-sectional shape of end cap assembly 708, which is cylindrical in the illustrated embodiment. Connector sleeves comprising a sleeve portion of other cross-sectional geometries, such as generally triangular, trapezoidal square or rectangular, are also contemplated for use with other lamps having corresponding end cap cross-sectional geometries. In one preferred form, the sleeve forms a receptacle of a generally triangular cross-section for receiving a generally triangular end cap assembly of a lamp comprising a multi-sided heat sink mounting multiple LED emitter boards.

As shown in the enlarged view of FIG. 24, the connector sleeve further comprises an internal adaptor module 790 of general L-shape configuration. A first vertically extending portion 792 comprises a female Ethernet jack accessible through the upper facing end wall of base portion 768. The jack (not shown) is adapted to receive an Ethernet plug 782 attached to the end of cable 780 to connect the sleeve to the LAN. The adapter 790 further includes a second horizontally extending portion 794 that includes an integral Ethernet plug 766 at its tip. Leads internal to the adapter provide electrical pathways between the pins of the jack and the corresponding pins of plug 766.

The lamp 701 may be installed in the fixture by inserting the end cap assembly 708 linearly along the length of the lamp body and into the receptacle 763 of connector sleeve 760. The connector sleeve is preferably sized so that end cap assembly 708 is easily guided into the receptacle, where it is supported in the vertical direction yet rotatable as well as adjustable in the horizontal direction. The lamp is adjusted such that the receptacle of the jack in the end wall is aligned with plug 766, and then the lamp is further advanced linearly until the plug is fully inserted in the jack. In this configuration, the opening 712 in the other end cap assembly 706 will be aligned with leading end portion 755 of snap-fit connector 750. The end cap assembly 706 may be moved upward so as to guide the leading end portion 755 into snap-fit connection with the end cap assembly. Securing the snap-fit connection locks the lamp at its proper rotational orientation and prevents the lamp from backing out linearly from connector sleeve 760, and the lamp is thus securely maintained in an operational state. To remove an installed lamp, the snap-fit connection may be released using the actuators as previously described, which allows the end cap assembly 708 to be withdrawn from the receptacle of connector sleeve 760.

This connector system may provide convenience to the lamp installer and a more efficient installation methodology. With standard linear LED tube lamps typically ranging from 2 to 8 feet in length, it is cumbersome to properly align the cooperating components into the proper engaged position while handling a portion of the lamp that is significantly displaced from the lamp end being installed. Thus, lamp installation typically requires the installer to grasp a first end of the lamp and position it into engagement with its corresponding lamp holder, and then move to a position proximate the opposite end of the lamp to manipulate the opposite end into engagement with its lamp holder. Using the connector sleeve 760, however, both ends of the lamp may be installed by manipulating the lamp from the no power end. While grasping the lamp near the no power end, the installer may guide the opposite power end into the receptacle opening of connector sleeve 760 and gently adjust the lamp orientation until the plug inserts within the end cap jack receptacle. This requires only minimal dexterity. After the power end is seated in the receptacle of the connector sleeve, the installer then moves the no power lamp end directly upward from the separated position and into snap-fit engagement with connector 750 pre-mounted on support 720. Potentially significant time and associated labor savings may be achieved with this system and installation method, especially in commercial environments requiring installation of hundreds or potentially thousands of linear LED tube lamps.

The network enabled LED lamps and connector systems disclosed herein provide safe and reliable means for securing linear LED lamps to a lighting fixture and providing networked power and data connectivity directly to the lamp. The disclosed snap-fit connector systems and corresponding network compatible lamp end cap assemblies allow implementing PoE or other network compatible LED tube lamps into existing facility lighting fixtures, without the need to replace existing fluorescent lighting fixtures or to install new integrated LED fixtures. This eliminates the added cost of disposing of the existing fixtures and altering the current fixture design and layout, greatly reduces labor and time of install, and avoids scheduling conflicts and disruptions of the work environment of the facility. Network cables cost very little compared to heavy duty copper wire and conduit used for traditional lighting, and integrated power and data networking technology has the potential to greatly enhance the power efficiency gains of LED tube lighting compared to conventional fluorescent tube lighting systems. The ceiling grid mounted network compatible LED lamps disclosed herein provide additional options for quickly and inexpensively installing smart LED lighting systems in numerous residential and commercial applications. These novel LED lamp and connector configurations allow for immediate adoption and more rapid penetration of integrated power and data technology in the lighting industry. Users may conveniently and inexpensively update a lighting system with simple lamp replacement as lamp performance and features improve with further technology advances. The inventions disclosed herein thus enable the next generation of digitally controlled and networked smart LED lighting systems to be implemented in the conventional tube lamp format, eliminating the need to replace the massive amount of infrastructure already in place to support this dominant and highly advantageous lighting format.

Figure 29:
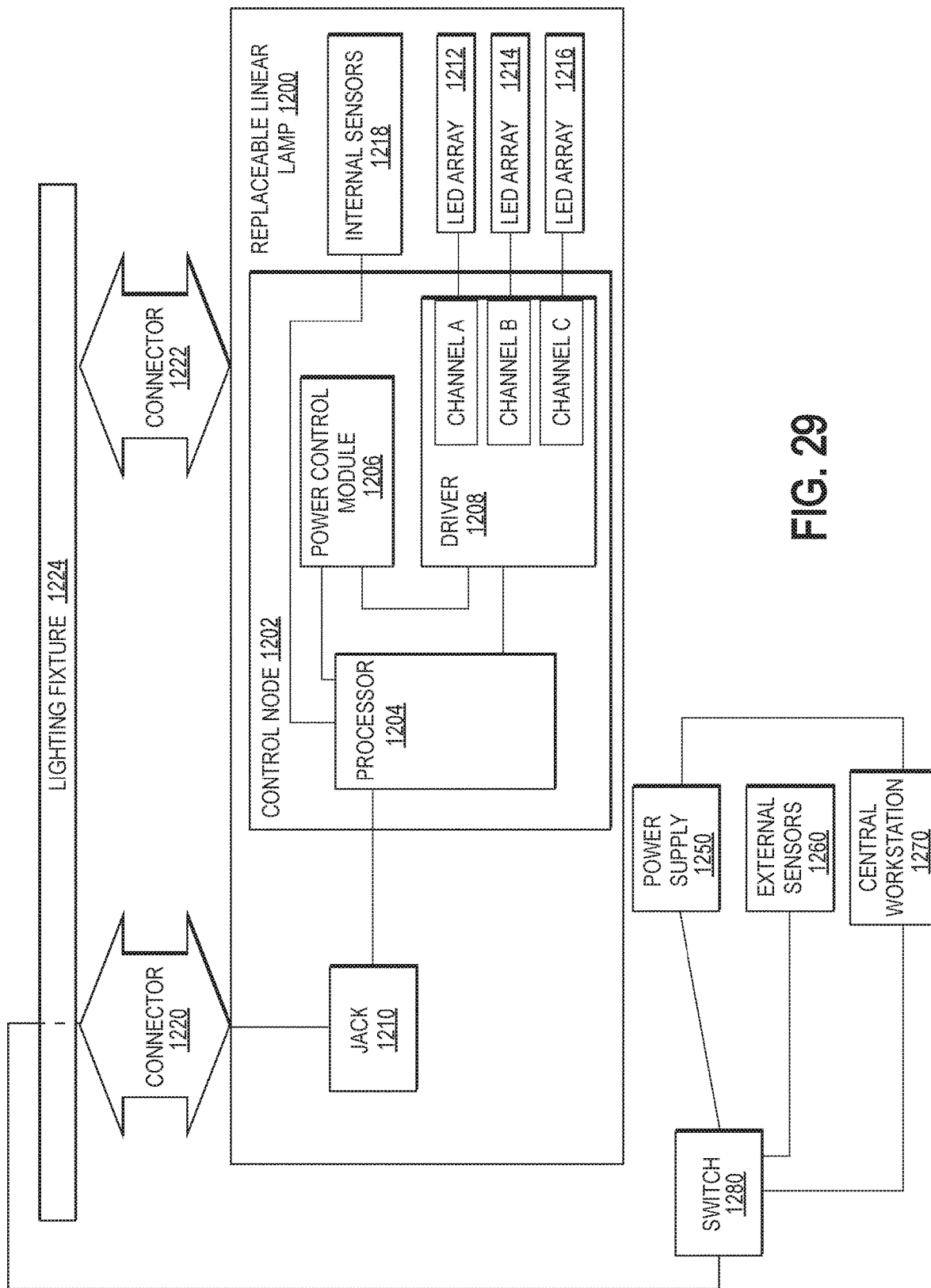
FIG. 29 is a schematic system diagram of an automated LED lighting system in accordance with the principles of the disclosed subject matter.

Many automated lighting applications that can be implemented at lower cost and more effectively utilizing the principals of the lighting platform disclosed herein. Other applications of the disclosed subject matter will now be explained with reference to the functional design schematic provided as FIG. 29. In the system described in this figure, a central workstation 1270 can communicate with linear LED lamp 1200 via a network that can support wired, and optionally, wireless features. Both power and lighting control (e.g. exchange of Ethernet control packets) are provided via Ethernet cabling to the internal control node 1202 of the lamp to control operation of the lamp according to commands from a computer or other data processing device. Power from a power supply 1250 powers an Ethernet switch 1280, which delivers power and control data to the linear LED lamps of a lighting system, such as the lamp 1200, over an Ethernet network cable. The network connection may also allow the lamp control node to download patches, drivers, and program code. Although FIG. 29 shows the central workstation and external sensors connected to the lamp 1200 over a network cable connected to Ethernet switch 1280, the lamp 1200 may also be addressed wirelessly.

The switch 1280 may also be connected to external sensors 1260 deployed at various locations to sense conditions such as room occupancy, light levels, motion and other conditions that serve as inputs to pre-determined automated lighting control strategies. The switch may supply power to the external sensors 1260 in addition to receiving Ethernet packets containing data associated with the sensed conditions. One or more computer work stations, such as central workstation 1270, may be configured to run one or more lighting automation management software applications which allow an administrator to design, modify and implement automated lighting control strategies, as well as diagnose, monitor and report on various operational aspects of the lighting system under control. The workstation may include one or more processors and one or more memories coupled to the one or more processors, as well as one or more programs that cause one or more processors to perform one or more of the lighting automation and/or management operations. These computer programs, which can also be referred to as programs, software, software applications, applications, components, or code, include machine instructions for a programmable processor, and can be implemented in a high-level procedural and/or object-oriented programming language, and/or in assembly/machine language. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The switch 1280 is operable to route control commands and other information and data between the workstation 1270, the external sensors 1260, and the addressable networked lamps 1200 of the system. Each lamp and external sensor has a network location known to the switch 1280, and is equipped with at least one standardized Ethernet communication interface so that it can be directly addressed by the Ethernet switch and can communicate data to the switch. The lamp 1200 can be mechanically installed into a lighting fixture 1224, which may be a conventional fluorescent lighting fixture or other existing or new LED lighting fixture, by means of one of the various snap-fit connector embodiments disclosed (illustrated as connector 1220 and 1222), at least one of which provides an associated Ethernet compliant modular connector for connecting lamp 1200 to the lighting network. Alternatively, as disclosed in certain embodiments above, the lamp 1200 can be directly secured to a ceiling grid and an Ethernet cable plugged directly into an externally facing jack of the lamp end cap.

The PoE switch 1280 can provide power to the linear LED lamps and control circuitry, such that both power and transmission and receiving of the serial command strings can be accomplished via Ethernet. The lamp 1200 includes an internal control node 1202 and is an automation component in that it can be controlled by instructions executing within the lamp, or alternatively by instructions executing on the local workstation 1270. The lamp can be powered on or off, and its brightness, color and other operational characteristics can be controlled in an automated fashion. The control node 1202 includes processor 1204, which executes runs software for executing control commands and providing numerous other automated functions of the lamp. One or more aspects or features of the control node 1202 described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The electronics shown are intended to be representative of functional components and are not intended to exclude additional components.

Lamp 1200 may also include one or more internal sensors 1218 mounted to the lamp. The internal sensors 1218 and external sensors 1260 are additional automation components that can also be controlled by instructions executing within the lamp or by instructions executing on the management workstation 1270. The sensors can provide environmental feedback for use as an input to a program or set of instructions. For example, a sensor may supply an electrical signal indicating a sensed aspect of the external environment or of the lamp itself, for example a light level, a motion, a noise, or a temperature. The sensors themselves may also include aspects that may be controlled, including power on/off or sensitivity, for example.

At least one LED array is mounted to the lamp body, typically in the form of one or more LED emitter boards, to generate light when powered by a drive current. The schematic of FIG. 29 shows the lamp 1200 having three parallel LED arrays 1212, 1214 and 1216. Control node 1202 can include a driver 1208 for precisely controlling the magnitude of DC current transmitted to each LED array, which is proportional to the intensity of light emitted by the LEDs. The depicted driver 1208 further includes three sub-circuits, which are each connected to one of the LED arrays for controlling power to that individual array independent of the other arrays. This circuit arrangement provides three independently controllable LED channels A, B and C within a single lamp to support a wide range of desired lighting effects and operational flexibility.

The jack 1210 may be an RJ-45 socket. Other types of standard or not standard data connectors may similarly be used to source a combined data and power connection. A set of isolation components connected to the pins of the jack are used to isolate data signals from the power supplied by the pins. The control node 1202 may also communicates with circuitry in the switch 1280 via a network cable to negotiate a necessary power level for consumption by the lamp. The control node 1202 further includes power control module 1206, which may utilize one or more DC-to-DC converters to adjust the power supplied to the driver sub-circuits associated with the channels A, B and C of driver 1208.

The isolated data signals are inputs to processor 1204, which may be a microcontroller, a microprocessor, an application specific integrated circuit (ASIC), a field programmable gate array (FPGA), and may include a network communications controller, and memory device. The processor 1204 transmits and receives communications from a remote device via the network cable and also uses power supplied by the cable. The processor 1204 may store and execute instruction for receiving environmental input from the external or internal sensors, instructions for adjusting operational aspects of the lamp, or instructions for adjusting aspects of the internal sensors 1218. The input from external sensors 1260 may be transmitted via the network cable or wirelessly per a standardized wireless communications protocol.

Implementations of the current subject matter can allow a building owner or administrator to monitor and control lighting power within the building as needed for occupants and policies, in addition to eliminating the use of such power when not necessary. This capability can, among other potential advantages, enable better optimization of lighting power utilization and thereby extend the life of LED lamps while reducing energy consumption. The system can be used to automate such functions as turning on lights automatically. When a person enters a room, for example, an external sensor 1260 may sense the movement send a signal to central workstation 1270, via the switch 1280, which may in turn broadcast Ethernet packets containing commands to activate one or more LED arrays of lamp 1200 and/or of other lamps of the system. The switch 1280 handles the routing of these control commands to the appropriate lamps. Alternatively, an internal sensor 1218 may communicate directly with the control node 1202 of the lamp, which then triggers the commands to turn on the LED arrays. The hardwired instructions and/or software code required to perform these automated functions may be stored and executed within the computer 1270 or within the control node 1202 or in some combination thereof. In one approach, the processor 1204 may be programmed to enable the lamp 1200 to adjust its own operational characteristics in response to the sensed environmental inputs.

Manually operated light switches may also be networked to the system, upon activation of which the processor 1204 may execute instructions that signal the power control module 1206 to control a channel of driver 1208 to turn one of the LED arrays on or off. Alternatively, the administrator may input parameters via a user interface of the workstation 1270 causing commands to be transmitted to processor 1204 that specify adjusting the power to one or more of the LED arrays in order to adjust the intensity or tune the color of light output by the lamp 1200. The automation control logic can combine inputs from separate sensors, such as occupancy and light level sensors, to implement user defined or policy driven lighting control strategies.

Referring to FIG. FIGS. 28A to 28C, a linear LED lamp illustrating a further specific implementation of the disclosed subject matter will now be described. This alternative embodiment has a multi-sided heat sink mounting multiple LED emitter boards and including an Ethernet jack at one end for communicating with a control module mounted within an internal region of heat sink. The lamp 1100 is configured to be mounted to a lighting fixture using any of the disclosed snap-fit connectors having an associated Ethernet plug. As is best shown in the cross-sectional view of FIG. 28B, heat sink 1108 of the illustrated lamp 1100 is multi-sided with a generally trapezoidal cross-sectional geometry in a plane perpendicular to the length of the lamp body. A first side 1124 extends generally horizontally forming the upper surface of the lamp body in the installed configuration, and may include external fins 1105 to improve heat dissipation. Angled second and third sidewalls 1110, 1112 provide mounting surfaces for supporting emitter panels 1108 and 1102 in a V-orientation such that LED emitters 1113a,b, and 1115a,b arranged along the length of the emitter panels distribute light generally downward and laterally over a wide area when the lamp is installed in overhead lighting system. Outer edges of the LED emitter boards slide along mounting grooves extending along the length of the heat sink sidewalls 1110, 1112 as shown to secure the each board to one of the sidewalls. Heat sink 1108 includes fourth sidewall 1111 that extends between the second and third sidewalls and is generally parallel to the first sidewall 1124. The fourth sidewall includes a similar set of mounting grooves into which a third LED emitter board 1104 may be mounted by sliding the board lengthwise along the mounting grooves. The LED emitters 1114 of emitter board 1104 are directed straight downward with the lamp installed in an overhead lighting system. A generally V-shaped or U-shaped transparent or translucent lens removably attaches to the heat sink by inward projecting flanges 1128a, 1128b that engage and seat with external grooves 1107a, 1107b at opposite corners of the heat sink.

Figure 28A:
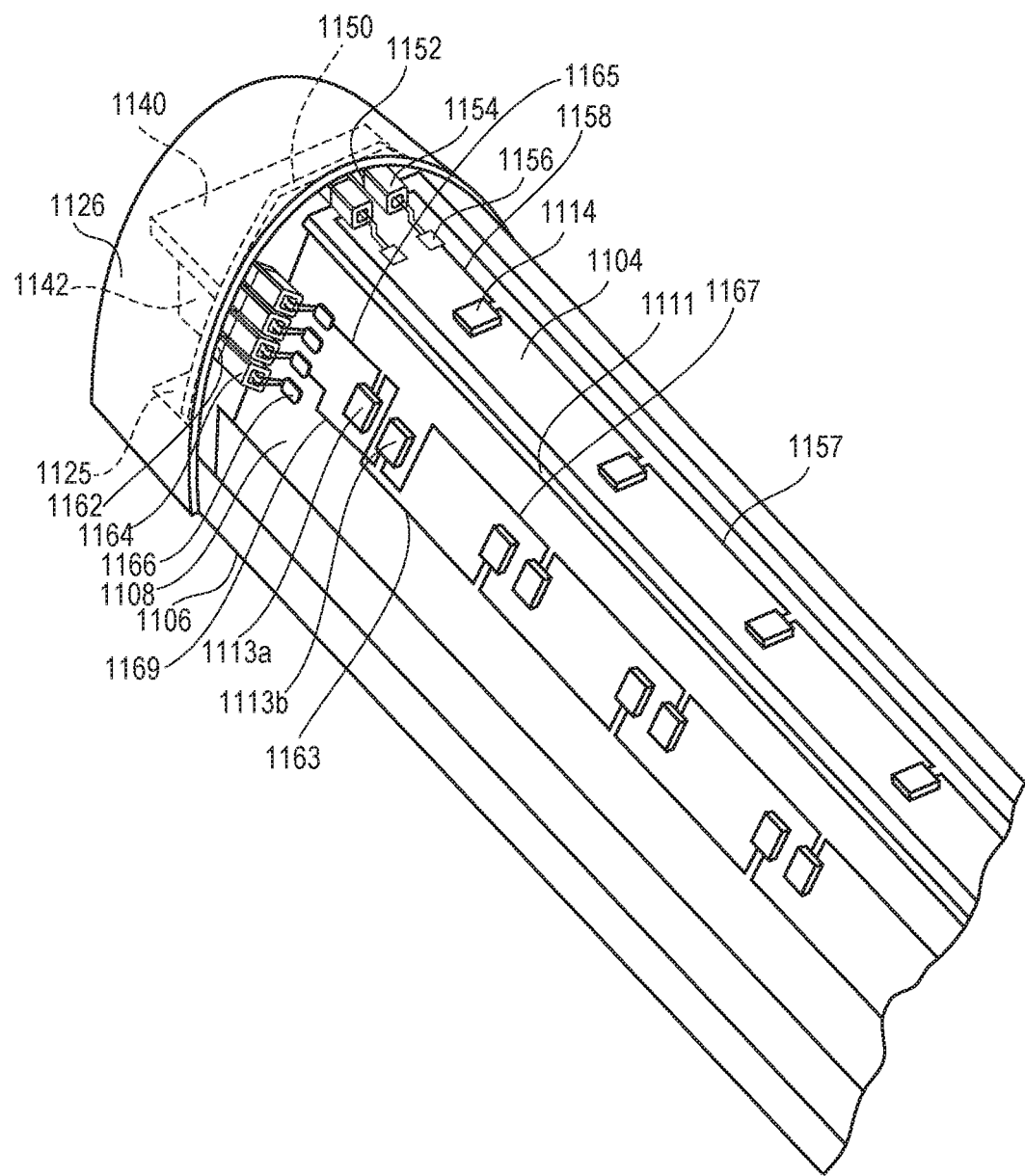
FIG. 28A is a side perspective view of a linear LED lamp embodiment with portions cut away to expose internal components, and showing a multi-sided heat sink providing support surfaces for mounting multiple LED emitter boards as shown.
Figure 28B:
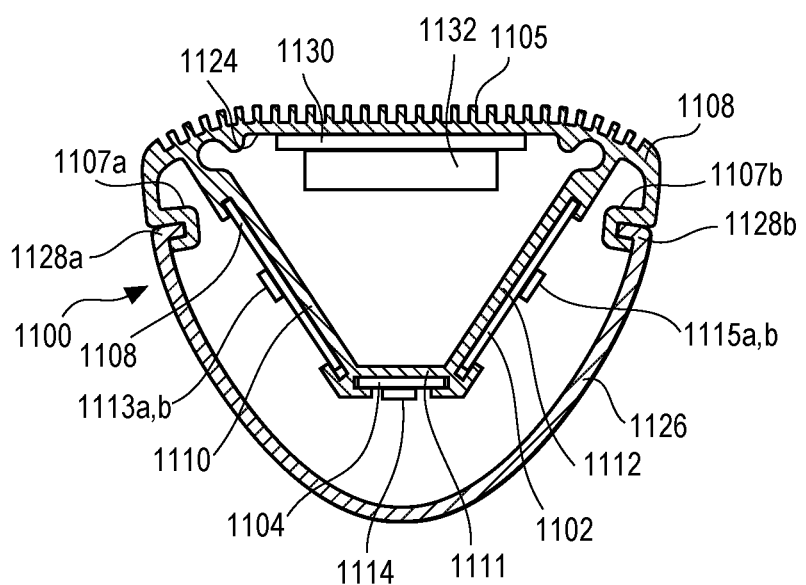
FIG. 28B is a cross-sectional view taken in a plane perpendicular to the longitudinal axis of the linear LED lamp of FIG. 28A, and showing a multi-sided heat sink having a generally trapezoidal shape and providing surfaces for mounting multiple LED emitter boards as shown, and with a light translucent lens cover joined to the heat sink.

As shown in FIG. 28A, lamp 1100 includes first end cap assembly 1126 disposed at a first lamp end having a corresponding generally triangular shape in a plane perpendicular to the length of the body. The first lamp end extends partly into a receptacle formed by the sidewalls of the end cap assembly as illustrated. Although not shown, second end cap assembly of similar geometry is mounted at the opposite second lamp end. The first end cap assembly 1126 houses an internal vertically oriented Ethernet jack 1142, which is pinned to a first PCB connector board 1140 disposed in a horizontal orientation as shown FIGS. 28A and 28C. The first end cap assembly 1126 has opening 1125 through a sidewall thereof to receive the leading end of a snap-fit connector of the type disclosed herein. The opening 1125 is aligned so that the Ethernet plug associated with the connector can be received within the jack receptacle as the lamp and connector are arranged into the assembled configuration. The first connector board 1140 includes conductive traces (not shown) to form electrical pathways for communicating power and/or data signals received by the jack 1142 and or transmitted to the jack. Other electronic components may also be mounted to first connector board 1140 and connected to one or more circuits or other components via additional conductive traces formed within the board 1140. In the embodiment illustrated, a second connector board 1150 is mounted in a vertical orientation at the open end of the first end cap assembly. The second connector board 1150 also includes electrical traces (not shown) for providing additional signaling pathways. As shown in FIG. 28A, surface mount connectors 1162 can be connected to the traces alongside portion of the second connector end board 1150 in proximity to the sides of the connector end board. The surface mount connectors 1162 of the end board 1150 can be connected to LED emitter board connectors 1164 of LED emitter board 1108. In some arrangements, the emitter board connectors 1164 are female connectors to receive the longitudinally extending connector pins (not shown) of matingly engageable male connectors 1162 of the second connector board 1150. In the illustrated embodiment, there are a four pin connectors at end of emitter board 1108, although it may be desirable to use more or fewer pin connectors.

The LED emitter board 1108 can have DC power terminals 1166 connected to connectors 1164 to conduct DC current to LED emitter strings. As illustrated in FIG. 28A, emitter board 1108 may include a series of LED emitter pairs arranged in a row along the length of the board. For example, the LED emitters of the first pair are labeled 1113a and 1113b in the figure, and additional adjacent pairs are mounted at spaced intervals along the board. Emitter traces 1163 can connect a first string of LED emitters consisting of the first LED emitter of each pair in series, while end trace 1165 can connect this first string of emitters to one of the emitter board connectors 1162 via one of the terminals 1166 as shown. A neutral trace may be connected to adjacent emitter board connector and may extend on the opposite side of the emitter board 1108. Emitter traces 1167 can connect a second string of LED emitters consisting of the second LED emitter of each pair in series, while end trace 1169 can connect this second string of emitters to one of the emitter board connectors 1162 as shown. A neutral trace may be connected to adjacent emitter board connector and may extend on the opposite side of the emitter board 1108. As described more fully below, the first and second strings of LED emitters may thus be connected in parallel to a power regulation module and driven independently of each other so that the board 1108 comprises two independently controllable LED emitter arrays. On the low side of each string of emitters, there is an independent trace returning to the power regulation module, which has an independent current-controlling driver that controls the current separately to each string of emitters. The wiring diagram is simplified, because in reality there may be multiple additional traces through each emitter board, so that any string can be assigned to any sub-driver.

The LED emitter board 1102 secured to the opposite angled sidewall 1112 may include a like arrangement consisting of a first string of serially connected LED emitters 1115a and a second string of serially connected LED emitters 1115b, with the two strings being independently powered using parallel electrical traces, such that LED emitter board 1102 provides two additional independently controllable LED emitter arrays.

As shown in FIG. 28A, the third LED emitter board 1104 includes a single string of LED emitters 1114, which are connected in series by emitter traces 1157, while end trace 1158 can connect this string of emitters to emitter board connector 1154 via one of the terminals 1156. Female emitter board connector 1154 is connected to terminal 1156 and to male surface mount connector 1152, which is mounted to second end connector board 1150, to provide DC power to the string of LED emitters. A neutral trace may be connected to and adjacent emitter board connector and may extend on the opposite side of the emitter board 1104. The LED emitters of board 1104 may be connected to a power regulation module and driven independently of the LED emitter arrays of the boards 1102 and 1108. Other wiring designs may be utilized on the end connector board and LED emitter boards allowing many variations of parallel-series electrical connections of the LED emitters.

Figure 28C:
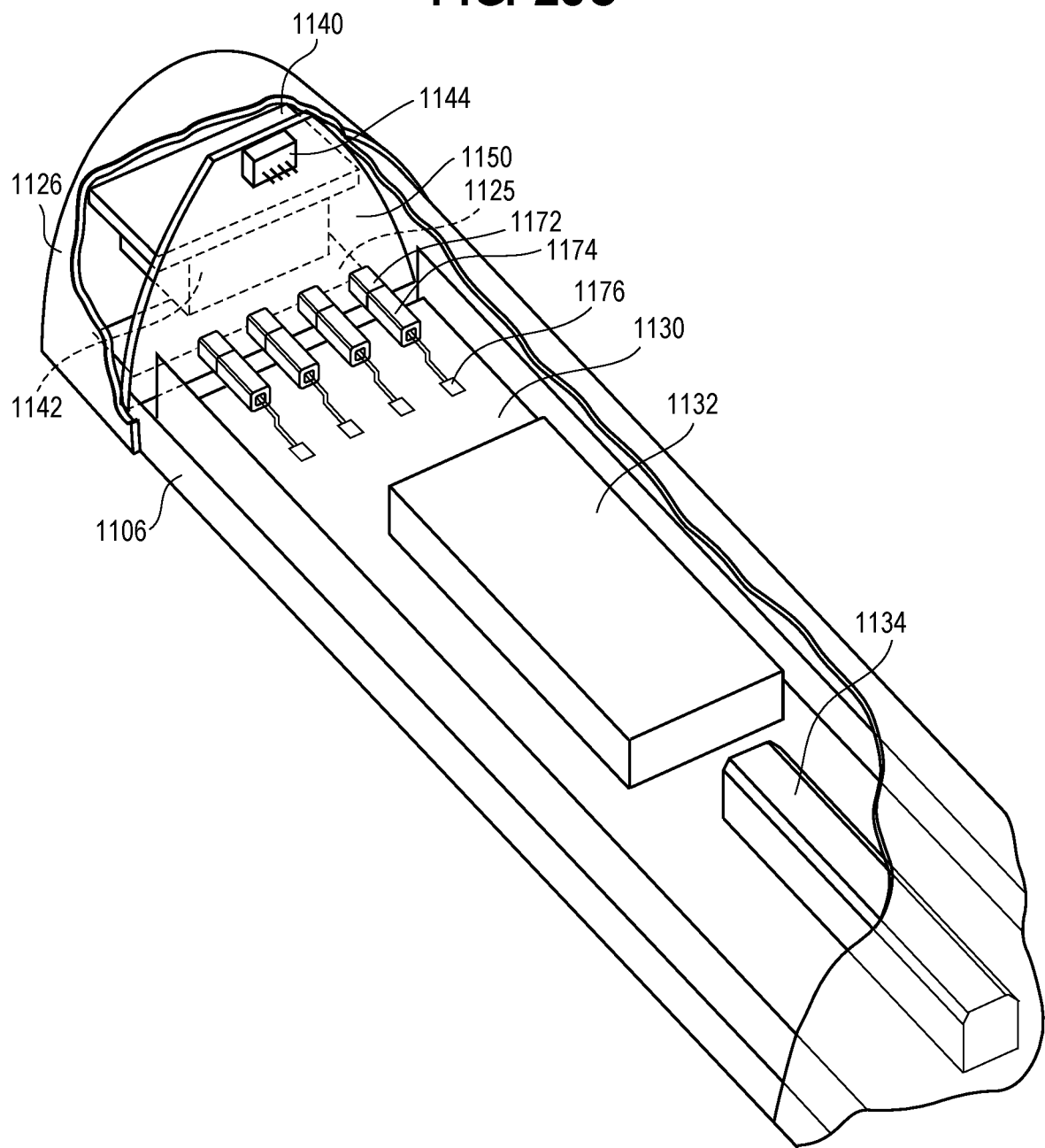
FIG. 28C is another side perspective view of the linear LED lamp of FIG. 28A with portions cut away to expose internal components mounted within an enclosed region of the multi-sided heat sink.

FIG. 28C shows a view of lamp 1110 with a portion of lens 1126, heat sink 1108 and first end cap assembly 1126 cutaway to expose the interior region of its multi-sided heat sink. The planar interior surface of first sidewall 1124 can be used for mounting a variety of components associated with the lamp. In the illustrated embodiment, this surface supports PCB connector board 1130, which has an elongated profile and extends along at least a portion of the length of the heat sink. The connector board 1130 can include electrical traces for providing electrical signal pathways to various components pinned to the connector board. The illustrated lamp 1110 includes control module 1132 and uninterruptable power supply (UPS) module 1134 pinned to connector board 1130. The connector board 1130 may also include other electronic components, such as one or more communication modules, sensors, microprocessors, controllers, wireless transceivers, cameras or other devices to support smart LED lighting functionality in a readily replaceable linear lamp format. Connector board 1130 can include terminals 1176 for connecting electrical traces to female surface mount connectors 1174 mounted at a first end of the board. The surface mount connectors 1174 receive longitudinally extending connector pins of corresponding male connectors 1172 of connector board 1150. The connector boards 1150 and 1140 include electrical traces for providing signaling pathways between the electrical components of connector board 1130 and the jack 1142 of first end cap assembly 1126. The lamp is operable for transmitting power to the lamp components and communicating control and data signals between the lamp and a centralized lighting automation control system via the Ethernet communications interface and connector boards provided within first end cap assembly 1126.

Control module 1132 may include circuitry to isolate power and data delivered via a network cable. The power is converted to a voltage sufficient to drive the LED emitters, and the power directed to individual strings of LED emitters is governed by one or more parallel driver sub-circuits of the control module. The control module also contains circuitry programmed to receive instructions from the data communications and to modify aspects of the operation of the LED lamp based on the instructions, such as controlling the brightness, color and other aspects of the LED emitters. The control module may also be connected to one or more sensor components mounted internal to or external of lamp 1100 for sensing a condition such as room occupancy, light level, motion, etc., and may be further programmed to control one or more lamp operational parameters based on information corresponding to a sensed condition. The control module may also include one or more communication circuits for communicating operational data associated with the lamp, sensor collected data or other data from the lamp to a networked central lighting automation system.

The control module 1132 consistent with implementations of the current subject matter can include one or more integral components for detecting PoE; an integrated circuit for establishing connection to PoE and indicating that the lamp is a PoE powered device; an integrated circuit that can contain a network address and handle the physical layer of the internet protocol and converts to a serial interface; a microcontroller for receiving serial data and processing it into lighting control outputs; one or more timing devices for synchronizing control signals; memory or other volatile or non-volatile storage for storing code and data; connections to various inputs and outputs for control or function; a driver that receives its signals from a microcontroller and has current control driver subcircuits that supply a DC drive current to individual LED emitter strings; a DCDC converter allowing power conversion to be regulated from PoE input power; and other auxiliary components to support the various control functions provided. Alternatively, one or more of these components can be provided on one or more separate circuit boards, including for example, either of the boards 1140 and 1150 of first end cap assembly 1126.

Directly addressable linear LED lamps having an integrated internal control module 1132 in accordance with the current subject matter permit computer software control of networked lighting systems to be achieved in a variety of ways. Centralized computer programs, management systems or control systems can be enabled to allow an administrator to control light color and light intensity levels, program lamps to switch on and off on a zone by zone or individual lamp basis, create & manage preset schedules, special lighting effects, automate responses to changing room environment conditions, etc. These and other advanced lighting automation approaches can be achieved by exchange of Ethernet control packets communicated between a central management system and control modules 1132 of the deployed lamps 1100 via one or more network connections to control operation of the LED lamps of the lighting system according to commands from a computer or other data processing device. Real time or stored data from the lamps or associated sensors can also be transmitted by the lamps to the central management systems or control systems. This functionality can be implemented in a variety of software configurations, which will typically include control software operating on a centralized lighting management system, as well as additional executable code deployed as software or firmware running within the control module of the individual lamps, which function both as light engines and as addressable nodes of an networked automated LED lighting system.

The UPS module 1134 and its advantages will now be described in greater detail. As discussed, control module 1132 may include internal driver circuitry for directing DC power extracted from signals received over an Ethernet network to the individual LED emitter strings of lamp 1100. The UPS module 1134 is operatively connected to control module 1132 and includes a charging circuit which provides a charging current to the one or more batteries thereof when the external power source is in normal operation. In the event that power from power source is interrupted (due to an external power failure, temporary network shut-down, network connection failure, etc.) a control sub-circuit of the UPS module switches the load to the battery for providing power to the control module 1132 and thus to the LED emitters driven by the control module. In other embodiments, the circuits may be designed such that the lamp is a dedicated emergency light which is dark during periods of normal power supply but receiving a charging current, and which illuminates under power of the UPS module 1134 when the normal power supply is lost. The available space within the interior region of heat sink 1108 will permit mounting a sufficient number of backup batteries to power the LEDs and provide the required illumination for durations required to meet applicable emergency lighting codes. Currently available UPS batteries sources should provide power for 15 minutes and up to at least 2 hours and potentially longer depending on the number and type of batteries mounted within the interior region of the heat sink.

The lamp 1100 may alternatively be designed so that the driver sub-circuit(s) for fewer than all of the independently driven LED emitter strings receive power from the battery system in emergency lighting scenarios. For example, the string of LED emitters 1114 mounted on LED emitter board 1104 may serve as a dedicated emergency lighting circuit that is run off the UPS module during a power interruption. In yet another approach, one or more of the independently driven LED emitter strings may be driven from the UPS module 1132 to provide room lighting during an external power interruption or network outage, while another string of emitters is controlled such that its LED emitters flash on and off with a strobe lighting effect and/or consists of LED emitters of a different color, to provide a warning signal that the UPS system has been invoked. Several other approaches will be evident to persons of ordinary skill in the art based on the subject matter disclosed herein.

By providing a linear LED lamp with a concealed UPS that can sustain its own source of power in the event of a power outage or computer network interruption, this aspect of the invention provides numerous additional benefits. For example, an entire pathway of lighting can be generated to insure the most direct route out of a powerless building simply by installing the UPS emergency lights in lighting fixtures or directly to the overhead ceiling grid at strategically chosen locations. Because the UPS backup circuit is implemented internal to the lamp, the exiting mounting fixture does not require any additional wiring or foreign components to be installed into the fixture. This aspect of the invention thus allows for buildings to be equipped with emergency safety lighting without the increase of cost of installing dedicated breakers, circuits, emergency lights, specialized ballasts, outside battery sources, generators and other equipment throughout the building, making it easier and more likely that building owners and property managers an abide by the codes requiring adequate lighting in the event of a power loss. Because the UPS is concealed internal to the heat sink, aesthetics are not adversely affected.

Linear LED lamps made according to the principles of the disclosed subject matter may also be configured to support automated color tuning and color shifting. The embodiment of lamp 1100 will be used to describe this aspect. As is known, the correlated color temperature (CCT) of a white light source is determined by comparing its hue with a theoretical, heated black-body radiator. CCT is specified in Kelvin (K) and corresponds to the temperature of the black body radiator which radiates the same hue of white light as the light source. Incandescent light sources are characterized by a relatively low color temperature around 3000K, called "warm white". Fluorescent lights are characterized by a higher color temperature around 7000K, called "cold white".

White light emitting diodes (LEDs) have been developed based on LEDs emitting in the blue/ultraviolet part of the electromagnetic spectrum. White LEDs utilize phosphor materials to absorb a portion of the radiation emitted by the LED and re-emit radiation of a different color. Typically, the LED chip generates blue light in the visible part of the spectrum and the phosphor re-emits yellow or a combination of green and red light, green and yellow or yellow and red light. The portion of the visible blue light generated by the LED which is not absorbed by the phosphor mixes with the yellow light emitted to provide light which appears to the eye as being white in color. The CCT of a white LED can be adjusted based on the phosphor composition incorporated in the LED.

It is known that the color temperature of light produced by a LED lighting system can be tuned by utilizing LED emitters of different color temperatures and controlling the relative magnitude of the drive currents of the respective LED emitters. By selectively controlling the intensity of each of the LED emitters of a given color temperature, the color temperature of the composite mixed light can be controlled to generate light over a range of color temperatures. Prior known color tunable LED lighting systems have been implemented as integrated fixtures and suffer many of the same drawbacks associated with integrated fixtures previously discussed, including high cost, inflexibility, lack of light engine standardization, difficulty of upgrading, etc. A particular advantage of the lamp 1100 is that it can be readily implemented with color tunable functionality to provide a color tunable light engine for automated lighting systems in an advantageous replaceable linear LED lamp format. This aspect will now be descried in more detail.

As previously discussed, emitter boards 1102 and 1108 may include a series of LED emitter pairs located at regularly spaced intervals in a row along the length of the board. Emitter traces connect a first string of LED emitters in series and a second parallel string of LED emitters in series. As shown in FIG. 28A, the emitter pairs consist of one emitter of each of the two parallel strings of emitters. Control module 1132 may include dedicated driver sub-circuits to independently control the magnitude of DC current provided to each string of emitters based on control instructions provided as Ethernet packets from a central management system. In one aspect, the boards 1108 and 1102 each consist of a first string of LED emitters with a color temperature in a first range, and a second string of LED emitters with a color temperature in a second range. For example, in one implementation, the first string of emitters on each board emits light having a CCT of about 4500K and the second string of emitters on each board emits light having a CCT of about 6500K. The color temperature of the output light depends on the relative proportion of light contributed by each emitter string, which is proportional to the drive current transmitted to each string. Thus, if a drive current is provided only to the second emitter string of each board, the lamp will produce light of a CCT of about 6500K. Conversely, if a drive current is only provided to the first emitter string of each board, the lamp will produce light of a CCT of about 4500K. If drive currents are provided to both strings of emitters of each board, the lamp will produce light having a CCT somewhere between 4500K and 6500K, depending on the relative magnitude of the drive current of each LED emitter string. The color temperature of the composite light produced by mixing the light generated by these different colored LED emitter strings can thus be controlled in a range of about 4500K to about 6500K, depending on the relative magnitude of the drive currents of the LED emitter strings.

Of course, various other CCT ranges may be achieved based on the selection of the CCT characteristics of the LED emitters utilized. While the color tunable features of the lamp 1100 has been illustrated by reference to LED emitter boards containing two independently controllable emitter strings, other designs utilizing three or more strings of different CCT range emitters may alternatively be used. In a further embodiment, the color tuning capabilities of lamp 1100 may be further extended by also mixing light generated by emitter board 1104. As but one example, emitter boards 1108 and 1102 may consist of white LED emitters, and emitter board 1104 may consist of LED emitters of a different color range, such as red, green or blue emitters. This allows for various other color mixing effects to be achieved by adjusting the drive current to each emitter string under control of a central management system communicating control instructions to the integrated control module of the lamp.

As discussed, the control module 1132 can include an input to receive one or more illumination control packets from a data processing device connected to the lamp via the Ethernet connection provided in the first end cap assembly; a processor for acting on the control packets; and outputs for controlling the parallel driver sub-circuits that transmit power to each LED emitter string. The command input may receive at least one illumination control packet. The control packets may specify an illumination level or other color level parameters processed by a color tuning code running on the control module to execute the automated light tuning functionality of the lamp 1100. A first color control output may control a first driver sub-circuit that powers a first illumination level for a first string of LED emitters of a first color. A second color control output may control a second driver sub-circuit that powers a second illumination level for a second string of emitters of a second color. The processor controls the first color control output in accordance with a first color level parameter associated with a first illumination control packet received at the input, and controls the second color control output in accordance with a second color level parameter associated with the first illumination control packet.

Other control approaches developed for specific lighting applications will also be apparent to those skilled in the art and can be readily deployed in the network addressable and programmable linear LED lamp architecture disclosed herein. In another embodiment, the lamp 1100 can be designed to provide relatively constant light output over its lifetime notwithstanding that the efficiency of LEDs can be expected to degrade over time. Control module 1132 may be programmed to power the first LED string 1113a of emitter board 1108 and first LED string 1115a of emitter board 1102 to generate the lamp's primary light output, and the second LED string 1113b second LED string 1115b of the boards are controlled to provide supplemental light output. The lamp may be configured so that upon detecting a reduced light output via a sensor of the networked lighting system, the control module drives the second LED strings 1113b and 1115b at the intensity required to maintain the lamp's total light output a near constant level. In another approach, the control module drives all of the LED strings all of the time, but is programmed (or instructed by a central management system) to automatically increase the drive currents to maintain a constant light output over time notwithstanding a gradual loss of LED efficiency. Of course, many other possible control schemes may be implemented in the lamp architecture disclosed, making it possible to provide highly automated lamps having a variety of features and performance characteristics.

In another aspect, the disclosed PoE enabled linear lamps and connector systems can also be deployed to quickly and inexpensively provide the advantages of PoE technology to horticultural lighting systems. As discussed above, radiation at certain spectral bands can optimize chlorophyll absorption in plants that in turn drives the photosynthesis process critical to plant growth. LED lighting is attractive for the horticultural market due to its energy efficiency and its long lifetime. Many warranties are for 50,000 hours or 3 to 5 years, which can provide significant additional cost savings. However, most lamps are only guaranteed to produce 70% of initial lumen output (a common standard used when lighting for humans) over their lifespan. Since plant growth directly correlates to light output/light intensity, an LED fixture that is guaranteed to last for 5 years but has a decreased light output of up to 30% is not ideal for growers who want to maintain a constant annual yield. As discussed above, the lighting systems disclosed herein can address this by driving the LEDs harder over time, or by dedicating one or more LED strings of each lamp for use as supplemental lighting. Thus, indoor growers can be assured a constant light output over the full guaranteed lifespan of the lamps.

Many growers utilize experts specialized in growing plants under artificial light to develop custom made light recipes for each crop and growing situation. The PoE enabled lamps disclosed herein can be readily implemented into existing or new horticultural lighting fixtures to provide the many advantages of the lamp based light engine format discussed above, and can be controlled and tuned to deliver the spectral energy that plants require. Control programs may be implemented to deliver the required spectrum of light, at the right photon density needed for optimal plant growth and health, as well as to provide other effects, such as pulsed lighting patterns, which may be desirable in horticultural applications. These light recipes can be readily implemented using the disclosed control architecture and easily modified through user input at a central management station, allowing color, intensity, temperature and other aspects of individual lamp light characteristics to be adjusted through software. In combination with air quality, light output and/or other sensors the system can be programmed change light output characteristics automatically in a feedback control system designed to provide optimal light recipes over the full growth cycle of the plants.

Under current practices, growers undertake substantial efforts to understand plant biology and optimal lighting needs for particular plants and indoor farming conditions, and rely on lighting manufactures to provide customized LED light fixtures and control systems designed to deliver the light according to these needs. This approach leaves the grower susceptible to installing expensive lighting systems that are inflexible and are not readily adaptable to the grower's evolving needs. As an example, while early research encouraged the use of light in the red and blue spectrums only, it has more recently been reported that using all wavelengths of light in the PAR (photosynthetically active radiation) range, 400-700 nm, may improve plant quality and growth rates. Even though most growers are aware that these different spectrums exist and can affect plant growth, it may be difficult to determine the optimal spectrum and wavelengths needed for their particular system set-up, plants or crops, and these needs may change over time. Integrated fixture based systems designed to deliver predetermined light recipes lack the flexibility that growers need to experiment with different lighting conditions and adjust their operations based on an evolving knowledge base regarding optimal growth conditions. The PoE enabled lamps and connector systems disclosed herein overcome this difficulty because they can be tuned to generate light over a wide range of light spectrums of the PAR range, and the light characteristics are easily changed under the control of lighting automation control software communicating with individual lamps over an Ethernet network. There is no need to replace or redesign integrated lighting fixtures to adjust lighting strategies. Moreover, light recipes can be developed for individual lamps, or groups of lamps, because each lamp can be a directly addressable node on the network.

The networked linear LED lamps disclosed herein may be provided in various other geometries and sizes without departing from the scope of the invention. As discussed above, lamps having LED emitters oriented outwardly from the vertical, such as those illustrated in FIGS. 9A/B, 10, 27A/B and 28A/B/C, are particularly advantageous due to their improved efficiency and capability to cast light over a wide area when deployed in a networked overhead lighting system. In certain lighting systems, it may be desirable to also cast light into the space above the lamp. For example, in pendent lighting having lamps or fixtures suspended from above by cables or other means, upward directed light may provide an aesthetically pleasing effect while improving the overall light quality as the upwardly directed light is reflected back down into the space below. The disclosed lamps can be implemented in a modified form to provide a linear LED lamp having this additional lighting capability.

Figure 30:
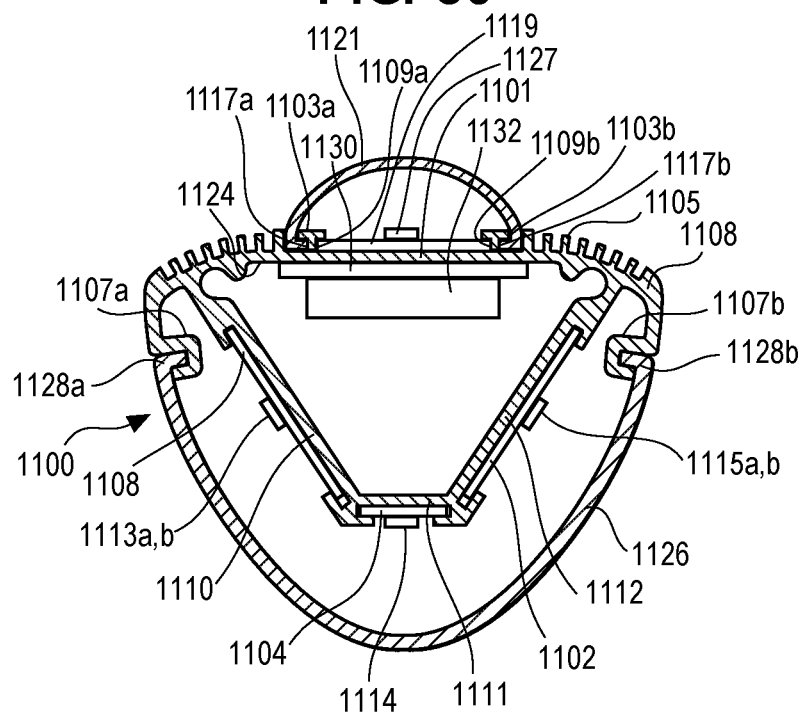
FIG. 30 is a cross-sectional view taken in a plane perpendicular to the longitudinal axis of another linear LED lamp embodiment, and showing a multi-sided heat sink having a generally trapezoidal shape and providing surfaces for mounting multiple LED emitter boards for projecting light in downward and upward directions, and with a light translucent lens cover joined to the heat sink.

One example is shown FIG. 30, which is a cross-sectional view taken laterally across a mid-portion of the lamp body. The structure and operation of this lamp is identical to the lamp of FIG. 28A/B/C, except as described here. Therefore, common components are given the same reference numbers in FIG. 30, and the description of their structure and functions is not repeated. In the embodiment of FIG. 30, the heat sink 1108 has a modified form in which the outer surface of first sidewall 1124 has a flat mounting portion 1101 extending along the mid-portion thereof. In other words, the elongated fins 1105 are not present in the mounting portion 1101. Mounting rails 1103a, 1103b extend longitudinally along the opposite side edges of the mounting portion in spaced, parallel relation to each other. Each rail has a generally T-shape cross-section forming a pair of internal channels 1109a, 1109b and a pair of external channels 1117a, 1117b. The internal channels 1109a, 1109b are configured to receive opposite side edge portions of LED emitter board 1119 having one or more strings of LED emitters 1127. The emitter board 1119 may be secured to the mounting portion 1101 by sliding it along the length of lamp body and into engagement with the internal channels 1109a, 1109b. A convexly shaped transparent or translucent lens 1121 removably attaches to the heat sink by inward projecting flanges that engage and seat with the external grooves 1117a, 1117b at opposite lateral sides of the mounting rails 1103a, 1103b.

The lamp 1110 illustrated in FIG. 30 is configured to be installed in an overhead lighting system oriented so that the LED emitter boards 1108, 1114 and 1102 are directed generally downward to cast light downward and laterally over a broad area of the space below. In this installed configuration, the fourth emitter board 1119 is operable to cast a separate beam of light upwardly into the space above the lamp. The lamp of FIG. 30 may be implemented with LED emitters 1127 of the same or different color and other characteristics as the emitters of the downward directed emitter boards. An internal control module can be configured to control the emitter board 1119 independent of the other emitter boards so that the intensity, color characteristics, etc. of the upward directed light may be adjusted independently to provide the desired lighting effects.

The present invention thus contemplates providing integrated power and data connectivity supporting a wide variety of network compatible smart linear LED lamp designs, componentry, capabilities and performance characteristics. The devices, systems and methods disclosed provide a platform for deploying automated LED lighting systems that provide numerous commercial advantages and facilitate immediate adoption and rapid penetration of PoE smart automation technology in the lighting industry. The disclosed subject matter allows implementing PoE compatible linear LED lamps directly into existing fluorescent lighting fixtures, eliminating the need to replace the massive fluorescent lighting install base with new integrated LED panel fixtures. This greatly reduces the cost to the building owner of installing an automated LED lighting system.

This also benefits networked lighting technology companies that supply lighting automation managements systems and network infrastructure, as well as the fixture manufactures who presently must engineer the required control components into the particular fixture selected for a networked lighting installation. Manufacturers of integrated LED lighting fixtures face the challenge of designing each fixture to have the desired aesthetic appearance and lighting performance, while also engineering the unit to interface with the control components required for the applicable lighting network. As a result, fixture design is essentially done on a custom basis, an inefficient and expensive approach. The integrated fixtures are not upgradable without removing the fixture and entirely refurbishing it. The design of the disclosed snap-fit connector is highly adaptive and can readily be integrated into the products of lighting fixture manufacturers, meaning that existing fixture designs require minimal redesign to become enabled for PoE capability, thus significantly reducing development costs and time to market. By specifying a PoE linear LED lamp of the type disclosed herein as the light engine of the manufacturer's luminaire, optimal lighting performance is assured and there is no need to adapt control components to the fixture body because those components are internal to the lamps themselves. Furthermore, all safety, efficiency and performance certifications (such as UL, DLC etc.) can be completed through the linear LED lamps. Manufacturers can thus offer PoE capability across their entire linear LED product portfolio without having to obtain individual certifications for each individual fixture design. Not only does the disclosed lamp and connector systems provide standardized light engines with excellent lighting performance and versatility, the required network control components come integrated within the lamps. Because Ethernet is a global harmonized standard, the linear LED lamps and connector systems of the disclosed subject matter can be productized and deployed throughout the world. This eliminates the need to produce different product versions suited to specific geographic markets, and reduces product development and inventory costs.

Providing an addressable control module internal to the lamp, as illustrated by certain disclosed embodiments, allows for each lamp to be its own system. This simplifies diagnosing or trouble shooting of system failures and substantially reduces the risk of catastrophic failure of all or substantial portions of POE powered LED lighting systems. In addition, lamp failure and warranty issues can be addressed with a non-invasive lamp replacement, and without having to remove or refurbish an entire integrated panel fixture. The lamp based PoE lighting architecture disclosed also provides for a fully upgradable system, allowing building owners and operators to realize the benefits of future advances in lamp performance and features with simple and less expensive replacement of original lamps with next generation lamps. The disclosed lamps may also be updated through configuration software downloads and/or remote firmware updates.

Those skilled in the art will recognize that a wide variety of modifications, alterations, and combinations can be made with respect to the above described embodiments without departing from the spirit and scope of the invention, and that it is intended in the appended claims to cover all those changes and modifications that fall within the true spirit and scope of the present invention.

What is claimed is:

1. A linear LED lamp for use as an addressable lighting node of a networked LED lighting system, the linear LED lamp comprising:

an elongate body extending between spaced first and second ends and comprising an elongate heat sink formed of a heat dissipating material;

at least one LED emitter panel secured to the heat sink, each LED emitter panel comprising a circuit board containing LED emitters connected in a circuit for emitting and distributing light outwardly from the emitter panel in a light distribution pattern;

a first interface connector operable to connect the linear LED lamp to a data network associated with the networked LED lighting system to receive power and data signals according to a standardized network communications protocol, directly or indirectly, from an external device connected to the network for use in powering and controlling one or more operational characteristics of the linear LED lamp;

a control module comprising a memory storage and electrically connected to the first interface connector, the control module including a power circuit for communicating power received via the first interface connector and a processor configured to execute instructions defined by data signals; and one or more sensors electrically connected to the control module and operable to generate sensor data corresponding to one or more sensed environmental conditions.

2. The linear LED lamp according to claim 1, wherein the one or more sensed environmental conditions are associated with at least one of motion, room occupancy, ambient light conditions, temperature, humidity, or sound.

3. The linear LED lamp according to claim 1, wherein at least one sensor comprises a camera operable to capture image data.

4. The linear LED lamp according to claim 2, wherein the control module is operable to receive sensor data generated by the one or more sensors and is operable to store executable code operable to perform one or more operations to adjust one or more operational characteristics of the lamp in response to the sensor data.

5. The linear LED lamp according to claim 4, wherein the control module can adjust at least one of the on or off status of the LED emitters, light intensity, or light color in response to the received sensor data.

6. The linear LED lamp according to claim 1, wherein the external device is a network switch operable to communicate with a centralized lighting management system comprising a computer programmed to execute automated lighting control software, the network switch operable to route power and data signals to multiple individually addressable components of the networked LED lighting system.

7. The linear LED lamp according to claim 6, wherein the control module is operable to store executable code operable to perform one or more operations to adjust one or more operational characteristics of the lamp in accordance with parameters of control instructions generated by the centralized lighting management system and received via the first interface connector.

8. The linear LED lamp according to claim 7, wherein the control module can adjust at least one of the on or off status of the LED emitters, light intensity, light pulsing, or light color in response to one or more of the received control instructions.

9. The linear LED lamp according to claim 7, wherein the control instructions were generated by the centralized lighting management system in response to information corresponding to one or more sensed environmental conditions communicated by the lamp via the data network to the centralized lighting management system.

10. The linear LED lamp according to claim 6, wherein the control module is operable to store executable code operable to perform one or more operations to generate and communicate messages via the data network to the centralized lighting management system, the messages containing information regarding one or more operational characteristics of the lamp.

11. The linear LED lamp according to claim 10, wherein the one or more operational characteristics are associated with at least one of usage data, power draw or temperature.

12. The linear LED lamp according to claim 10, wherein the control module is operable to receive query messages and to generate the one or messages in accordance with one or more parameters of the query messages.

13. The linear LED lamp according to claim 6, wherein the control module is operable to store executable code operable to perform one or more operations to generate and communicate messages via the data network to the centralized lighting management system, the messages containing information regarding one or more sensed environmental conditions.

14. The linear LED lamp according to claim 13, wherein the one or more sensed environmental conditions are associated with at least one of motion, room occupancy, ambient light conditions, temperature, humidity, or sound.

15. The linear LED lamp according to claim 13, wherein the control module is operable to receive query messages and to generate the one or more messages in accordance with one or more parameters of the query messages.

16. The linear LED lamp according to claim 7, wherein the control module is operable to store a network address to uniquely identify the lamp as an addressable node of the networked LED lighting system.

17. The linear LED lamp according to claim 16, wherein the control module is operable to determine if a received control message is addressed to the lamp and to execute the control message only if the control message is addressed to lamp.

18. The linear LED lamp according to claim 6, further comprising a second interface connector operable to connect the linear LED lamp to the data network to enable the communication of power and data signals according to a standardized network communications protocol to a second linear LED lamp connected to the network for use in powering and controlling one or more operational characteristics of the second linear LED lamp.

19. The linear LED lamp according to claim 18, wherein the data signals define control instructions executable by the second linear LED lamp to adjust one or more operational characteristics of the second linear LED lamp in accordance with parameters of the one or more control instructions.

20. The linear LED lamp according to claim 18, wherein the second interface connector is operable to receive messages from the second linear LED lamp containing information regarding one or more operational characteristics of the second linear LED lamp or sensor data generated by one or more sensors associated with the second linear LED lamp.

21. The linear LED lamp according to claim 20, wherein the control module is operable to store executable code operable to perform one or more operations to generate and communicate messages via the data network to the centralized lighting management system, the messages containing information received from the second linear LED lamp.

22. The linear LED lamp according to claim 1, further comprising a wireless communications interface operable to enable the linear LED lamp to receive and transmit wireless data signals according to a standardized wireless communications protocol.

23. The linear LED lamp according to claim 22, wherein the wireless communications interface is operable to enable data communications according to a short range standardized wireless communications protocol.

24. The linear LED lamp according to claim 23, wherein the short range standardized wireless communications protocol is Bluetooth.

25. The linear LED lamp according to claim 23, wherein the control module is operable to store executable code operable to perform one or more operations to adjust one or more operational characteristics of the lamp in accordance with parameters of control instructions generated by a peripheral device and received via the wireless communications interface.

26. The linear LED lamp according to claim 22, wherein the wireless communications interface is operable to enable data communications according to the wireless Ethernet communications protocol.

27. The linear LED lamp according to claim 26, wherein the control module is operable to store executable code operable to perform one or more operations to adjust one or more operational characteristics of the lamp in accordance with parameters of control instructions generated by a peripheral device and received via the wireless communications interface.

28. The linear LED lamp according to claim 1, wherein the power circuit comprises a driver circuit for driving the LED emitters with a controlled level of electric current.

29. The linear LED lamp according to claim 1, further comprising a connector end board at the first end of the linear lamp, the first interface connector and the control module each electrically connected to the connector end board and connected to each other via the connector end board.

30. The linear LED lamp according to claim 29, wherein the connector end board is electrically connected to the at least one LED emitter panel for providing power thereto.

31. The linear LED lamp according to claim 29, wherein the connector end board is electrically connected to the one or more sensors.

32. The linear LED lamp according to claim 1, wherein the standardized network communications protocol is the Ethernet or the USB protocol.

33. The linear LED lamp according to claim 1, wherein the first interface connector comprises one of an Ethernet connector or a USB connector.

34. The linear LED lamp according to claim 1, further comprising a first end cap assembly at the first end of the body, the first end cap assembly comprising a housing defining a receptacle, and the first interface connector mounted within the receptacle.

35. The linear LED lamp according to claim 1, wherein the first interface connector is external to the lamp body and connected thereto via a cable configured to communicate power and data signals according to the standardized network communications protocol.

36. The linear LED lamp according to claim 1, wherein the heat sink is a multi-sided heat sink comprising first and second sidewalls comprising generally planar mounting portions lying in intersecting planes and a third sidewall having an outer surface forming outer surface of the lamp, and the at least one LED emitter panel comprises first and second LED emitter panels, the first LED emitter panel secured to the first sidewall and the second LED emitter panel secured to the second sidewall.

37. The linear LED lamp according to claim 36, wherein the heat sink defines a receptacle internal of the first, second and third sidewalls thereof, and the control module is mounted within the receptacle.

38. The linear LED lamp according to claim 37, wherein the multi-sided heat sink further comprising a fourth, generally planar sidewall extending between the first and second sidewalls, and a third LED emitter panel secured to the fourth sidewall, the control module being operable to drive the third LED emitter panel independent of the other LED emitter panels at a current level based on control instructions received by the control module.

39. The linear LED lamp according to claim 1, further comprising an elongate light diffuser cover providing a light transmissive lens positioned about and covering the LED emitters for reflecting, diffusing and/or focusing light emitted from the LED emitters.

40. The linear LED lamp according to claim 1, wherein the body is sized so that the linear LED lamp may be installed in an overhead lighting fixture designed to accept linear lamps of a standardized nominal length, wherein the standardized nominal length is about 2 feet, 3, feet, 4 feet, 6 feet or 8 feet.

41. The linear LED lamp according to claim 1, in combination with a support connector assembly comprising at least one connector module, each connector module comprising an upper portion configured to engage and connect to a horizontally extending ledge of a channel member of an overhead dropped ceiling grid and a lower portion configured to engage and connect to a respective one of the linear LED lamps to secure the linear LED lamp to the channel member while permitting the linear LED lamp to be removed as a unit.

\* \* \* \* \*